United States Patent [19]
Yamamoto et al.

[11] Patent Number: 5,652,830
[45] Date of Patent: Jul. 29, 1997

[54] DATA STORAGE DEVICE

[75] Inventors: Shuuhei Yamamoto, Yamatokoriyama; Toru Morooka, Nara; Tamotsu Shuto, Kashihara, all of Japan

[73] Assignee: Sharp Kabushiki Kaisha, Osaka, Japan

[21] Appl. No.: 552,358

[22] Filed: Nov. 2, 1995

[30] Foreign Application Priority Data

May 31, 1995 [JP] Japan ................................. 7-133519
Nov. 2, 1995 [JP] Japan ................................. 6-269435

[51] Int. Cl.$^6$ ................................................. G06H 15/00
[52] U.S. Cl. ................................................. 395/115; 395/113
[58] Field of Search ....................... 395/115, 116, 395/113, 112, 114; 358/426, 261.4, 404, 444, 451, 434, 460, 467; 380/3, 49, 36, 37, 50, 51, 55; 341/50

[56] References Cited

U.S. PATENT DOCUMENTS

| 4,933,771 | 6/1990 | Matsuura et al. | 358/451 |
| 5,091,790 | 2/1992 | Silverberg | 358/434 |

FOREIGN PATENT DOCUMENTS

| 2-100769 | 4/1990 | Japan . |
| 3-136570 | 6/1991 | Japan . |
| 4-29464 | 1/1992 | Japan . |
| 4-277980 | 10/1992 | Japan . |
| 5-143253 | 6/1993 | Japan . |

Primary Examiner—Arthur G. Evans
Attorney, Agent, or Firm—David G. Conlin; Brian L. Michaelis

[57] ABSTRACT

An apparatus, which has a second memory for storing data and which calls for the stored data from the second memory so as to output the data, is provided with an inputted-time storing means for storing in the means the times at which respective data were stored, a timer for counting time, a compression processing section, and a compressed-time measuring section for storing the times at which the compression processing section carried out its compressing operations. In accordance with information from the inputted-time storing means, the timer and the compressed-time measuring section, the compression processing section detects data whose compressing times have been due from the data stored the second memory, and carries out processes on the selected data in order to increase the remaining amount of the second memory. Thus, it becomes possible to maintain necessary data efficiently using the limited storage capacity of the second memory, without imposing a greater workload on the user.

28 Claims, 42 Drawing Sheets ized 5,652,830

DATA STORAGE DEVICE

FIELD OF THE INVENTION

The present invention relates to a data storage device which is installed as an image-data storage section in an apparatus such as a digital copying machine and a net-work printer system that is connected to a plurality of host machines so that it prints out confidential prints released from the host machines, under strict confidentiality.

BACKGROUND OF THE INVENTION

Conventional digital copying machines include, for example, those machines wherein a storage medium with a large capacity is installed and inputted image data is accumulated in the storage medium, while the image data is read out on demands from the storage medium so as to be released as visible images. In such apparatuses, it is necessary to effectively utilize the limited storage capacity and also to effectively accumulate necessary image data within the storage capacity. For this reason, as for image data already stored in the storage medium, the user of the conventional copying machine has to conduct data compression with respect to image data that is relatively less important, or erase such data, in response to input of new image data or other operations.

For example, the following technique has been proposed as a technique for data compression in the apparatus having the storage function for image data. Japanese Laid-Open Patent Publication No. 277980/1992 (Tokukaihei 4-277980) discloses an apparatus for reading and storing image data, which is capable of minimizing the amount of data to be stored by a modified arrangement wherein, upon receipt of a lengthwise image, the image is rotated by 90 degrees to form data of an oblong image, and then the data is subjected to compression.

This arrangement is described below in detail. Unlike character data, data (image data, which is binary coded data representative of image information requires a tremendous storage capacity for its storage. In order to reduce the necessary storage capacity, the image data is stored in a compressed manner. Utilizing the fact that image data consists of continuous white or black information, the compression is carried out by counting how many pieces (how many dots) of white or black information continue. Upon reading image information, the image information is binary coded and read by scanning the image in the lateral direction and further shifting the scanning position successively in the longitudinal direction within a reading area. The scanning in the longitudinal direction is set to reach the lower end of a document. In this arrangement, even in the case of documents of the same size, a lengthwise document has more non-image areas to be read, thereby causing an increase in the amount of data to be read and the corresponding increase in the storage capacity.

Therefore, in this arrangement, a judgment is made as to whether image data in question is lengthwise or oblong, and if it is lengthwise, the image data is rotated by 90 degrees to convert it into data of an oblong image. Then, the data is compressed, and recorded; thus, it becomes possible to reduce the necessary storage capacity.

Moreover, Japanese Laid-Open Patent Publication No. 100769/1990 (Tokukaihei 2-100769) discloses an image display of the parallel processing system having the following modification. That is, in accordance with the data size of compressed image data, the amount of unit data related to the read-out process is controlled to have an optimum size; thus, this arrangement enables the parallel processing to exert its high-speed performance to the fullest extent in dealing with images having various data sizes, thereby shortening the time required for displaying.

The following is a detailed description of this arrangement. The image data is stored in a compressed manner. Compressed image data, read out from the storage apparatus, is temporarily stored in an compressed-image-data buffer. The compressed image data is decompressed and restored so as to return it to original image data before having been subjected to the compression. The original image data, thus restored, or display-use image data obtained by enlarging or reducing the original image data, is temporarily stored in an image buffer. The display-use image data is read from the image buffer, transferred to a frame memory, and displayed on a display section.

In this case, the read-out process of the compressed image data and the restoration, enlargement and reduction processes of the compressed image data are carried out in a parallel manner. Here, since the data size of compressed image data corresponding to one sheet varies indiscriminately, the time-shortening effect of the parallel processing cannot be fully exerted if the data size and the amount of unit data related to the read-out process do not match each other. For this reason, the data size of compressed image data in question is preliminarily retrieved, and a buffer size suitable for the data size found by the retrieval is maintained. In other words, the amount of unit data of compressed image data, which is read during the read-out process for one time, is varied. As a result, the time-shortening-effect of the parallel processing is exerted to the fullest extent, and it becomes possible to shorten the time required for displaying images having various data sizes.

However, the problem of this arrangement is that, when the remaining storage capacity of the storage medium becomes small or an overflow occurs in the data storage due to inputs of new image data to the storage medium, the user has to judge the relative degree of importance with respect to image data that has already been stored in the storage medium, and compress or erase date successively starting with the data having the lowest degree of importance. This imposes troublesome jobs on the user. Moreover, the data-compressing techniques disclosed in the above-mentioned Patent Publications merely show one method for data compression, and therefore fail to solve the above-mentioned problems.

Furthermore, in a network printer system wherein a plurality of host machines and printers are connected, there is a relatively long distance in most cases between the host machine on which the user is working and the printer in question. Therefore, it is quite natural that, while the user is going to get the printed matter, other people might see and read the printed matter, and if the printed information is a classified document which should not be disclosed to others, a serious problem might occur.

In recent years, there has been an increased demand for security protection to avoid such problems, and the following system has been commonly used in facsimiles and other apparatuses: data of confidential prints is accumulated in a storage device, and an ID code, entered in the printer, and an ID code, entered upon receipt of the printed data, are compared with each other, and the corresponding print-out operation is carried out only when both of the codes match each other.

Japanese Laid-Open Patent Publication No. 143253/1993 (Tokukaihei 5-143253) discloses a network printer system that is arranged as follows:

In the case when a printer does not have a storage device with a large capacity, an ID code is entered to the printer, while a host machine is kept at a stand-by state for confidential print. The printer transmits the ID code, thus entered, to the host machine. Upon receipt of the ID code, the host machine transmits the data of confidential prints corresponding to the ID code, and the printer outputs the received print data.

In the case when a printer has a storage device with a large capacity, the host machine transmits the data of confidential prints to the printer together with the ID code, and the printer stores the ID code and the data of confidential prints in its storage device. An ID code is entered to the printer, and only when the ID code, thus entered, and the stored ID code match each other, the data of confidential prints is read out, and printed out.

If a judgment is made that there is not a sufficient space capacity in the storage while the data of confidential prints are being transmitted from the host machine to the printer, the receipt is terminated, and the stored print data is erased. Further, the fact that the confidential prints have not been completed is stored, and the fact of the incompletion can be confirmed later by an output of the corresponding list.

The concept of confidential prints, itself, is a well-known technique as is disclosed in the above-mentioned Japanese Laid-Open Patent Publication No. 143253/1993 (Tokukaihei 5-143253). In the confidential print functions of printers for which a strong demand has been raised, the current subject is to provide techniques for achieving more effective use of confidential prints. Specific problems with the prior art are shown as follows:

In accordance with the prior art (Japanese Laid-Open Patent Publication No. 143253/1993 (Tokukaihei 5-143253)), if there is not a sufficient space capacity in the storage installed in the printer (that is, if it is not possible to store the transmitted confidential print data), the transmitted confidential print data has to be discarded, and this information is transmitted to the host machine, which is the original transmitter, or is stored so that it can be confirmed later on by the corresponding print out. Thus, the user who has transmitted the data is requested to re-transmit the confidential print data in question. This arrangement is due to the fact that since storage devices are very expensive, storage devices to be installed in the printer should be kept in a minimum.

Moreover, in accordance with the prior art, if there is not a sufficient space capacity in the storage device in the printer because of confidential print data that have been stored therein beforehand, data of confidential prints, next transmitted, have to be discarded, and in this case, the problem is that the user has to wait until the preceding data of confidential prints have been outputted to form a sufficient space capacity in the storage device, before he re-transmits the data.

Furthermore, in accordance with the prior art, the compression of confidential print data stored in the storage device is carried out irrespective of the time when the user tries to get data of confidential prints printed out, based on other conditions, for example, based on the order of preference which the user has manually instructed according to his intention. The resulting problem of this arrangement is that even if data of confidential prints are transmitted from the host machine so as to get them printed out immediately, it takes a long time to restore the print data in the case when the print data in question have been compressed.

Moreover, in the prior art, in an arrangement where data of confidential prints are compressed in order to effectively use the capacity of the storage device installed in the printer, even if some of the data of confidential prints have been printed out therefrom to form a sufficient space capacity in the storage device, the rest of the data still remains in a compressed state. Therefore, the user has to restore data of confidential prints before they are printed, and the resulting problem is that an increased working time is required due to the restoring process.

Furthermore, another problem with the prior art is that in the case when new data of confidential prints are received immediately after some compressed data of confidential prints have been restored, the efficiency of the system tends to deteriorate since either of the data of confidential prints has to be compressed again.

SUMMARY OF THE INVENTION

It is an objective of the present invention to provide a data storage device that enables an effective use of the limited storage capacity without imposing a greater workload on the user and that can maintain necessary data effectively within the storage capacity.

It is another objective of the present invention to provide a network printer system wherein the capacity of the storage device is effectively utilized by compressing received data of confidential prints on a software basis without the necessity of increasing the hardware capacity of the storage device installed in the printers so that more data of confidential prints can be accumulated.

It is still another objective of the present invention to provide a network printer system which can solve a problem of a lengthened restoring time that is required for each pint-out operation that causes much time for the output because of data compression that is conducted under certain conditions.

It is still another objective of the present invention to provide a network printer system which provides the following functions: in the case when the system receives instructions for confidential print from a plurality of host machines, in order to reduce the occupied time of the storage device of a printer with high possibilities, a reminder for printing out is given to the host machine that last gave the instruction for a confidential print out since this machine is the least likely to be unattended, or in order to give a warning to the host machine (that is, a person who entered the instruction) which has monopolized the storage device of the printer for a long time, a reminder for printing out is given to the host machine that finest gave the instruction for a confidential print out.

It is still another objective of the present invention to provide a network printer system which can maintain the storage capacity effectively by giving a reminder for printing out to the host machine which transmitted print data that has the most amount of data and the highest rate in monopolization of the storage device among the confidential prints that have been stored in the storage device of the printer.

It is still another objective of the present invention to provide a network printer system which can effectively utilize the capacity of the storage device by compressing previously stored confidential print data on a software basis, without the necessity of increasing the hardware capacity of an expensive storage device installed in a printer, thereby reducing to a minimum the aforementioned time-consuming jobs for the user to re-transmit data.

It is still another objective of the present invention to provide a network printer system which, upon receipt of new confidential print data, switches print data to be compressed by using a compressing program, the choice being dependent on any one of or combination of the amount of previously stored data of a plurality of confidential prints, the amount of the new confidential print data and the space capacity of the storage device so that it can maintain the space capacity of the storage device most effectively so as to store to a maximum degree confidential print data that is to be transmitted next.

It is still another objective of the present invention to provide a network printer system which, upon receipt of new confidential print data, conducts data compressions in a predetermined order that is set among stored data of a plurality of confidential prints, thereby enabling anyone to use the system commonly.

It is still another objective of the present invention to provide a network printer system which, upon receipt of new confidential print data, allocates a preference code to the confidential print data and which, by conducting data compressions in accordance of these preference codes, minimizes the possibility that confidential print data that belong to the user with a high-level of preference might be compressed, as well as minimizing the possibility that the user, in spite of his high-level of preference, has to restore the data before getting them printed out due to the compressed state of the data, which is a problem with prior art arrangements. Thus, this arrangement allows the user with a high-level of preference to readily conduct print-out operations.

It is still another objective of the present invention to provide a network printer system wherein data compression is conducted in the order of the length of time required from an instruction for a confidential print out to the corresponding outputting process, that is, in the order of the length of time during which the storage device is monopolized, thereby allowing the system to be used equally.

It is still another objective of the present invention to provide a network printer system wherein, in the case when, after some confidential print data have been printed out, some of the remaining compressed confidential print data is to be restored, the restoration of the corresponding data is conducted only when a judgment is made that the space capacity of the storage device is larger than the amount of the corresponding data to be restored. This arrangement achieves an effective use of the storage device with its data storage remaining in a compressed state.

It is still another objective of the present invention to provide a network printer system wherein, only when there is a space capacity larger than a predetermined amount and when a predetermined period of time has elapsed after the preceding print-out operation of confidential print data, restoration of data can be carried out so that it is possible to prepare for receipt of new confidential print data.

It is still another objective of the present invention to provide a network printer system wherein, when the space capacity of the storage device of a printer or the storage capacity having accumulated data has reached a predetermined value, a message relating to judgments as to cancellation of the instruction for a confidential print out is transmitted to the host machine that has made the instruction in question. In prior art arrangements, when confidential print data is received in a state where no space capacity is available, the confidential print data has to be cancelled. However, with this arrangement, a judgment can be made by the user, if necessary, as to whether the print-out in question should be carried out by a normal print-out process instead of a confidential print-out process; thus, it becomes possible to minimize interruptions during the printing process.

It is still another objective of the present invention to provide a network printer system wherein, if, after the message relating to judgments as to cancellation of the instruction for a confidential print out has been transmitted to the host machine, no signal for the cancellation for the instruction for a confidential print out is obtained from the host machine, the system is used more equally.

In order to achieve the above-mentioned objectives, the first data storage device of the present invention, which is provided with a storage means for storing and maintaining inputted data and which calls for and outputs the data stored in the storage means, is further provided with: an inputted-time storing means for storing in the storage means, for example, in a hard disk device, the time at which data is stored; a time-counting means for counting time; a processing-time storing means for storing the processing time at which a process is carried out by a remaining-capacity increasing-process means; and the remaining-capacity increasing-process means for detecting data whose processing time is due from data stored in the storage means in accordance with information from the inputted-time storing means, the time-counting means and the processing-time storing means, and for carrying out a process, such as a compressing process or an erasing process, on the data in question in order to increase the remaining amount of the storage means.

With this arrangement, among the data stored in the storage means, the data whose processing time is due, that is, the data whose inputted time is relatively old and which is considered to be relatively low in its importance, is automatically subjected to a process, such as a compressing process or an erasing process, in order to increase the remaining amount of the storage means. Therefore, the data storage device of the present invention enables an effective use of the limited storage capacity without imposing a greater workload on the user, and maintains necessary data effectively within the storage capacity.

Further, in addition to the arrangement of the first data storage device, the second data storage device is further provided with a calling-frequency measuring means for measuring the calling frequency of respective data from the storage means, and a processing-time changing means for changing the processing time stored in the processing-time storing means so that the processing time of data having a high level of the calling frequency is extended.

In addition to the function derived from the first arrangement, in this arrangement, the processing time, stored in the processing-time storing means, is changed and extended with respect to data having a high level of the calling frequency from the storage means. Therefore, data, which has a relatively high degree of importance, is appropriately discriminated, and the data having a relatively high degree of importance is maintained without being subjected to a compressing process, an erasing process or other processes so that it remains, as it is, in a state ready for its calling operation.

In other words, for example, data, once it is erased, cannot be called for, and compressed data, even if it is maintained, requires a data-restoring process when it is called for, thereby causing the corresponding delay in data output. Therefore, as for data having a relatively high degree of importance, it is stored without being subjected to a compressing process, an erasing process or other processes; thus, it becomes possible to effectively store data using a limited storage capacity in the storage means.

Here, if the extension of the processing time is set to a very long period or infinity, it becomes possible to virtually inhibit the compressing process, the erasing process or other processes with respect to the data.

In addition to the arrangement of the first or second data storage device, the third data storage device, which is installed in an output apparatus for visualizing and outputting data that is called up from the storage means, such as a digital copying machine, is characterized in that when the output apparatus is not allowed to provide the visualized output of data, the remaining-capacity increasing-process means carries out its processes.

In addition to the function derived from the first or second arrangement, when the output apparatus, which is provided with the present data storage device, is not allowed to release the visualized output of data, that is, for example, when a digital copying machine is not allowed to output copies, the remaining-capacity increasing-process means carries out its processes at specific times such as, for example, a warm-up time immediately after the turn-on of the power switch, an image-quality adjusting time, or a toner-supplying time. Thus, it becomes possible to prevent degradation in the operating-rate of the output apparatus.

Moreover, the fourth data storage device, which is provided with a storage means for storing and maintaining inputted data and which calls for and outputs the data stored in the storage means, is further provided with: a detection means for the amount of newly storing data for detecting the amount of data that is to be newly stored in the storage means; a remaining-capacity detection means for detecting the remaining capacity of the storage means; a decision means for making a decision as to whether or not the storage means is capable of storing new data in accordance with information from the detection means for the amount of newly storing data and the remaining-capacity detection means; and a remaining-capacity increasing-process means which, if the storage means is not capable of storing the new data, carries out a process for increasing the remaining capacity of the storage means, such as a compressing process or an erasing process, on the data stored in the storage means in order to provide a remaining capacity that is required for storing the new data.

With this arrangement, if the remaining capacity of the storage means is so small that the storage means is not capable of storing new data, the process for increasing the remaining capacity of the storage means, such as a compressing process or an erasing process, is carried out on the data stored in the storage means in order to provide a remaining capacity that is required for storing the new data.

Accordingly, the data storage device of the present invention makes it possible to effectively utilize the limited storage capacity without imposing a greater workload on the user, while efficiently maintaining necessary data within the storage capacity, that is, while reducing adverse effects on the data stored in the storage means to a minimum.

In the case when, upon storing new data in the storage means, the remaining capacity of the storage means is not sufficient, it is only necessary to provide a space that is sufficient for storing the new data as the remaining amount of the storage means, in order to reduce adverse effects on the data stored in the storage means to a minimum. However, if the user has to carry out these processes, such as compressing and erasing processes, on the respective pieces of data stored in the storage means, this will cause him time-consuming troublesome jobs, thereby imposing him a big burden. This problem can be solved by the arrangement of this data storage device.

In order to achieve the aforementioned objectives, the first network printer system of the present invention, which is constituted of a plurality of host machines, each of which forms image data and gives an instruction for a confidential print out of the image data thus formed, and a printer which stores confidential print data that is transmitted from any of the host machines upon instruction for a confidential print out of the host machine, and prints out the confidential print data upon receipt of an entry of the ID code, is arranged so that the printer is provided with: a storage means for storing a program that compresses and restores the confidential print data, the confidential print data and ID codes; a timer for counting a first predetermined period from the start of a storing process of confidential print data; a control means which recognizes that the time on the timer has elapsed, compresses the confidential print data by using the compressing program when the elapse of the time has been recognized, and restores the compressed confidential print data based on an instruction for restoration; a matching means for making a matching between the entered ID code and stored ID codes; and an output means for printing out the confidential print data on the basis of the matching conditions of the ID codes that have been identified by the matching means.

In this arrangement, upon receipt of confidential print data (image data, character data and other data) and an ID code from one of the host machine, the printer transfers them to the storage device so as to start a storing operation, and also allows the timer to start a time-counting operation. When the first predetermined period has been reached, the confidential print data, that has been stored in the storage device, is compressed by using the compressing program, and is again stored in the storage device. Then, the previous data before the compression is erased. The printer makes a comparison and matching by using the matching means as to whether or not the entered ID code matches any one of the stored ID codes, and only when the identification has been confirmed, it releases an instruction for restoration to the restoring program, and transfers the data to the output means, thereby allowing it to print out the data. After confirming the normal completion of the print out, the confidential print data is erased from the storage device.

Thus, in the case when no print out, which starts upon entry of an ID code and its confirmation, has been carried out until the first predetermined period has elapsed from the receipt and storage of the confidential print data, the compression of the confidential print data is automatically carried out so that a space capacity is maintained in the storage device. Therefore, it is possible to reduce the possibility of overflows in the storage device.

In other words, the operations proceed as follows: If a print-out operation is required immediately after an instruction for a confidential print out given from the host machine, the confidential print data in question is transferred from the storage device at once, and the print out is carried out; therefore, after entry of the ID code, the print out is completed within the same period of time as that of the normal print out.

In contrast, if no print-out operation is required immediately after an instruction for a confidential print out, the confidential print data is accumulated in the storage device. In this case, if a plurality of confidential prints are required and if no print out is called for, the confidential print data are successively compressed and stored after the lapse of the first predetermined time. Thus, it is possible to increase the space capacity which is capable of storing new confidential print data.

Moreover, in order to achieve the aforementioned objectives, the second network printer system of the present invention, which has the same arrangement as the first network printer system, is designed so that upon storing confidential print data from a plurality of host machines, the control means, when the timer has counted out a second predetermined period, transmits a message calling for the print out of the confidential print data to the host machine that has given the first or last instruction for confidential print data among the host machines that have released the instructions for confidential print.

With this arrangement, after the timer has carried out a time-counting operation and the second predetermined period has been reached, the control means selects the host machine that had first or last given the instruction for a confidential print out based on the order of receipt of the plural confidential print data stored therein, and transmits the message calling for the print out of the confidential print data to the selected host machine.

In the case when the host machine which has called for the instruction to print out is the one that last gave the instruction for a confidential print out, since this machine is the least likely to be unattended compared with the other host machines, it becomes possible to reduce the monopolized time of the storage device of the printer with high efficiency and also to readily release the stored area, by urging the relevant machine for a print out. Moreover, in the case when the host machine which has called for the instruction for a print out is the one that first gave the instruction for a confidential print out, it becomes possible to increase the space capacity which is capable of storing new confidential print data by allowing the confidential print data that has monopolized the storage device for the longest time to be printed out.

Furthermore, if a third predetermined time is provided in the timer, it becomes possible to eliminate time required for restoring the compressed data by making a spare time for the compression of the confidential print data.

Moreover, in order to achieve the aforementioned objectives, the third network printer system of the present invention, which has the same arrangement as the first network printer system, is designed so that upon storing confidential print data from a plurality of host machines, the control means makes comparisons between the amounts of image data of the plural of the confidential print data, and transmits a message calling for the print out of the confidential print data to the host machine that released the most amount of image data.

With this arrangement, the control means makes comparisons between the amounts of image data of the plural of the confidential print data, selects the host machine that gave the instruction for a confidential print out containing the most amount of confidential print data, and transmits the message calling for the print out to the selected host machine.

Since the message calling for the print out is given to the host machine that gave the instruction for a confidential print out containing the most amount of confidential print data, that is, having the highest rate of monopolization in the storage device, it is possible to efficiently maintain the space capacity within the storage device.

In order to achieve the aforementioned objectives, the fourth network printer system of the present invention, which is constituted of a plurality of host machines, each of which forms image data and gives an instruction for a confidential print out of the image data thus formed, and a printer which stores confidential print data that is transmitted from any of the host machines upon instruction for confidential print out of the host machine, and prints out the confidential print data upon receipt of an entry of the ID code, is arranged so that the printer is provided with: a storage means for storing a program that compresses and restores the confidential print data, the confidential print data and ID codes; a control means which compresses the previously stored confidential print data by using the compressing program based on an instruction for new confidential prints given from one of the host machines, and restores the compressed confidential print data based on an instruction for restoration; a matching means for making a matching between the entered ID code and stored ID codes; and an output means for printing out the confidential print data on the basis of the matching conditions of the ID codes that have been identified by the matching means.

With this arrangement, upon receipt of new confidential print data from one of the host machines, the control means allows the confidential print data previously stored in the storage device to be automatically compressed by the compressing program based on the instruction for a confidential print out given from the host machine, so as to maintain a space capacity in the storage device, while eliminating the possibility of overflows in the storage device, thereby getting ready for accepting the new confidential data. Therefore, it is possible to store more confidential print data compared with the case having no compressing process, without the necessity of increasing the capacity of the storage device. Moreover, after the confidential print data has been printed out, the compressed confidential print data is restored by using the restoring program; thus, it is possible to readily conduct its print-out operation.

In order to achieve the aforementioned objectives, the fifth network printer system of the present invention, which is constituted of a plurality of host machines, each of which forms image data and gives an instruction for a confidential print out of the image data thus formed, and a printer which stores confidential print data that is transmitted from any of the host machines upon instruction for a confidential print out of the host machine, and prints out the confidential print data upon receipt of an entry of the ID code, is arranged so that the printer is provided with: a storage means for storing a program that compresses and restores the confidential print data, the confidential print data and ID codes; a control means which, upon receipt of instruction for new confidential prints from one of the host machines, selects specific confidential print data that necessitates the least amount of compression and that provides a space capacity capable of storing the new confidential print data, based on comparisons made among the amount of image data of a plurality of previously stored confidential print data, the amount of image data of the new confidential print data, and the space capacity of the storage device, compresses the selected confidential print data by using the compressing program, and restores the compressed confidential print data based on an instruction for restoration; a matching means for making a matching between the entered ID code and stored ID codes; and an output means for printing out the confidential print data on the basis of the matching conditions of the ID codes that have been identified by the matching means.

With this arrangement, among the previously stored confidential print data, the minimum confidential print data, which provides a space capacity capable of storing the new confidential print data through the compression thereof, is selected and compressed. Therefore, the new confidential print data can be stored completely without unnecessarily compressing the print data.

Thus, even when an instruction for new confidential prints is given from one of the host machines in a state where a sufficient space capacity is not available in the storage device, the minimum confidential print data required is selected and compressed, without conducting unnecessary data compressions. Therefore, the new confidential print data can be stored while the state of data compression is kept at its most effective capacity distribution. Moreover, after the confidential print data has been printed out, the remaining confidential print data are restored so as to be kept at its most effective capacity distribution in the same manner; this arrangement is advantageous in achieving high-speed print out.

In order to achieve the aforementioned objectives, the sixth network printer system of the present invention, which is the same as the first, fourth or fifth network printer system, is characterized in that the compression of already stored confidential print data, which is to be carried out upon receipt of a new instruction for a confidential print out from one of the host machines, is selectively carried out in the order of the descending age of the storage starting with the oldest one among plurality of pieces of confidential print data, or in the order of the descending amount of data or the descending number of output print sheets.

With this arrangement, upon receipt of an instruction for a confidential print out from one of the host machines, the system successively selects the previously stored confidential print data starting from the one that was stored earliest and has the longest occupied time of the storage device, and carries out the data compression; therefore, this arrangement makes it possible for all the users to use the system more equally. Alternatively, when a plurality of previously stored confidential print data are compressed, the system successively extracts the confidential print data starting from the one that has the most number of output print sheets and, therefore, has the highest rate in monopolization of the storage device, and carries out the data compression; therefore, this arrangement makes it possible to increase the rate of maintenance of the space capacity in the storage device, and also makes it possible for all the users to use the system more equally.

In order to achieve the aforementioned objectives, the seventh network printer system of the present invention, which is the same as the first, fourth or fifth network printer system, is characterized in that preference codes are added to respective confidential print data and when, upon receipt of a new instruction for a confidential print out from one of the host machines, the previously stored plural confidential print data are compressed, the data compressions are selectively carried out in succession, starting from the one that has the lowest order of preference in its preference code.

With this arrangement, when, upon receipt of a new instruction for a confidential print out from one of the host machines, the previously stored plural confidential print data are compressed, the data extractions and compressions are selectively carried out in succession, starting from the one that has the lowest order of preference in its preference code; therefore, confidential print data, which belong to the users having preferences, are less likely to be subjected to the compression, compared with other data. Thus, the corresponding print out can be carried out quickly.

In order to achieve the aforementioned objectives, the eighth network printer system of the present invention, which is constituted of a plurality of host machines, each of which forms image data and gives an instruction for a confidential print out of the image data thus formed, and a printer which stores confidential print data and its print output time that are transmitted from any of the host machines upon instruction for a confidential print out of the host machine, and prints out the confidential print data upon receipt of an entry of the ID code, is arranged so that the printer is provided with: a storage means for storing a program that compresses and restores the confidential print data, the confidential print data and ID codes; a time-counting means for counting the present time; an operation means for calculating the output waiting time from the present time until the print output time; a control means which selects the confidential print data that has the longest output waiting time from the previously stored plural confidential print data by using the operation means, compresses the selected confidential print data by using the compressing program, and restores the compressed confidential print data based on an instruction for restoration; a matching means for making a matching between the entered ID code and stored ID codes; and an output means for printing out the confidential print data on the basis of the matching conditions of the ID codes that have been identified by the matching means.

With this arrangement, when, upon receipt of a new instruction for a confidential print out, the previously stored plural confidential print data are compressed, the data extractions and compressions are selectively carried out in succession, starting from the one that has the longest output waiting time and, therefore, has the longest occupied time in the storage device; therefore, this arrangement is rational in maintaining the greatest possible space capacity in the storage device, thereby making it possible for all the users to use the system equally.

In order to achieve the aforementioned objectives, the ninth network printer system of the present invention, which is the same as the first, fourth, fifth or eighth network printer system, is characterized in that when the control means has made a judgment that after some confidential print data have been printed out, the space capacity of the storage device is larger than the amount of data that is required by the remaining compressed confidential print data to be restored, the control means carries out the restoration of the confidential print data in question.

With this arrangement, in the case when some confidential print data have been printed out to increase the space capacity in the storage device, if compressed confidential print data still remain in the storage device, the control means automatically carries out the restoration of the confidential print data in question only when the control means has made a judgment that the space capacity of the storage device is larger than the amount of data that is required by the remaining compressed confidential print data to be restored. This keeps confidential print data that still remain in a compressed state to a minimum, and makes it possible to use the storage device more effectively. Moreover, when the restored confidential print data is printed out next time, no restoring operation is required, and the corresponding print out is carried out quickly.

In order to achieve the aforementioned objectives, the tenth network printer system of the present invention, which is the same as the ninth network printer system, is characterized in that when the control means has made a judgment that the space capacity of the storage device is larger than the amount of data that is required by the remaining compressed confidential print data to be restored, and only when this state continues not less than a predetermined period, the control means carries out the restoration of the confidential print data in question.

If, after some confidential print data have been printed out, new confidential print data is received immediately after the remaining compressed confidential print data has been restored, either pieces of the confidential print data has to be again compressed; this causes degradation in the efficiency of the system. With the above-mentioned arrangement, when, after some confidential print data have been printed out, the control means has made a judgment that the space capacity of the storage device is larger than the amount of data that is required by the remaining compressed confidential print data to be restored, and only when this state continues not less than a predetermined period, the control means carries out the restoration of the confidential print data in question. This arrangement makes the system properly get ready for accepting new confidential data, and prevents degradation in the efficiency of the system. In other words, it becomes possible to solve the above-mentioned problem in that even if new confidential print data is received immediately after the remaining compressed confidential print data has been restored, it is not necessary to again compress either pieces of the confidential print data. Further, since receipt of new confidential print data is readily carried out immediately after a print out operation, it is possible to maintain high efficiency in the system.

In order to achieve the aforementioned objectives, the eleventh network printer system of the present invention, which is the same as the first through tenth network printer systems, is characterized in that when the amount of new confidential print data exceeds the space capacity of the storage device or when the amount of accumulated data reaches a predetermined value in the storage device, a message related to judgment of cancellation of the instruction for a confidential print out is released to the host machine that is giving a new instruction for a confidential print out.

With this arrangement, when new confidential print data is received in a state where no space capacity is available in the storage device, the system sends the message related to judgment of cancellation of the instruction for a confidential print out to the host machine in question. Thus, it is suggested that the user should give an instruction for ordinary prints instead of the instruction for a confidential print out, and it is unnecessary for the user to stop the print out operation in the middle.

Additionally, when new confidential print data is received in a state where no space capacity is available, the message related to judgment of cancellation of the instruction for a confidential print out is released to the host machine in question, and if no answer is obtained, a message indicating that the data will be stored in a compressed state may be sent to the host machine in question. This arrangement allows the user to store the confidential print data in a compressed state through his permission for the compression, and it is unnecessary for the user to stop in the middle the operation related to the instruction for a confidential print out.

Additionally, when new confidential print data is received in a state where no space capacity is available, the message related to judgment of cancellation of the instruction for a confidential print out is released to the host machine in question, and if no answer is obtained, the confidential print data may be automatically compressed and stored in the storage device. Thereafter, a message indicating that the data has been stored in a compressed state may be sent to the host machine in question; this arrangement allows the processes related to the confidential print to be operated to a maximum, and also reduces the interruption of the processes to a minimum.

In order to achieve the aforementioned objectives, the twelfth network printer system of the present invention, which is the same as the eleventh network printer system, is characterized in that when, after a message related to judgment of cancellation of the instruction for a confidential print out has been sent to the host machine, no cancellation signal for the instruction for a confidential print out is obtained, the previously stored confidential print data or the confidential print data newly transmitted is compressed.

With this arrangement, when new confidential print data is received in a state where no space capacity is available in the storage device, the system sends the message related to judgment of cancellation of the instruction for a confidential print out to the host machine in question, and if no answer is obtained, the previously stored confidential print data or the confidential print data newly transmitted is compressed, and again stored in the storage device. Thus, it is possible to eliminate the interruption of the process, and also to use the system equally.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 12, the following description will discuss the first embodiment of the present invention.

Figure 2:
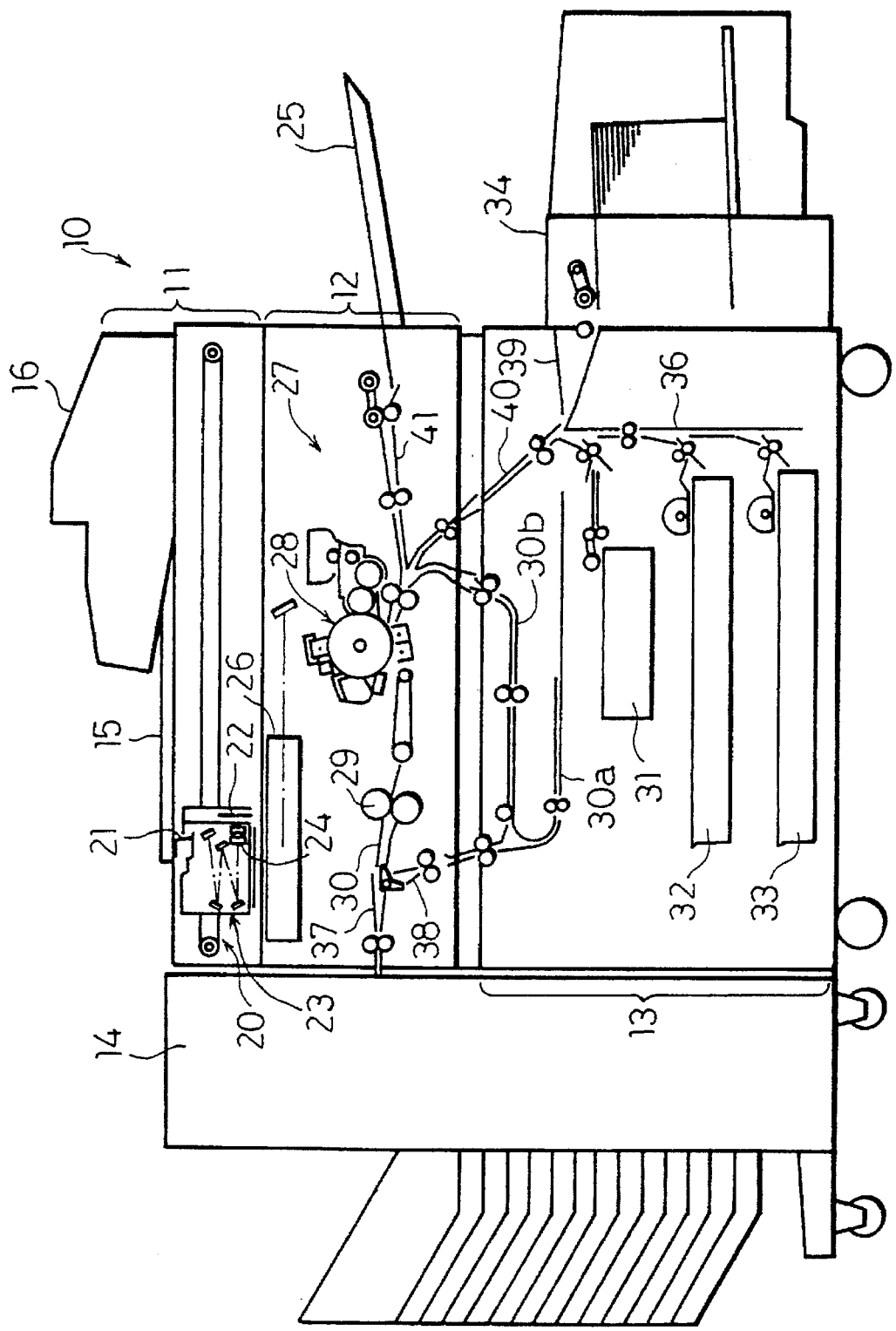
FIG. 2 is a front view showing the entire structure of a digital copying machine wherein the data storage device is installed.

A data storage device of the present embodiment is installed in a digital copying machine 10 that functions as an output apparatus shown in FIG. 2. This digital copying machine 10 has a scanner section 11, a laser printer section 12, a multi-stage feeding unit 13, and a sorter 14.

The scanner section 11 is provided with a document platen 15, an automatic document feeder (RDF) 16 for two-sided copies, and a scanner unit 20. The multi-stage feeding unit 13 has the first through fourth cassettes 31 through 34. In the multi-stage feeding unit 13, sheets of copy paper are fed sheet by sheet from stacks of copy paper housed in the cassettes of respective stages, and sent to the laser printer section 12. In the RDF 16, a plurality of documents, which are set as one stack, are automatically sent sheet by sheet so as to be read by the scanner unit 20. The scanner unit 20 is provided with a lamp reflector assembly 21 for exposing a document, a plurality of reflection mirrors 23 for directing a reflected light image from the document to a charge coupled device (CCD) 22, and a lens 24 for converging the reflected light image from the document onto the CCD 22.

In the scanner section 11, in the case of scanning the document placed on the document platen 15, the document image is read while the scanner unit 20 is moving along the bottom surface of the document platen 15, and in the case of using the RDF 16, the document image is read while the document is being carried out, with the scanner unit 20 stopped at a predetermined position below the RDF 16.

Image data, which has been obtained by scanning the document image using the scanner 20, is sent to an image-processing section 50 which will be described later, where various processes are conducted on the data, and is temporarily stored in a memory 54 in the image processing section 50. The image data, stored in the memory 54, is sent to the laser printer section 12 in accordance with an instruction for output, and its image is formed on a sheet of copy paper.

The laser printer 12 has a manual-feeding document tray 25, a laser writing unit 26, and an electrophotographic processing section 27 for forming images. The laser writing unit 26 is provided with a semiconductor laser, not shown, for emitting a laser light beam that is representative of the image data from the memory 54, a polygon mirror for polarizing the laser light beam at a constant angular velocity, an f–θ lens for correcting the laser light beam that has been polarized at the constant angular velocity so that it is polarized at a constant velocity on a photoconductive drum 28 in the electrophotographic processing section 27, and other members. The electrophotographic processing section 27, which has a well-known construction, is constituted of a main charger, a developing device, a charge-eliminating device, a fixing device 29, and other devices all of which are placed around the photoconductive drum 28.

At the down-stream side of the fixing device 29 in the paper-transporting direction, transport paths 30 and 37, a sorter 14, a transport path 38 and the multi-stage feeding unit 13 are installed. The transport path 38 is divided into a reversal transport path 30a used for two-sided copies, and a two-sided/composite-copy-use transport path 30b used for two-sided copies as well as composite copies. Moreover, a common transport path 36 is installed in a multi-stage feeding unit 13, and the common transport path 36, which joins the transport path 39, is connected to the transport path 40. The transport path 40, which joins the two-sided/composite-copy-use transport path 30b and the transport path 41, is connected to an image-forming station that is located between the photoconductive drum 28 and a transferring device.

Here, the image data, read from the memory 54, is outputted as a laser light beam by the laser writing unit 26, and is formed on the surface of the photoconductive drum 28 as an electrostatic latent image. This electrostatic latent image is visualized by toner from the developing device to form a toner image. The toner image is transferred onto a sheet of copy paper that has been transported from the multi-stage feeding unit 13, and then is subjected to a fixing process. The sheet of paper is sent to the sorter 14 from the fixing device 29 through the transport paths 30 and 37, or is sent to the reversal transport path 30a through the transport paths 30 and 38 so as to be subjected to two-sided copying processes or composite copying processes.

Figure 3:
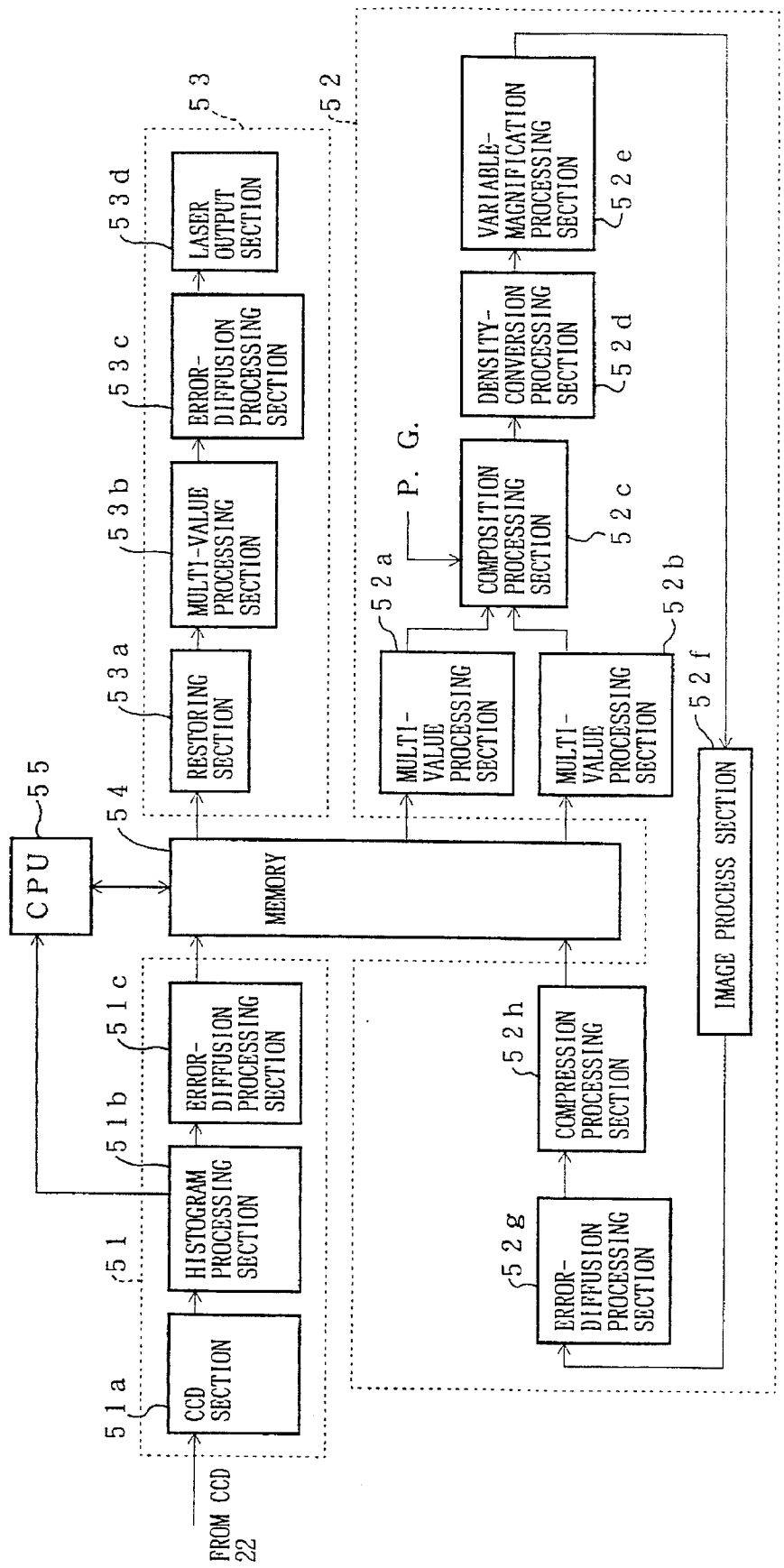
FIG. 3 is a block diagram showing an arrangement of an image-processing section that is provided in the digital copying machine.

Moreover, the present digital copying machine is provided with an image-processing section 50 as shown in FIG. 3. The image-processing section 50 is provided with an image-data input section 51, an image-data processing section 52, an image-data output section 53, a memory 54 and a CPU (Central Processing Unit) 55.

The image-data input section 51 has a CCD section 51a, a histogram processing section 51b and an error-diffusion processing section 51c. The image-data input section 51 converts image data of the document, which has been read by the CCD 22 shown in FIG. 2, into binary digits, and while their histograms are being formed as binary digital quantities, the image data is processed by the error-diffusion method, and temporarily stored in the memory 54.

In other words, in the CCD section 51a, analog electric signals, which correspond to respective pixel densities of the image data, are A/D (analog to digital) converted, and subjected to an MTF correction, a black-and-white correction, or a gamma correction, and then released to the histogram processing section 51b as digital signals of 256 gradations (8 bits).

In the histogram processing section 51b, the digital signals, released from the CCD section 51a, are added in a separate manner into the respective pixel densities of 256 gradations to form density information (histogram data), and the histogram data thus obtained is sent to the CPU 55, if necessary, or is sent to the error-diffusion processing section 51c as image data.

In the error-diffusion processing section 51c, the digital signals of 8 bits/pixel, released from the CCD section 51a, are converted into 1 bit (binary) through the error-diffusion method that is one type of pseudo-half-tone processing and that is a method wherein errors due to the binary conversion are reflected on binary decision between adjacent pixels, and calculations for re-distribution are carried out in order to accurately reproduce partial-area densities in the document.

The image-data processing section 52 is provided with multi-value processing sections 52a and 52b, a composition processing section 52c, a density-conversion processing section 52d, a variable-magnification processing section 52e, an image process section 52f, an error-diffusion processing section 52g, and a compression processing section 52h.

The image-data processing section 52 is a processing section wherein inputted image data is eventually converted into image data that is desired by the operator, and the inputted image data is processed in this processing section until it is converted and finally stored in the memory 54 as outputted image data. Here, the above-mentioned processing sections contained in the image-data processing section 52 are allowed to function on demands, and all the sections are not necessarily allowed to function.

More specifically, in the multi-value processing sections 52a and 52b, the data, which has been converted into binary digits by the error-diffusion processing section 51c, is again converted into data having the 256 gradations. In the composite processing section 52c, logical operations, such as OR operation, AND operation or EXCLUSIVE-OR operation, are selectively carried out for each pixel. The data which are used in these operations are pixel data stored in the memory 54 and bit data from the pulse generator (PG). In the density-conversion processing section 52d, the relationship between an input density and an output density is predeterminately set based on a given gradation-conversion table with respect to digital data having 256 gradations.

In the variable-magnification processing section 52e, pixel data (density value), which relate to the pixel in question after having been subject to a magnification, are found by conducting an interpolating process on the known data that have been inputted, in accordance with the specified magnification rate, and a variable-magnification processing is first carried out in the sub-scanning direction, and then is carried out in the scanning direction. In the image process section 52f, various image-processing operations are carried out on the inputted pixel data, and information collections, such as feature extraction, are carried out with respect to data rows. In the error-diffusion processing section 52g, processes, which are similar to those of the error-diffusion processing section 51c in the image-data input section 51, are carried out. In the compression processing section 52h, the binary data are compressed based on a coding process called "run length". Further, with respect to compression of image data, the compressing process is operated at the time of completion of final output image data, that is, in the last processing loop.

The image-data output section 53 is provided with a restoring section 53a, a multi-value processing section 53b, an error-diffusion processing section 53c, and laser output section 53d. The image-data output section 53 restores image data that have been stored in the memory 54 in a compressed state, converts them again into those having the 256 gradations, carries out an error-diffusing process using quarternary data that provides smoother intermediate gradations than that using binary data, and transfers the resulting data to the laser output section 53d.

In other words, the restoring section 53a restores the image data that have been compressed by the compression processing section 52h. In the multi-value processing section 53b, processes are carried out in the same manner as the multi-value processing sections 52a and 52b in the image-data processing section 52. In the error-diffusion processing section 53c, processes are carried out in the same manner as the error-diffusion processing section 51c in the image-data input section 51. In the laser output section 53d, digital image data are converted into ON/OFF signals for the laser in accordance with control signals from a sequence controller, not shown, and the laser is thus turned on and off.

Here, the data, which are processed in the image-data input section 51 and the image-data output section 53, are stored in the memory 54 basically as binary data in order to cut the capacity of the memory 54, but the data can be processed as quarternary data in order to prevent degradation in image data.

Figure 4:
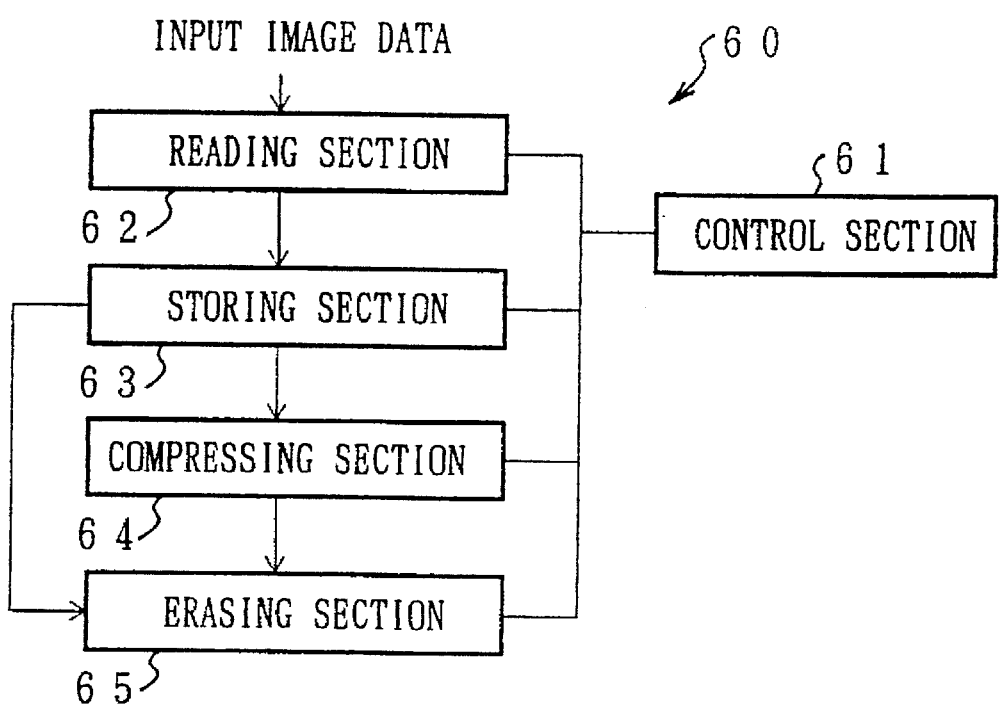
FIG. 4 is a block diagram showing a basic arrangement of the data storage device.
Figure 5:
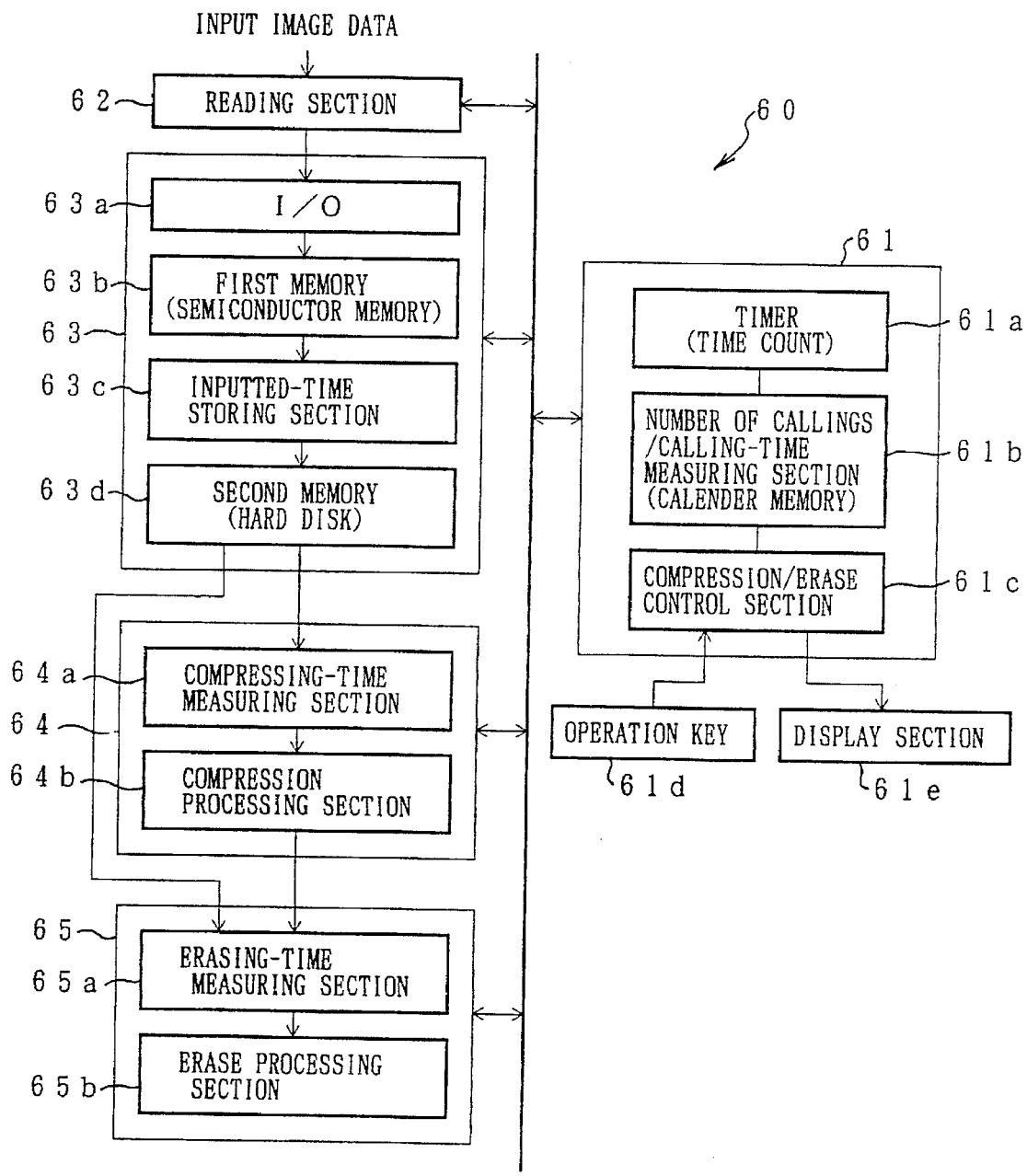
FIG. 5 is a block diagram that shows the arrangement of FIG. 4 more specifically.

Moreover, the present digital copying machine is provided with a data storage device 60 shown in FIGS. 4 and 5. Here, FIG. 4 shows a basic construction of the data storage device 60, and FIG. 5 shows the construction more specifically.

As shown in FIG. 4, the data storage section 60 is provided with a control section 61, a reading section 62, a storing section 63, a compressing section 64, and an erasing section 65. The reading section 62 reads image data from a document, and it corresponds to the scanner section 11 shown in FIG. 2.

As shown in FIG. 5, the storing section 63 is provided with an I/O interface 63a, a first memory 63b, an inputted-time storing section 63c that functions as an inputted-time storing means, and a second memory 63d that functions as a storage means. The first memory 63b is a RAM (Random Access Memory) consisting of a semiconductor memory, and it corresponds to the memory 54 shown in FIG. 3. The memory 54 is a storage section which temporarily stores inputted image data so as to get them ready for the processes of the image-processing section 50. The image data, stored in the first memory 63b, are transferred and stored in the second memory 63d upon receipt of an instruction for storage entered through an operation key 61d. When the image data are outputted from the second memory 63d for printing, the data are called for from the second memory 63d to the first memory 63b by an instruction for printing entered through the operation key 61d.

The inputted-time storing section 63c stores the time at which image data, which has been processed in the image-processing section 50, is transferred from the first memory 63b to the second memory 63d and stored therein. The second memory 63d, which consists of, for example, a hard disk device having a large capacity, is used for storing the image data that have been transferred from the first memory 63b.

The compressing section 64 is provided with a compressing-time measuring section 64a and a compression processing section 64b. The compressing-time measuring section 64a measures the time at which the compressing process has to be carried out, that is, the arrival of compressing time, based on the inputted time stored in the inputted-time storing section 63c and time-counting operations of the timer 61a, with respect to respective image data stored in the second memory 63d. In the present embodiment, the compressing time is set to, for example, one month. The compression processing section 64b carries out a predetermined data compression on image data that has been specified as the one to be compressed.

The erasing section 65 is provided with erasing-time measuring section 65a and an erase processing section 65b. The erasing-time measuring section 65a measures the time at which the erasing process has to be carried out, that is, the arrival of erasing time, based on the inputted time stored in the inputted-time storing section 63c and time-counting operations of the timer 61a, with respect to respective image data stored in the second memory 63d. In the present embodiment, the erasing time is set to, for example, six months. The erase processing section 65b erases image data that has been specified as the one to be erased, from the second memory 63d.

The control section 61 is provided with a timer 61a functioning as a time-counting means, a number of calls/calling-time measuring section 61b which constitutes a calling-frequency measuring means in combination with the timer 61a, and a compression/erase control section 61c. The timer 61a counts a period of time that has elapsed. The number of calls/calling-time measuring section 61b measures the number of calls of the respective image data stored in the second memory 63d, and counts the times at which they were called for, based on a calendar memory installed therein and time-counting operations of the timer 61a.

Upon arrival of a compressing time measured by the compressing-time measuring section 64a and upon arrival of an erasing time measured by the erasing-time measuring section 65a, the compression/erase control section 61c give instructions to the compression processing section 64b and the erase processing section 65b respectively so as to carry out the corresponding operations. Moreover, upon receipt of an input for inhibiting compression or erase through the operation key 61d as will be described later, the compression/erase control section 61c unconditionally inhibits compression or erase with respect to the specified image data. Additionally, in the case when the user has directly carried out a compressing or erasing operation by using the operation key 61d, this instruction for inhibiting compression or erase is cancelled. Furthermore, in response to an input through the operation key 61d, the compression/erase control section 61c changes the compressing time in the compressing-time measuring section 64a as well as the erasing time in the erasing-time measuring section 65a, if necessary. Here, the operation key 61d and a display section 61e, both of which are installed on an operation panel, not shown, in the digital copying machine, are connected to the compression/erase control section 61c.

In the present data storage device 60, the compressing-time measuring section 64a and the erasing-time measuring section 65a constitute a processing-time storing means, and the compressing-time measuring section 64a, the compression processing section 64b, the erasing-time measuring section 65a, the erase processing section 65b, and the compression/erase control section 61c constitute a remaining-capacity increasing-process means.

Here, the compressing process in the compression processing section 64b is carried out, for example, by shortening data length in digital notation by utilizing redundancy and correlativity of data. With respect to compression of digitized data, such as, sound and image information, there are various methods wherein data compression is carried out by utilizing one-dimensional or two-dimensional correlativity in original information. For example, MH (Modified Huffman) method, MR (Modified Read) method, MMR (Modified Modified Read) method have been adopted as methods for compressing binary image data of black and white. In MH method, the continuous length of black or white that occurs one-dimensionally in the line direction is coded in a manner in which the higher the frequency of occurrence, the shorter it is coded. Moreover, in MR and MMR methods, based on the one-dimensional coding process of MH method, the compression rate is improved by applying the coding process also to two-dimensional directions. In MR method, following a coding process for one line using MH method, coding processes are performed from the second line on by using differences, and after the number of lines (k) of the coding processes for differences has been limited, coding processes of MH method are carried out for every k-th line.

In the above-mentioned arrangement, image data, which have been read in the scanner section 11 of the digital copying machine, that is, in the reading section 62, are subjected to predetermined processes in the image-processing section 50, and then transferred to and stored in the memory 54, that is, the first memory 63b through the second memory 63d. Moreover, image data, which have been transferred from other apparatuses such as other copying machines through communication lines, are also stored in the second memory 63d. In this case, Image Numbers are allocated to respective image data stored in the second memory 63d, and image data, information related to these image data, such as Image Numbers, inputted times (stored date), frequencies for calling and called times, attributes in compression and erase, and the amounts of image data are stored, on demands, in the first memory 63b, the second memory 63d, the number of calls/calling-time measuring section 61b and other sections.

The frequencies for calling and called times respectively indicate the number of times at which image data in the second memory 63d has been called for printing or other purposes in the digital copying machine since it was newly stored and the times on which it was called, and these values are obtained based on stored values in the inputted-time storing section 63c, measured values in the number of calls/calling-time measuring section 61b, and counted values in the timer 61a. The attributes in compression and erase, which are determined based on decisions on the possibility of compressing or erasing operations that are made on the basis of the frequencies for calling and called time as well as based on inputted instructions for inhibiting compression or erase, are used for indicating the possibility or impossibleness of compression or erase with respect to the respective image data upon carrying out a compressing or erasing operation in the copying machine 60.

Figure 6:
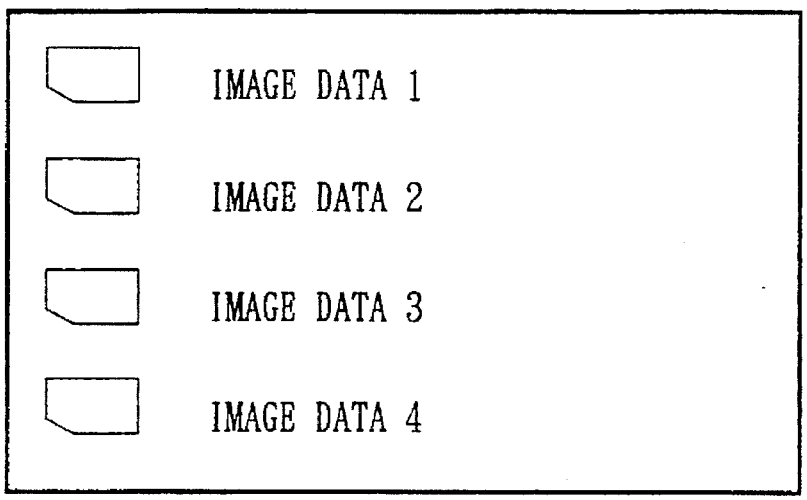
FIG. 6 is an explanatory drawing that shows an example of displays of image data Numbers in a display section which is shown in FIG. 5.
Figure 7:
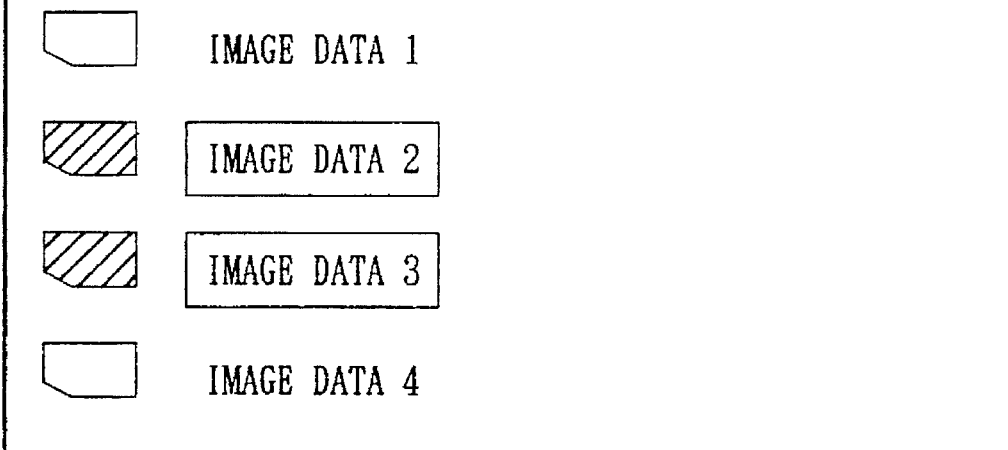
FIG. 7 is an explanatory drawing that shows an example of displays which have been subjected to an erase-prohibiting instruction with respect to the image data Numbers.

The above-mentioned designation as to the possibility or impossibleness of compression or erase, made by inputted instructions for inhibiting compression or erase, is given as follows: For example, let us assume that image data 1 through 4 are stored in the second memory 63d. When Numbers of the stored image data are called for by using the operation key 61d, a display, for example, shown in FIG. 6, is provided on the display section 61e. Here, if image data 2 and 3 are designated as image data on which compression or erase is inhibited semipermanently, the display on the display section 61e is changed to the one shown in FIG. 7, and the corresponding Image Numbers are stored in, for example, the second memory 63d as Image Numbers related to inhibition for compression or erase.

Figure 1:
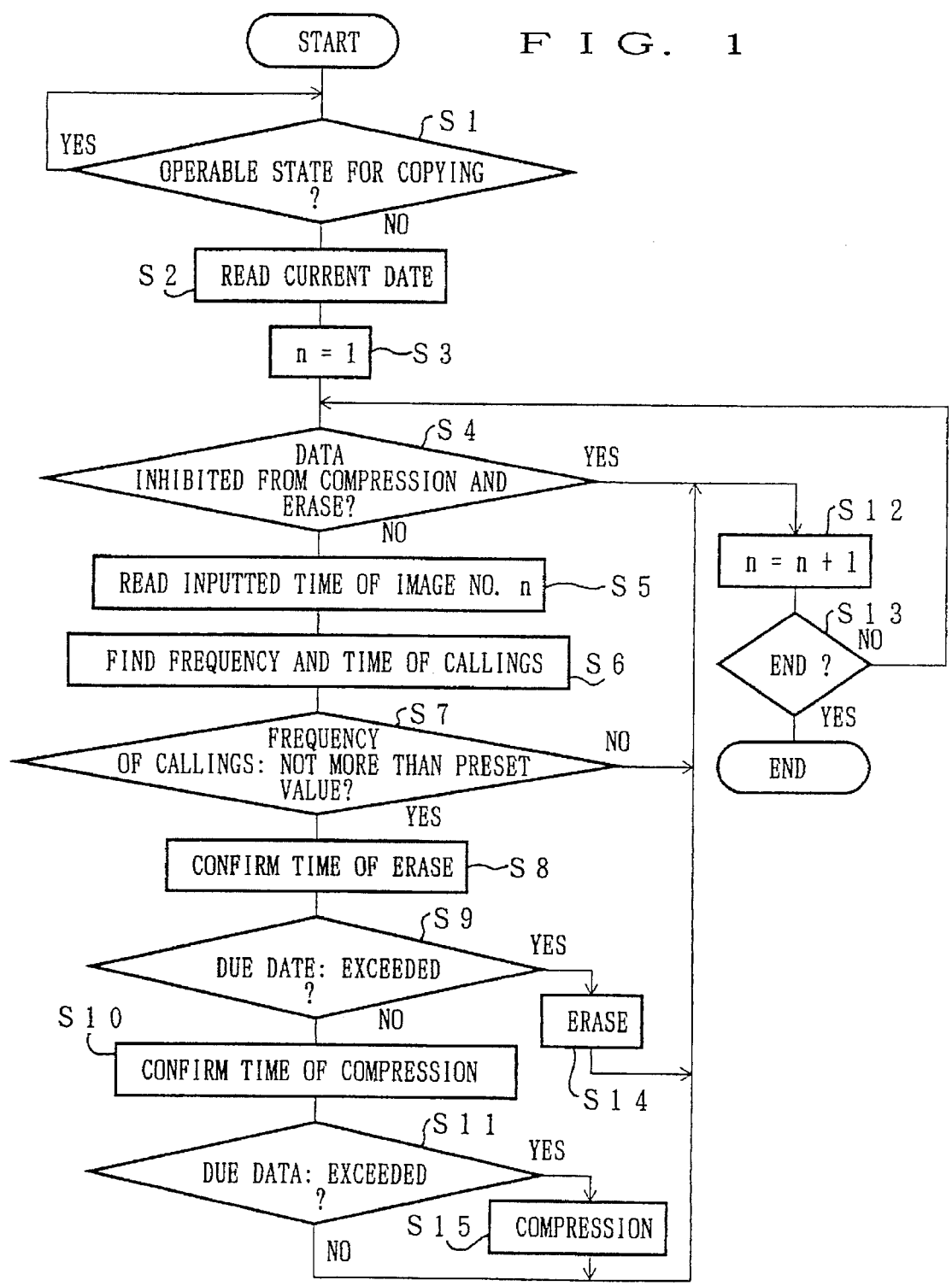
FIG. 1 is a flowchart showing operations of a data storage device of one embodiment of the present invention.

Next, referring to a flowchart in FIG. 1, the following description will discuss storing operations of image data in the data storage device 60.

First, the compression/erase control section 61c makes a judgment as to whether the copying machine is inoperable in its copying process by communicating with the control section, not shown, that controls image-forming operations of the digital copying machine (S1). This inoperable state in copying process is a state, such as a warm-up state immediately after the power switch has been turned on, an image-quality adjusting state, or a toner-supplying state.

Next, the current date is read from the calendar memory that is included in the number of calls/calling-time measuring section 61b (S2). Then, figure "1" corresponding to image No. 1 is substituted in variable n (S3), and a judgment is made as to whether or not the No. designated by figure n is an image that is allowed to be compressed or erased, that is, as to whether or not the image is one of the images whose compression or erase should be inhibited (S4).

In this judgment, if the image is identified as the one whose compression or erase should be inhibited, the sequence proceeds to S12, while the image is not the one whose compression or erase should be inhibited, the inputted time of the image, that is, the date of storage, is read from the inputted-time storing section 63c (S5). Next, based on the date of storage and measurements made by the number of calls/calling-time measuring section 61b, a judgement is made as to whether or not the frequency of calls for the image is not more than a preset value within, for example, a preset period of time in the past (S7).

In this judgment at S7, if the frequency is the preset value or more, the sequence proceeds to S12 since the data is not allowed to be compressed or erased. On the other hand, if the frequency is not more than the preset value, the time of erase is confirmed with respect to the image based on measurements made by the erasing-time measuring section 65a, since the image data is not the one whose compression or erase should be inhibited (S8). Then, a judgment is made as to whether or not the time of erase has been exceeded with respect to the image, that is, whether or not the time of erase has been due with respect to the image (S9). If the result is "YES" in this judgment, the image is erased by the erase processing section 65b (S14), and the sequence proceeds to S12.

Here, if the result is "NO" in the judgment, the time of compression is confirmed with respect to the image based on measurements made by the compressing-time measuring section 64a (S10). Then, a judgment is made as to whether or not the time of compression has been exceeded with respect to the image, that is, whether or not the time of compression has been due with respect to the image (S11). If the result is "YES" in this judgment, the image is compressed by the compression processing section 64b (S15) and, the sequence proceeds to S12. Here, if the result is "NO", the sequence proceeds to S12 as it is.

At S12, n+1 is substituted in variable n so as to successively change the number of image, and the sequence returns to S4 from which the same operations are repeated. Thereafter, after completion of the above-mentioned processes with respect to all the image data stored in the second memory 63d (S13), the operations are completed.

Figure 8:
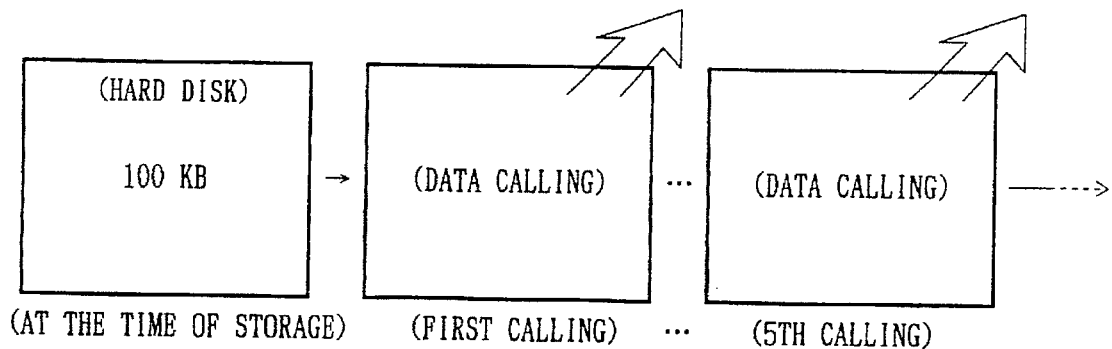
FIG. 8 is an explanatory drawing that shows erase/compression-prohibiting operations that are performed based on the calling frequency of the data storage device.

Here, the processes shown in S5, S6 and S7 are arranged so that in the case where the intervals of calls are set to be within one month, the number of calls is counted with respect to a certain image data stored in the second memory 63d, for example, as shown in FIG. 8, and so that if the value has become not less than a predetermined value, for example, not less than 5 times, the sequence proceeds to S12 where compression or erase with respect to the image data is inhibited.

Figure 9:
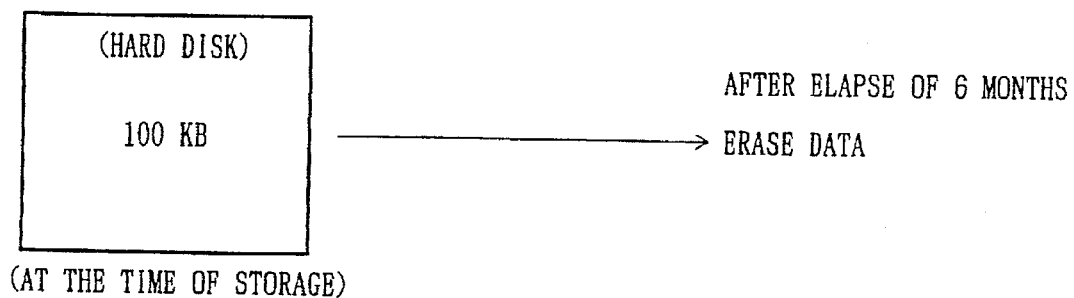
FIG. 9 is an explanatory drawing that shows an erasing operation in the data storage device.

Moreover, the erasing processes of S8, S9 and S14 are arranged so that, for example, as shown in FIG. 9, when 6 months have elapsed since the data of storage of image data, the image data corresponding to 100 KB are erased.

Figure 10:
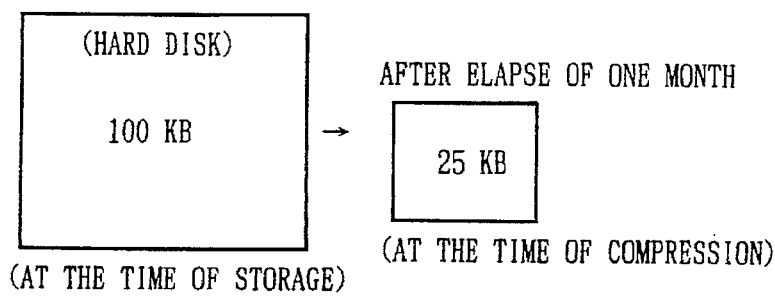
FIG. 10 is an explanatory drawing that shows a compressing operation in the data storage device.
Figure 11:
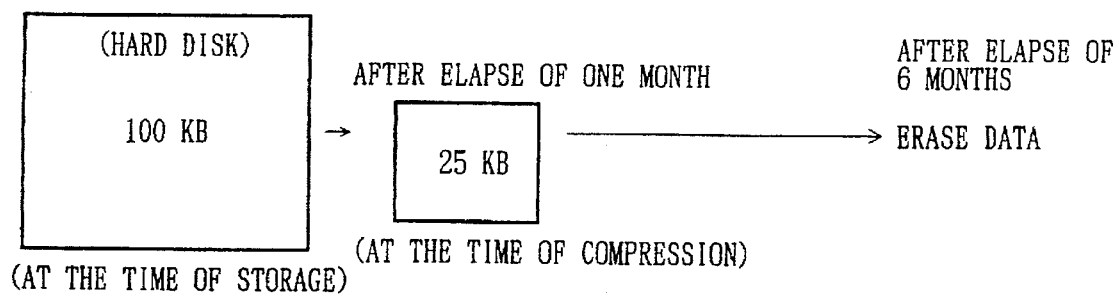
FIG. 11 is an explanatory drawing that shows the compressing operation followed by the erasing operation in the data storage device.

Furthermore, the compressing processes of S10, S11 and S15 are arranged so that, for example, as shown in FIG. 10, after one month has elapsed since the date of storage of image data, the image data corresponding to 100 KB are compressed into image data of 25 KB. Here, in the present embodiment, since the time of compression and the time of erase are respectively set to one month and six months from the date of storage, any image data, which are not subjected to inhibition for compression or erase and which has the frequency of calls not more than the preset value, are to be compressed when one month has passed since the date of storage, and also erased when six months have passed since the date of storage.

Additionally, the above-mentioned compressing and erasing processes are terminated when the digital copying machine has proceeded from the inoperable state of copying processes, shown in S1, to an operable state of copying processes, and are resumed in the next inoperable state of copying processes.

As described above, in the present data storage device 60, those image data in the second memory 63d whose time of erase have been due are erased, and those image data whose time of compression have been due are compressed. Therefore, the data storage device enables an effective use of the limited storage capacity and also automatically carries out processes for accumulating necessary image data effectively within the storage capacity. Thus, it becomes possible to reduce work loads imposed on the user.

Further, with respect to image data whose frequency of calls exceeds the preset value, that is, the image data whose degree of importance is relatively high, they are kept away from compressing or erasing processes; therefore, it is possible to effectively maintain only important image data.

Moreover, with respect to very important image data, it is possible to preliminarily specify these data as the ones whose erasing and compressing processes are inhibited, and it becomes possible to positively maintain the important image data. Furthermore, since the erasing and compressing processes are carried out while the digital copying machine is in the inoperable state of copying processes, the operating-rate of the copying machine is not adversely affected.

Additionally, in the present embodiment, the compressing and erasing processes are carried out on image data stored in the second memory 63d; however, this arrangement may be modified so that only either one of the processes is carried out.

Moreover, the erasing and compressing processes are inhibited upon receipt of an input for inhibiting compression and erase; however, only the erasing process may be inhibited by the input. Similarly, in the case where the frequency of calls exceeds the preset value, the erasing and compressing processes are inhibited; however, only the erasing process may be inhibited. Furthermore, the arrangement may be modified so that a preset value of calling frequency for inhibiting the erasing process and a preset value of calling frequency for inhibiting the compressing process are separately set to individual values.

Furthermore, with respect to image data whose frequency of calls are not less than the preset value, the erasing and compressing processes are not carried out irrespective of arrivals of the times of erase and compression, and this arrangement tends to virtually extend the periods before the erasing and compressing processes with respect to the image data in question. However, this arrangement may modified so that the times of erase and compression, which are set in the compressing-time measuring section 64a and the erase processing section 65b, are specifically changed through controls that are made by the compression/erase control section 61c with respect to the image data in question.

Embodiment 2

Figure 12:
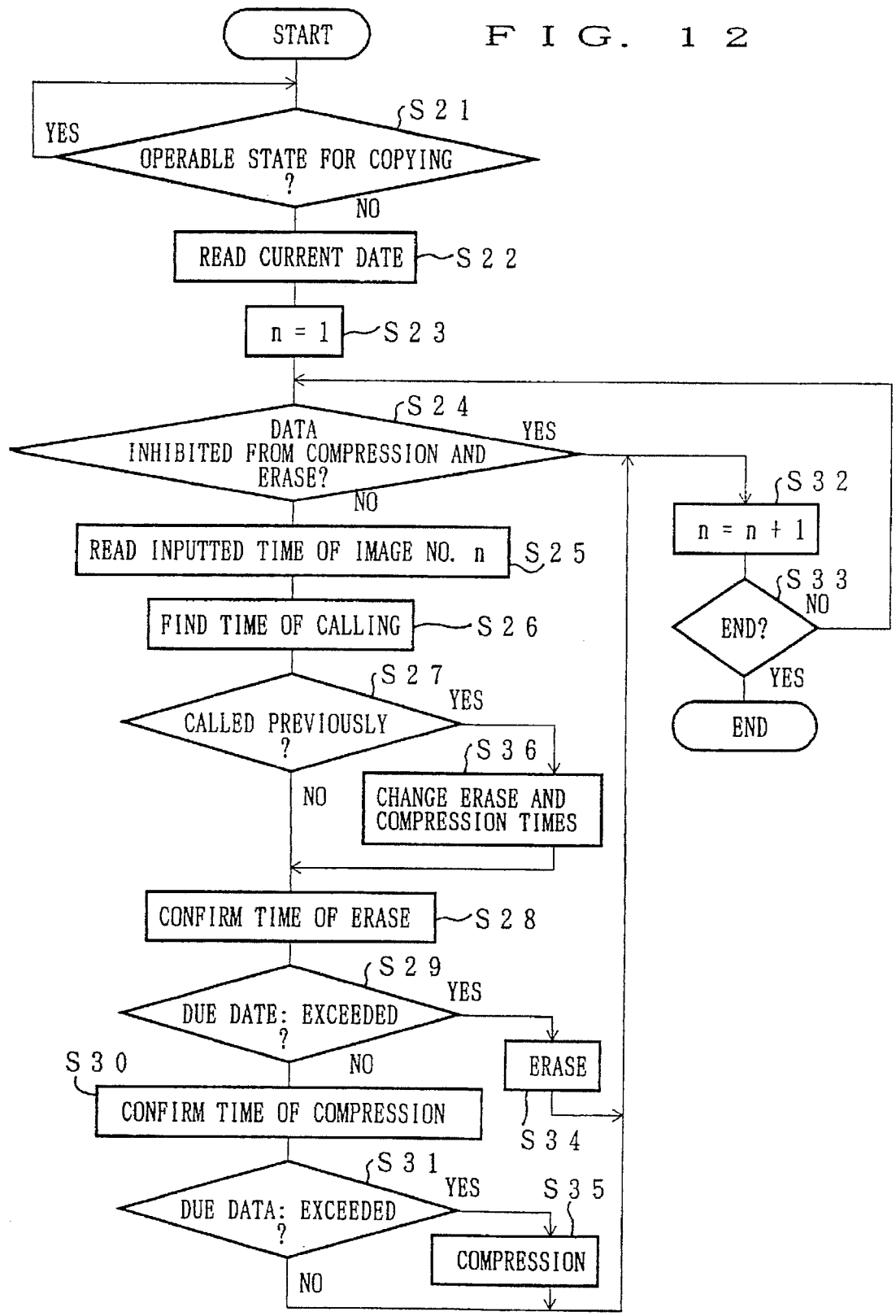
FIG. 12 is a flowchart showing operations of a data storage device of another embodiment of the present invention.
Figure 13:
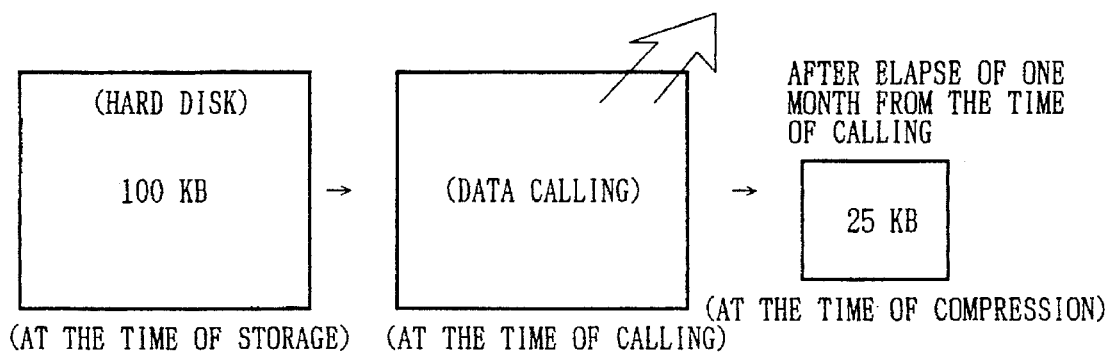
FIG. 13 is an explanatory drawing that shows a compressing operation in the data storage device shown in FIG. 12.

Referring to FIG. 5 as well as FIGS. 12 and 13, the following description will discuss another embodiment of the present invention. Here, for convenience of explanation, those members that have the same functions and that are described in the aforementioned embodiment are indicated by the same reference numerals and the description thereof is omitted.

The data storage device 60 of the present embodiment, which has an arrangement shown in FIG. 5, carries out operations shown in FIG. 12. Here, the number of calls/ calling-time measuring section 61b, shown in FIG. 5, may be designed so that only the time of calling is measured.

As shown in FIG. 12, in the present data storage device 60, if image data having the No. that has been specified at S23 is not the one whose compression and erase should be inhibited (S24), the time of storage of the image data is read out (S25), and then the time of the last calling is found with respect to the image data (S26). Next, if the image data was called for in the past, that is, if the image data has ever been outputted as copied images, the times of erasing and compressing processes are respectively changed to, for example, 6 months and one month after the time of the last calling (S36). Then, the processes thereafter are carried out based on the times of erasing and compressing processes that have been thus changed. On the other hand, at S27, if the image data has never been called for before, the processes thereafter are carried out based on the times of erasing and compressing processes that have been preliminarily set.

Here, operations of S21 through S25 as well as S28 through S35 except for S26, S27 and S36, are the same as those of S1 through S5 as well as S8 through S15 which are shown in FIG. 1, and the explanations thereof are omitted.

For example, the compressing processes, which are carried out in S26, S27, S36, S30 and S35 on image data that has been called for before, are arranged so that as shown in FIG. 13, certain images stored in the second memory 63d are compressed, for example, one month after the time of the last calling.

In the above-mentioned operations, image data, which have a high-frequency of use, that is, a relatively high degree of importance, are properly stored in the limited storage capacity of the second memory 63d, compared with the case where the stored data in the second memory 63d are simply processed in accordance with the times of compressing and erasing processes that have been preliminarily set. The other functions are the same as those shown in the aforementioned embodiment 1.

Embodiment 3

Figure 14:
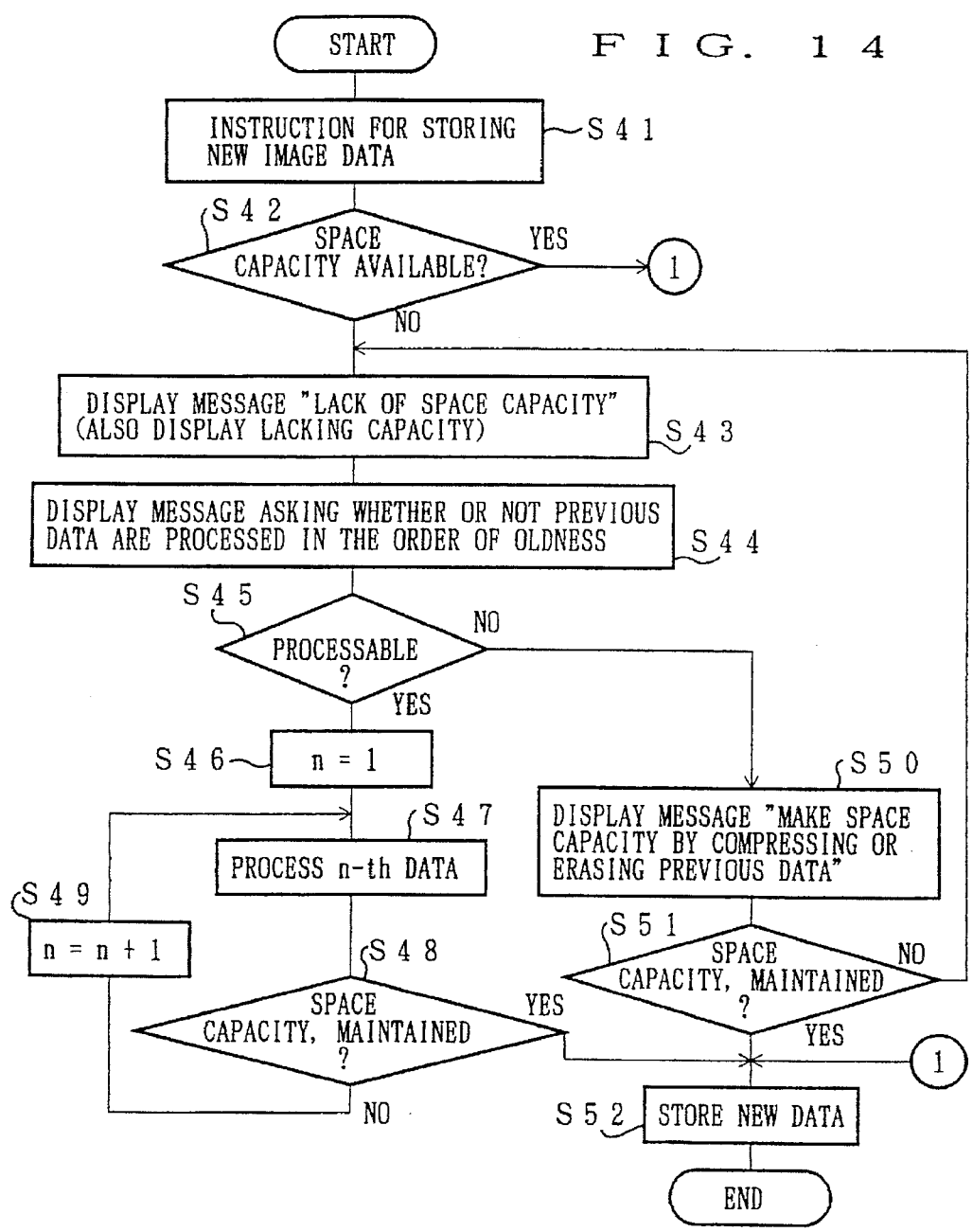
FIG. 14 is a flowchart showing operations of a data storage device of still another embodiment of the present invention.

Referring to FIG. 5 and FIG. 14, the following description will discuss another embodiment of the present invention. Here, for convenience of explanation, those members that have the same functions and that are described in the aforementioned embodiment are indicated by the same reference numerals and the description thereof is omitted.

The data storage device 60 of the present embodiment, which has an arrangement shown in FIG. 5, carries out operations shown in FIG. 14 when an instruction for inputting new image data is given. Accordingly, in the present data storage device 60, it is not necessary to install the compressing-time measuring section 64a, the erasing-time measuring section 65a and the number of calls/calling-time measuring section 61b which are shown in FIG. 5. Further, in the present embodiment, the compression/erase control section 61c forms a detection means for the amount of newly storing data, a remaining-capacity detection means and a detection means. Moreover, respective remaining-capacity increasing-process means are formed by the compression/erase control section 61c and the compression processing section 64b as well as the compression/erase control section 61c and the erase processing section 65b.

As shown in FIG. 14, when an instruction for storing new image data is entered through the operation key 61d (S41), the image is read by the reading section 62, and the image data thus obtained are stored in the first memory 63b. The compression/erase control section 61c recognizes the amount of the image data that have been newly inputted and stored in the first memory 63b, and makes a judgment as to whether or not there is a sufficient space capacity in the second memory 63d to store the data (S42).

In this judgment, if there is a sufficient space capacity, the sequence proceeds to S52, thereby allowing the new image data to be stored in the second memory 63d. In contrast, if there is not a sufficient space capacity, a message showing "lack of space capacity" is given on the display section 61e together with a display showing the lacking capacity (S43). Successively, a message is displayed so as to call for an input that determines whether or not the previously stored data should be processed in the order of oldness thereof (S44). This process is either a compressing process or an erasing process on the image data.

Thereafter, if the input for permitting the process is given (S45), the No. of image data to be processed is set to that of the oldest data in its storage date (data of n=1) (S46), and a compressing or erasing process is carried out on the image data in question (S47). When a sufficient space capacity is provided through this process (S48), the sequence proceeds to S52, thereby allowing the new data to be stored.

In contrast, if a sufficient space capacity is not provided, the same processes are successively carried out on image data in the order of oldness (S49, S47) until a sufficient space capacity is obtained, and the new data is thus stored.

Moreover, if the input for inhibiting the process is given at S45, a message saying "make a space capacity by compressing or erasing previous data" is given on the display section 61e (S50). Then, after a sufficient space capacity has been maintained through a process manually carried out by the user in accordance with the message (S51), the new data is stored in the second memory 63d.

The above-mentioned operation is more specifically described as follows, for example, with respect to the compressing process. In this case, let us suppose that various conditions are set as follows:

capacity of the second memory 63d: 100 MB
number of previously stored data : 10 in the order of oldness;
n=1: 10 MB, n=2: 5 MB, n=3: 6 MB, . . .
total amount of previously stored image data: 95 MB
amount of new image data: 20 MB
compressing ratio of image data: 20%
(amount of data after compression is 80%)

Here, calculations that are carried out to obtain a sufficient capacity to store the new image data (20 MB) are shown as follows.

current space capacity of the second memory 63d: 100−95=5 (MB)
amounts of respective image data after compression:
n=1: 10×0.8=8 (MB)
n=2: 5×0.8=4 (MB)
n=3: 6×0.8=4.8 (MB)

As described above, a storage capacity that is obtained by compressing the image data up to n=3 is represented by: 5+8+4+4.8=21.8 (MB)>20 (MB). Thus, new image data of 20 MB can be stored in the second memory 63d.

Additionally, in the above-mentioned operation, at S44 and S45, the processes are carried out in accordance of the user's instruction for permitting or inhibiting the processes. However, another operation may be adopted wherein, for example, a display indicating that the previously stored data are to be processed in the order of oldness is given at S44, and at S45 a waiting time for a predetermined period is provided so that the corresponding process is carried out if no input for inhibiting the process is given by the user during this period.

As described above, in the data storage device 60 of the present embodiment, every time new image data is inputted for storage, some image data previously stored in the second memory 63d are compressed or erased, and this process is automatically carried out in accordance with an instruction from the user for permitting or inhibiting the process. Therefore, it is possible to efficiently maintain necessary data within the storage capacity without imposing a greater workload on the user, while effectively utilizing the limited storage capacity, that is, while reducing adverse effects on the data stored in the storage means to a minimum.

Embodiment 4

Referring to FIGS. 15 through 21, the following description will discuss one embodiment of a network printer system of the present invention.

Figure 15:
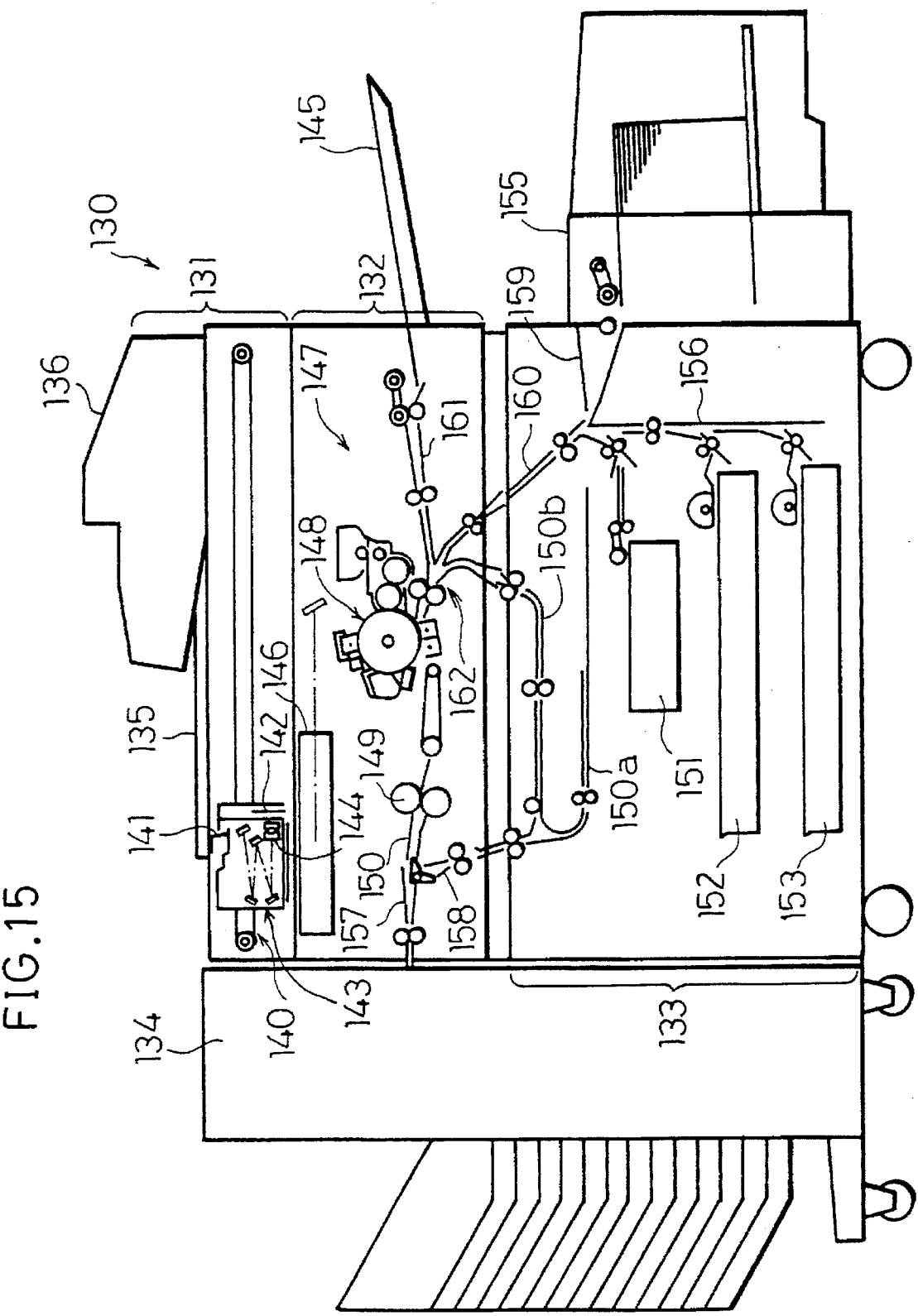
FIG. 15 is a cross-sectional view showing the entire structure of a digital copying machine that is used in a network printer system of still another embodiment of the present invention.

FIG. 15 is a cross-sectional view showing the entire structure of a digital copying machine that is used as a printer provided in the network printer system of the present embodiment.

As shown in FIG. 15, the digital copying machine 130 has a scanner section 131, a laser printer section 132, a multi-stage feeding unit 133, and a sorter 134.

The scanner section 131 is provided with a document platen 135 made of a transparent glass, an automatic document feeder (RDF) 136 for two-sided copies, and a scanner unit 140.

The multi-stage feeding unit 133 has the first cassette 151, second cassette 152, third cassette 153 and fourth cassette 155 that can be added when selected. In the multi-stage feeding unit 133, sheets of copy paper are fed sheet by sheet from stacks of copy paper housed in the cassettes of respective stages, and sent to the laser printer section 132. In the RDF 136, a plurality of documents, which are set as one stack, are automatically sent sheet by sheet to the scanner unit 140 where one side or two sides of a document is read based on the selection made by the user. The scanner unit 140 is provided with a lamp reflector assembly 141 for exposing a document, a plurality of reflection mirrors 143 for directing a reflected light image from the document to a charge coupled device (CCD) 142, and a lens 144 for converging the reflected light image from the document onto the CCD 42. In the scanner section 131, in the case of scanning the document placed on the document platen 135, the document image is read while the scanner unit 140 is moving along the bottom surface of the document platen 135, and in the case of using the RDF 136, the document image is read while the document is being transported, with the scanner unit 140 stopped at a predetermined station below the RDF 136.

Image data, which has been obtained by scanning the document image using the scanner 140, is sent to an image-processing section, not shown, which will be described later, where various processes are applied to the data, and is temporarily stored in a memory in the image processing section. The image data, stored in the memory, is sent to the laser printer section 132 in accordance with an instruction for output, and its image is formed on a sheet of copy paper. The laser printer 132 has a manual-feeding document tray 145, a laser writing unit 146, and an electrophotographic processing section 147 for forming images. The laser writing unit 146 is provided with a semiconductor laser, not shown, for emitting a laser light beam that is representative of the image data from the memory, a polygon mirror for polarizing the laser light beam at a constant angular velocity, an f–θ lens for correcting the laser light beam that has been polarized at the constant angular velocity so that it is polarized at a constant velocity on a photoconductive drum 148 in the electrophotographic processing section 147, and other members. The electrophotographic processing section 147, which has a well-known construction, is constituted of a main charger, a developing device, a transferring device, a removing device, a cleaning device, a charge-eliminating device and a fixing device 149 all of which are placed around the photoconductive drum 148.

At the down-stream side of the fixing device 149 in the transporting direction of copy paper on which images are formed, a transport path 150 is installed, and the transport path 150 is separated into a transport path 157 which connects to the sorter 134 and a transport path 158 which connects to the multi-stage feeding unit 133. The transport path 158 is separated at the multi-stage feeding unit 133 into a reversal transport path 150a used for two-sided copies, and a two-sided/composite-copy-use transport path 150b used for two-sided copies as well as composite copies. The reversal transport path 150a is a transport path that is used for reversing the sides of a sheet of copy paper in the two-side copying mode for copying two sides of a document.

The two-sided/composite-copy-use transport path 150b transports sheets of copy paper from the reversal transport path 150a to the image-forming station of the photoconductive drum 148 in the two-side copying mode, or transports sheets of copy paper to the image-forming station of the photoconductive drum 148 without reversing the copy paper in the multi-face composite copying mode. In the multi-face composite copying mode, a composite copying operation is conducted, wherein an image is formed on one side of copy paper by using images from different documents or using toners having different colors.

The multi-stage feeding unit 133 includes a common transport path 156, and the common transport path 156 is arranged so that sheets of paper from the first cassette 151, the second cassette 152 and the third cassette 153 are transported toward the electrophotographic processing section 147. The common transport path 156 joins the transport path 159 from the fourth cassette 155 on its way to the electrophotographic processing section 147, and connects to a transport path 160. The transport path 160 joins the two-sided/composite-copy-use transport path 150b and a transport path 161 from the manual-feeding document tray 145 at a joining point 162, and they connect to the image-forming station between the photoconductive drum 148 and the transferring device in the electrophotographic processing section 147. The joining point 162 of these three transport paths is placed at a position close to the image-forming station.

Thus, in the laser writing unit 146 and the electrophotographic processing section 147, image data, read from the memory, is outputted as a laser light beam by the laser writing unit 146, and is formed on the surface of the photoconductive drum 148 as an electrostatic latent image. This electrostatic latent image is visualized by toner from the developing device to form a toner image. The toner image is electrostatically transferred onto a sheet of copy paper that has been transported from the multi-stage feeding unit 133, and then is subjected to a fixing process. The sheet of paper bearing the image is sent to the sorter 134 from the fixing device 149 through the transport paths 150 and 157, or is sent to the reversal transport path 150a through the transport paths 150 and 158.

Figure 16:
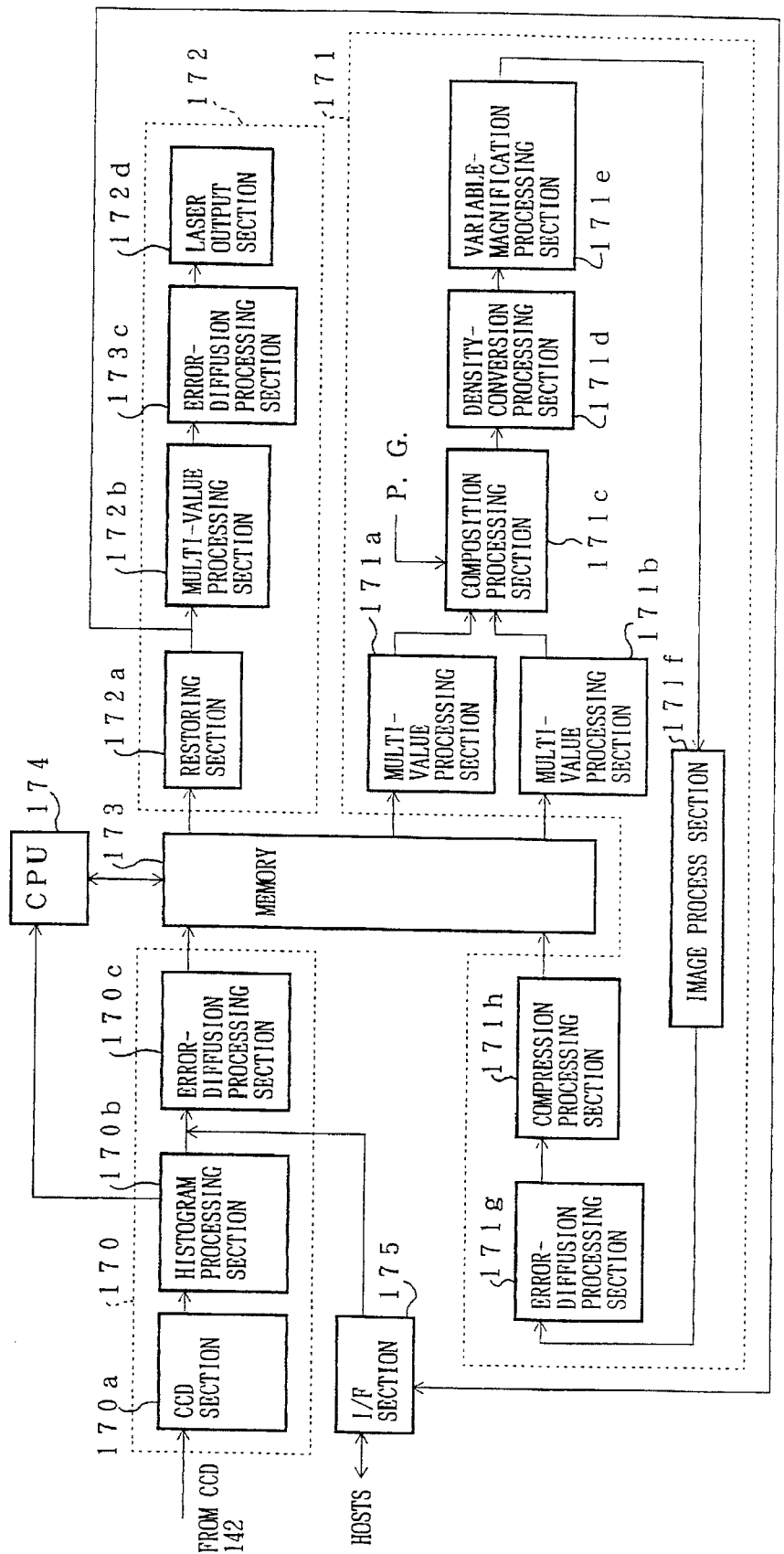
FIG. 16 is a block diagram showing an image-processing section that is provided in the digital copying machine.

The following description will discuss the arrangement and functions of an image-processing section installed in this digital copying machine 130. FIG. 16 is a block diagram showing the image-processing section that is installed in the digital copying machine 130 of FIG. 15.

The image-processing section, installed in the digital copying machine 130, is provided with an image-data input section 170, an image-processing section 171, an image-data output section 172, a memory 173 that is constituted of a RAM (Random Access Memory) and other members, and a central processing unit (CPU) 174.

The image-data input section 170 has a CCD section 170a, a histogram processing section 170b and an error-diffusion processing section 170c. The image-data input section 170 converts image data of the document, which has been read by the CCD 142 shown in FIG. 15, into binary digits, and while their histograms are being formed as binary digital quantities, the image data is processed by the error-diffusion method, and temporarily stored in the memory 173. In other words, in the CCD section 170a, analog electric signals, which correspond to respective pixel densities of the image data, are A/D (analog to digital) converted, and subjected to an MTF correction, a black-and-white correction, or a gamma correction, and then released to the histogram processing section 170b as digital signals of 256 gradations (8 bits). In the histogram processing section 170b, the digital signals, released from the CCD section 170a, are added in a separate manner into the respective pixel densities of 256 gradations to form density information (histogram data), and the histogram data thus obtained is sent to the CPU 174, if necessary, or is sent to the error-diffusion processing section 170c as image data. In the error-diffusion processing section 170c, the digital signals of 8 bits/pixel, released from the CCD section 170a, are converted into 1 bit (binary) through the error-diffusion method that is one type of pseudo-half-tone processing and that is a method wherein errors due to the binary conversion are reflected on binary decision between adjacent pixels, and calculations for re-distribution are carried out in order to accurately reproduce partial-area densities in the document.

The image-processing section 171 is provided with multi-value processing sections 171a and 171b, a composition processing section 171c, a density-conversion processing section 171d, a variable-magnification processing section 171e, an image process section 171f, an error-diffusion processing section 171g, and a compression processing section 171h.

The image-processing section 171 is a processing section wherein inputted image data is eventually converted into image data that is desired by the operator, and the inputted image data is processed in the images processing section until it is converted and finally stored in the memory 173 as outputted image data. Here, the above-mentioned processing sections contained in the image-processing section 171 are allowed to function on demands, and are not necessarily allowed to function. More specifically, in the multi-value processing sections 171a and 171b, the data, which has been converted into binary digits by the error-diffusion processing section 170c, is again converted into data having the 256 gradations. In the composite processing section 171c, logical operations, such as OR operation, AND operation or EXCLUSIVE-OR operation, are selectively carried out for each pixel. The data which are used in these operations are pixel data stored in the memory 73 and bit data from the pattern generator (PG).

In the density-conversion processing section 171d, the relationship between an input density and an output density is predeterminately set based on a given gradation-conversion table with respect to the digital data having the 256 gradations. In the variable-magnification processing section 171e, pixel data (density value), which relate to the pixel in question after having been subject to a magnification, are found by conducting an interpolating process on the known data that have been inputted, in accordance with the specified magnification rate, and a variable-magnification processing is first carried out in the sub-scanning direction, and then is carried out in the scanning direction. In the image process section 171f, various image-processing operations are carried out on the inputted pixel data, and information collections, such as feature extraction, are carried out with respect to data rows. In the error-diffusion processing section 171g, processes, which are similar to those of the error-diffusion processing section 170c in the image-data input section 170, are carried out. In the compression processing section 171h, the binary data are compressed based on a coding process called "run length". Further, with respect to compression of image data, the compressing process is operated at the time of completion of final output image data, that is, in the last processing loop.

The image-data output section 172 is provided with a restoring section 172a, a multi-value processing section 172b, an error-diffusion processing section 172c, and a laser output section 172d.

The image-data output section 172 restores image data that have been stored in the memory 173 in a compressed state, converts them again into those having the 256 gradations, carries out an error-diffusing process using quarternary data that provides smoother intermediate gradations than that using binary data, and transfers the resulting data to the laser output section 172d. In other words, the restoring section 172a restores the image data that have been compressed by the compression processing section 171h. In the multi-value processing section 172b, processes are carried out in the same manner as the multi-value processing sections 171a and 171b in the image-data processing section 171. In the error-diffusion processing section 172c, processes are carried out in the same manner as the error-diffusion processing section 170c in the image-data input section 170. In the laser output section 172d, digital image data are converted into ON/OFF signals for the laser in accordance with control signals from a sequence controller, not shown, and the laser light is thus turned on and off.

Here, the data, which are processed in the image-data input section 170 and the image-data output section 172, are stored in the memory 173 basically as binary data in order to cut the capacity of the memory 173, but the data can be processed as quarternary data in order to prevent degradation in image data.

Next, an explanation will be given of an interface section. The interface section 175 receives data sent from a host, and sends them to the error-diffusion processing section 170c in the image-data input section 170. The data is temporarily stored in the memory 173 in the same manner as described above, and is printed out at the image-data output section 172. Moreover, image data in the memory 173 is sent to the interface section 175 through the restoring section 172a of the image-data output section 172, from which the image data is sent to a host. Thus, the host can receive image data from the image-data input section 170.

Figure 17:
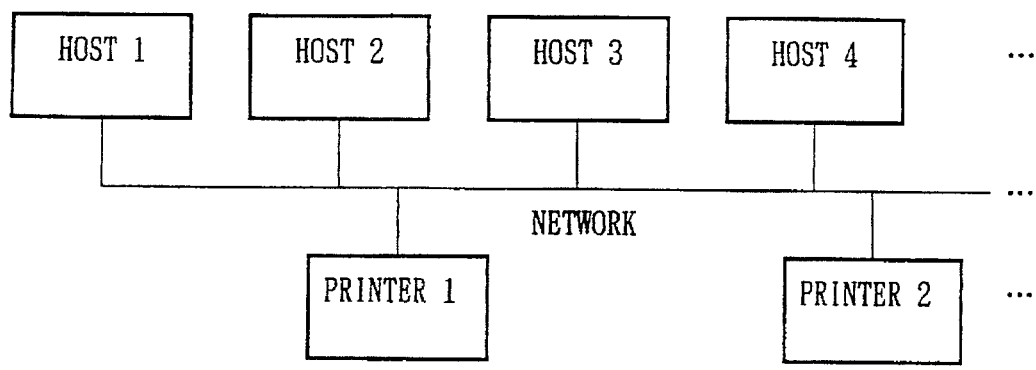
FIG. 17 is a block diagram showing a network between commonly-used host computers and a printer.

FIG. 17 shows a commonly-used network between host computers and printers. The host computers are connected to the printers, and data are transmitted between the host computers, while printing operations are carried out by sending data from the host computers to the printers. The size of the system construction ranges from a system having just one host computer and one printer to a system having n-host computers and n-printers. Further, there are also systems of the server type wherein a plurality of separated host computers are connected to host computers. Moreover, the printers range from those having a single function to those having multiple functions, such as digital copying machines wherein image data from host computers are stored, and processed.

Figure 18:
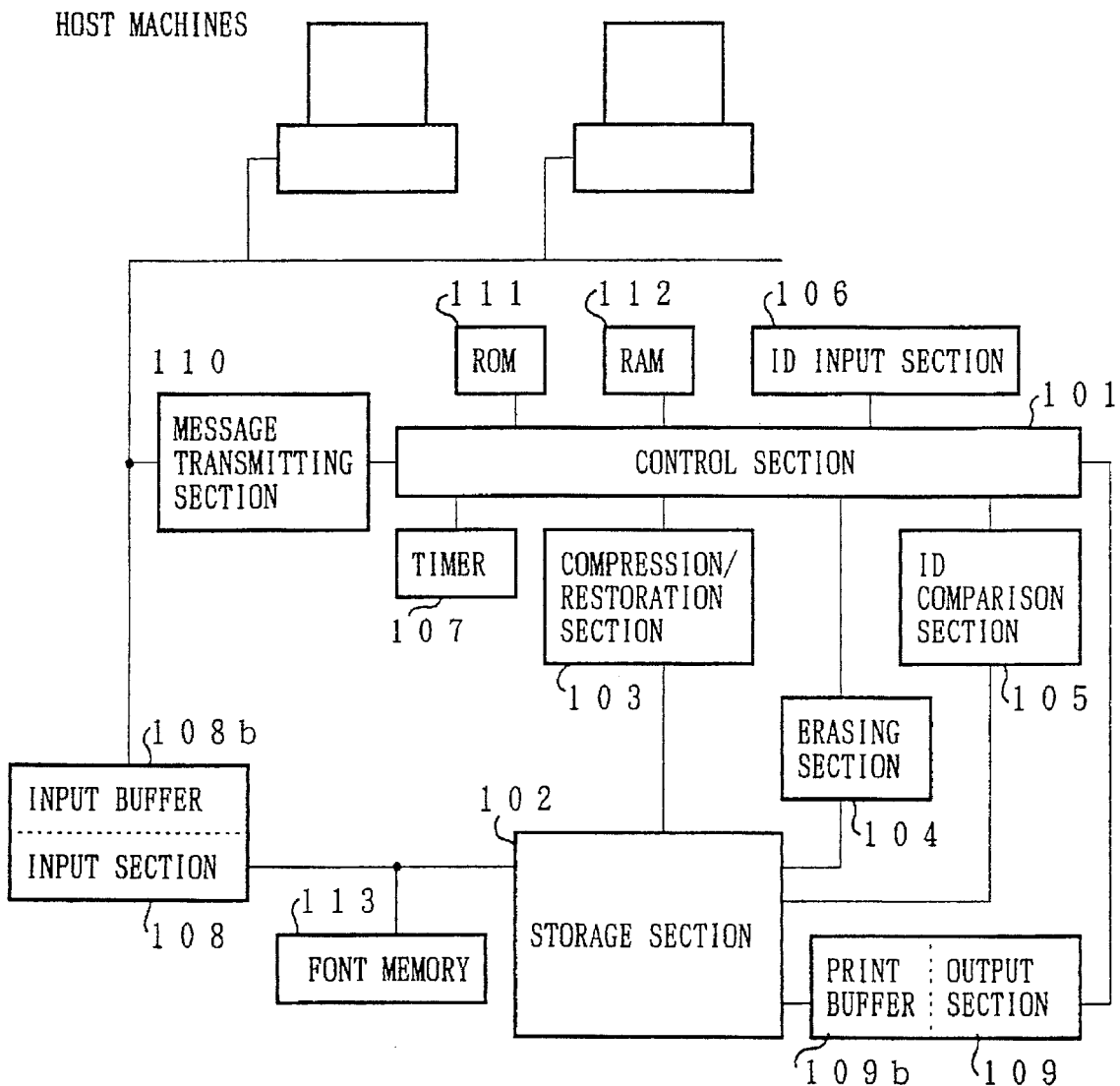
FIG. 18 is a block diagram showing a system arrangement of the network printer system.

FIG. 18 is a block diagram showing a construction of a network system in accordance with the present embodiment.

Printers are commonly connected to a plurality of host machines on a network. The host machines are image/character-data forming apparatuses, such as computers and wordprocessors. The printer is provided with a control section 101, a storage section 102, a compression/restoration section 103, an erasing section 104, an ID comparison section 105, an ID input section 106, a timer 107, an input section 108 having an input buffer 108b, an output section 109 having a print buffer 109b, a message transmitting section 110, a ROM 111, a RAM 112, and font memory 113.

Since the operation speed of the printer is generally slower than that of the host machine, an input buffer 108b, which temporarily receives and holds confidential print data transmitted from host machines, is installed in the input section 108. Thus, after having received the confidential print data, the input buffer 108b transfers them to the storage section 102 so that it becomes possible to reduce the occupied time of lines which is caused by data transmission between the host machines and printers.

The following sections are connected to the control section 101: the ROM 111 which stores programs for controlling the entire system of a printer, the RAM 112 which functions as a working memory, the timer 107 for counting predetermined times, the compression/restoration section 103 which has programs for achieving compression and restoration of confidential print data, the erasing section 104 for erasing confidential print data from the storage section 102, the ID input section 106 used for inputting ID codes, the ID comparison section 105 for comparing inputted ID codes with ID codes of the confidential print data stored in the storage section 102, and the message transmitting section 110 which transmits messages, such as a message for urging that the confidential print data stored in the storage section 102 should be printed out, to the host machine in question.

Figure 19:
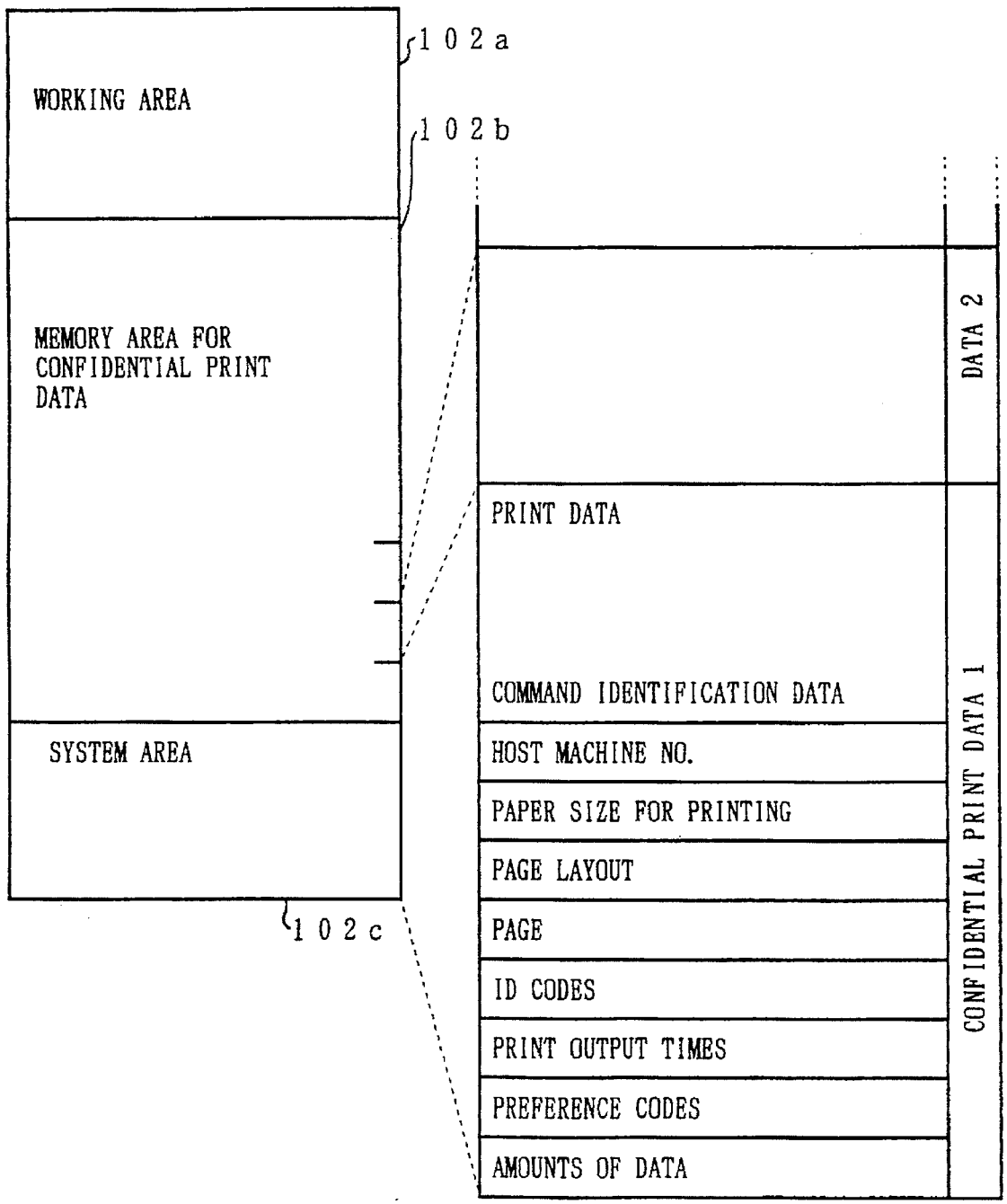
FIG. 19 is a memory map of a storage section.

FIG. 19 shows a memory map of the storage section 102. The storage section 102 has a working area 102a, a memory area 102b for confidential print data, and a system area 102c. Confidential print data, stored in the memory area 102b for confidential print data, are constituted of various information, such as print data, command identification data, host-machine numbers, paper size for printing, page layouts, pages, ID codes, times of print outputs, preference codes, and amounts of data.

The host machines such as word processors, which are connected to the printers, have control codes that are used for controlling the printers at the time of their printing operation. Here, these control codes are represented by the command identification data. The control codes, which differ depending on various machine types, include tab information, those related to formats such as carrier return and page eject, and those representing kinds of data, such as character data and bit image data, all of which are added to the confidential print data, and stored therein.

For example, since bit image data are expected to be compressed at higher rates than character data, it is possible to operate the system effectively by selecting those data containing many bit image data and carrying out compression on those data.

Figure 20:
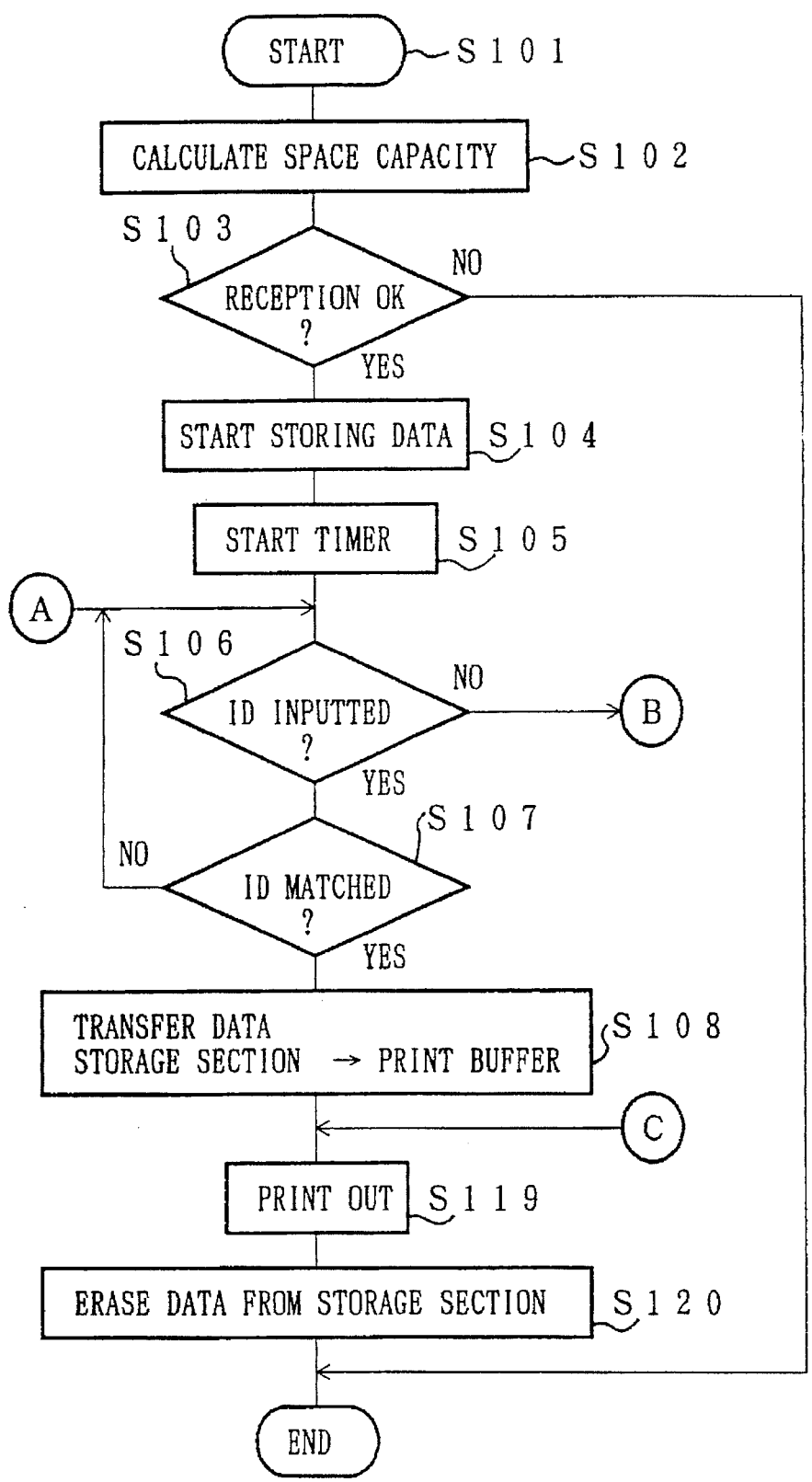
FIG. 20 is a flowchart that explains operations of the network printer system.
Figure 21:
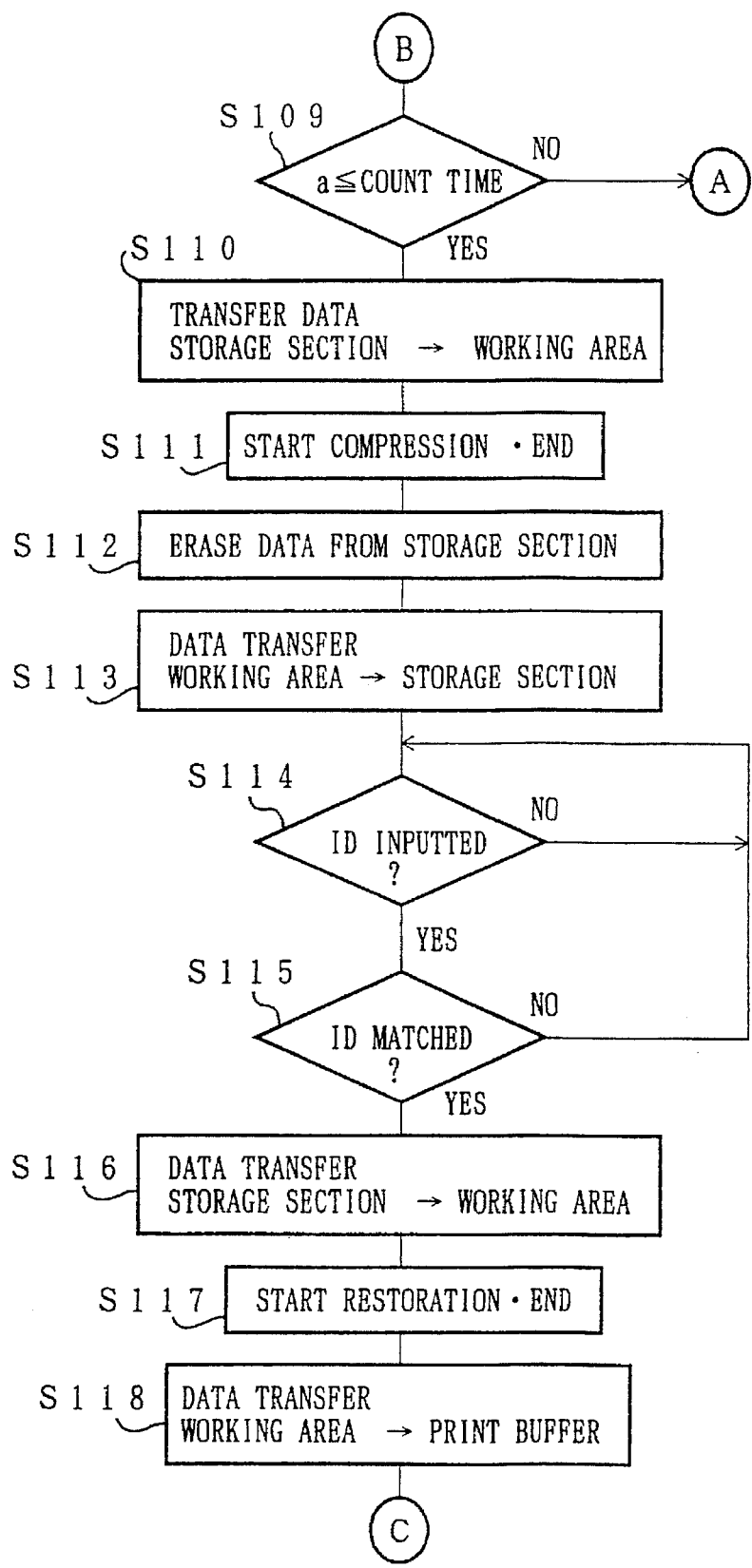
FIG. 21 is a flowchart that explains operations of the network printer system.

Next, referring to flowcharts in FIGS. 20 and 21, the following description will discuss operations of the printers.

One of the host machines sends confidential print data (image data, character data and other data) and an ID code to a printer in order to give the printer an instruction for outputting the confidential print data (S101). Upon receipt of the confidential print data, the printer carries out retrieving and adding operations with respect to the amounts of confidential print data that have already been stored in the storage section 102, and calculates a space capacity in the storage section 102 (S102) so as to check to see whether or not the amount of the new confidential print data is not more than the space capacity and can be received (S103). If the space capacity is not sufficient, the reception of the new confidential print data is rejected, and the operation is completed. If the space capacity is sufficient to store the new confidential print data, the new confidential print data, which has received from the host machine through the input buffer 108b of the input section 108, is transferred to the storage section 102 (the memory area 102b for confidential print data), where a storing operation is started (S104) and the timer 107 is started to count time (S105). After making a judgment as to whether or not an ID code has been inputted from the ID input section 106 (S106), if it has not been inputted, a judgment is made as to whether or not the time counted by the timer 107 has reached a first predetermined time a at which a data compressing operation is to be started (S109). When the first predetermined time a has been reached, the confidential print data, which has been stored in the memory area 102b of the storage section 102, is transferred to the working area 102a (S110), where the compressing program of the compression/restoration section 103 is activated (S111).

In the compressing program, the following methods are used: a method wherein when the same characters continuously appear, the number of the appearances is inscribed in a replaced manner so as to reduce the amount as a whole, and a method wherein codes are changed in accordance with the frequency of appearances so as to shorten characters with high frequencies (MH method, MR method). After the confidential print data has been compressed by such a compressing program, the confidential print data prior to the compression is erased by the erasing section 104 (S112), and then the confidential print data after the compression is again transferred from the working area 102a to the memory area 102b for confidential print data, and stored therein (S113).

Data concerning paper sizes for printing and page layouts, page data and kinds of data, are added to print data transmitted from host machines that include confidential print data. Therefore, in the case of character data, font-bit map data is taken from the font memory 113 that has preliminarily stored print-out data corresponding to various character data, and the character data are converted by using the font-bit map data, and transferred to the print buffer 109b in the output section 109. Thus, the amount of data storage can be reduced by storing the data as character codes.

The printer waits for an ID code to be inputted through the ID input section 106 (S114), and in the ID comparison section 105, a judgment is made as to whether or not the inputted ID code match any of the ID codes stored in the storage section 102 (S115). When these ID codes match each other, the printer gives an instruction for restoration to the restoring program in the compression/restoration section 103, and the restoring program transfers the compressed confidential print data to the working area 102a in the storage section 102 (S116), where the compressed confidential print data is restored (expanded). Upon completion of the restoration (S117), the restored confidential print data in the working area 102a is transferred to the print buffer 109b (S118), and the output section 109 carries out a print-out operation (S119). Then, after the print-out operation has been completed properly, the confidential print data stored in the storage section 102 is erased by the erasing section 104 (S120).

If an ID code has been inputted before the time counted by the timer 107 has reached the first predetermined time a (S106), and if the ID codes match each other (S107), the confidential print data, which has not been compressed and is stored in the storage section 102, is of course transferred to the print buffer 109b (S108), and the output section 109 carries out a print-out operation (S119) and at the same time, the confidential print data in the storage section 102 is erased (S120).

In accordance with the present embodiment, the capacity of the storage device is effectively utilized by compressing received confidential print data on a software basis without the necessity of increasing the hardware capacity of the expensive storage section 102; therefore, it becomes possible to receive more confidential print data.

Embodiment 5

Figure 22:
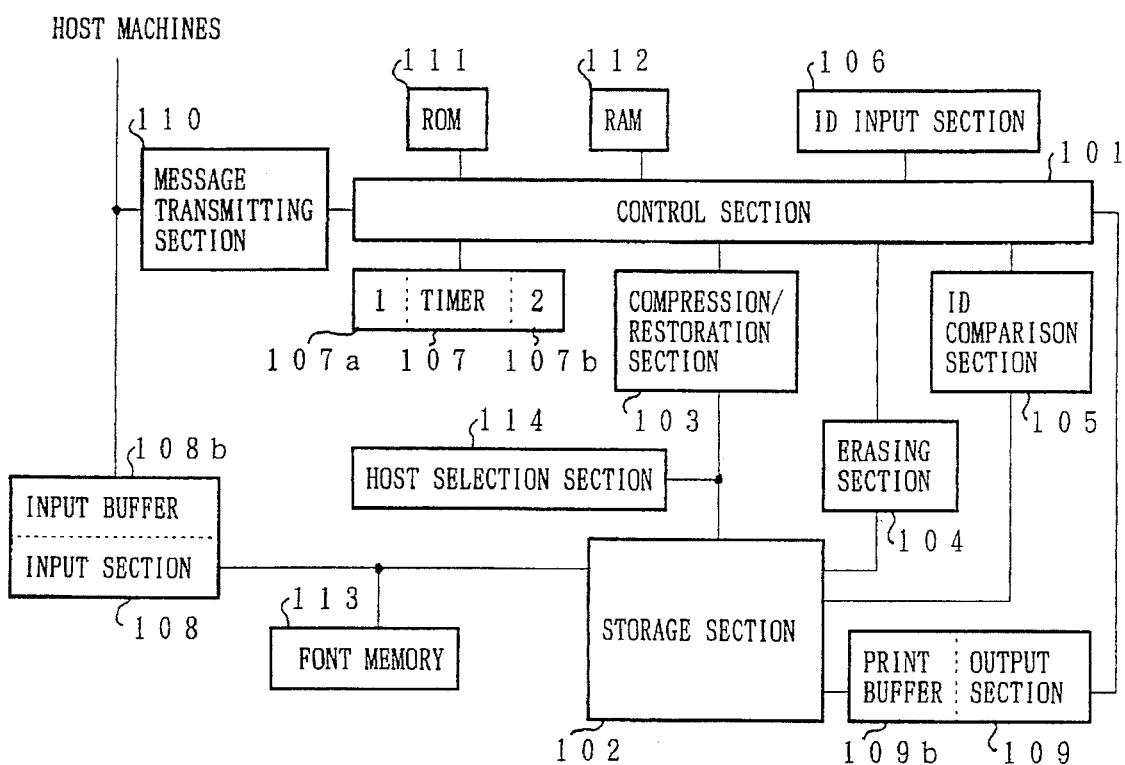
FIG. 22 is a block diagram showing a system arrangement of a network printer system of still another embodiment of the present invention.

FIG. 22 is a block diagram showing an arrangement of a network printer system in accordance with Embodiment 5 of the present invention. The difference of this arrangement from that of Embodiment 4 (FIG. 18) is that a host selection section 114 is added so as to select the host machine which is currently giving an instruction for a confidential print out. Moreover, the timer 107 is provided with a first timer (timer for compression) 107a which counts time until a first predetermined time a and a second timer (timer for demand) 107b which counts time until a second predetermined time b. The second predetermined time b is set to be shorter than the first predetermined time a. Since the other arrangement is the same as Embodiment 4 (FIG. 18), those members that have the same functions are indicated by the same reference numerals and the description thereof is omitted.

Figure 23:
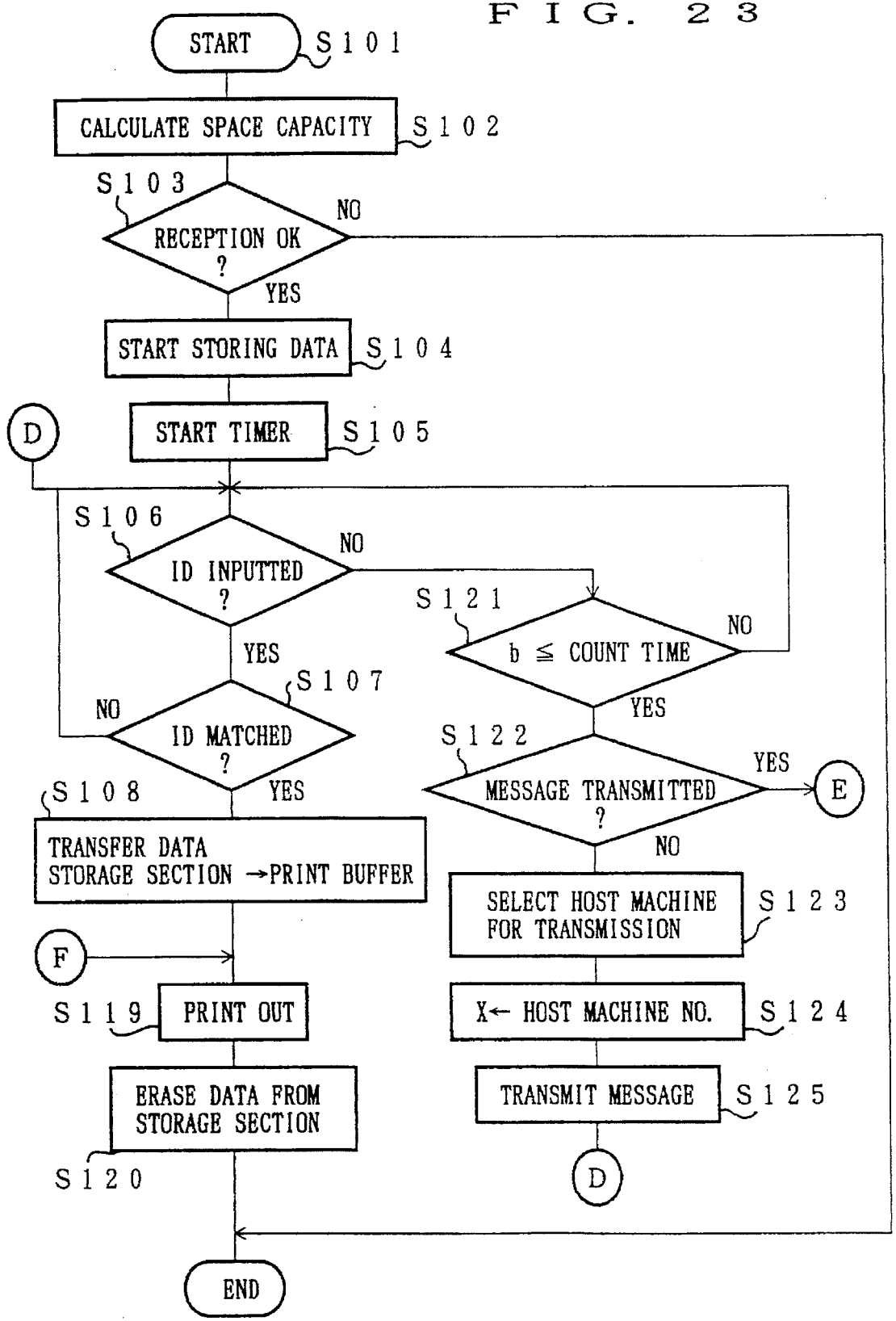
FIG. 23 is a flowchart that explains operations of the network printer system.
Figure 24:
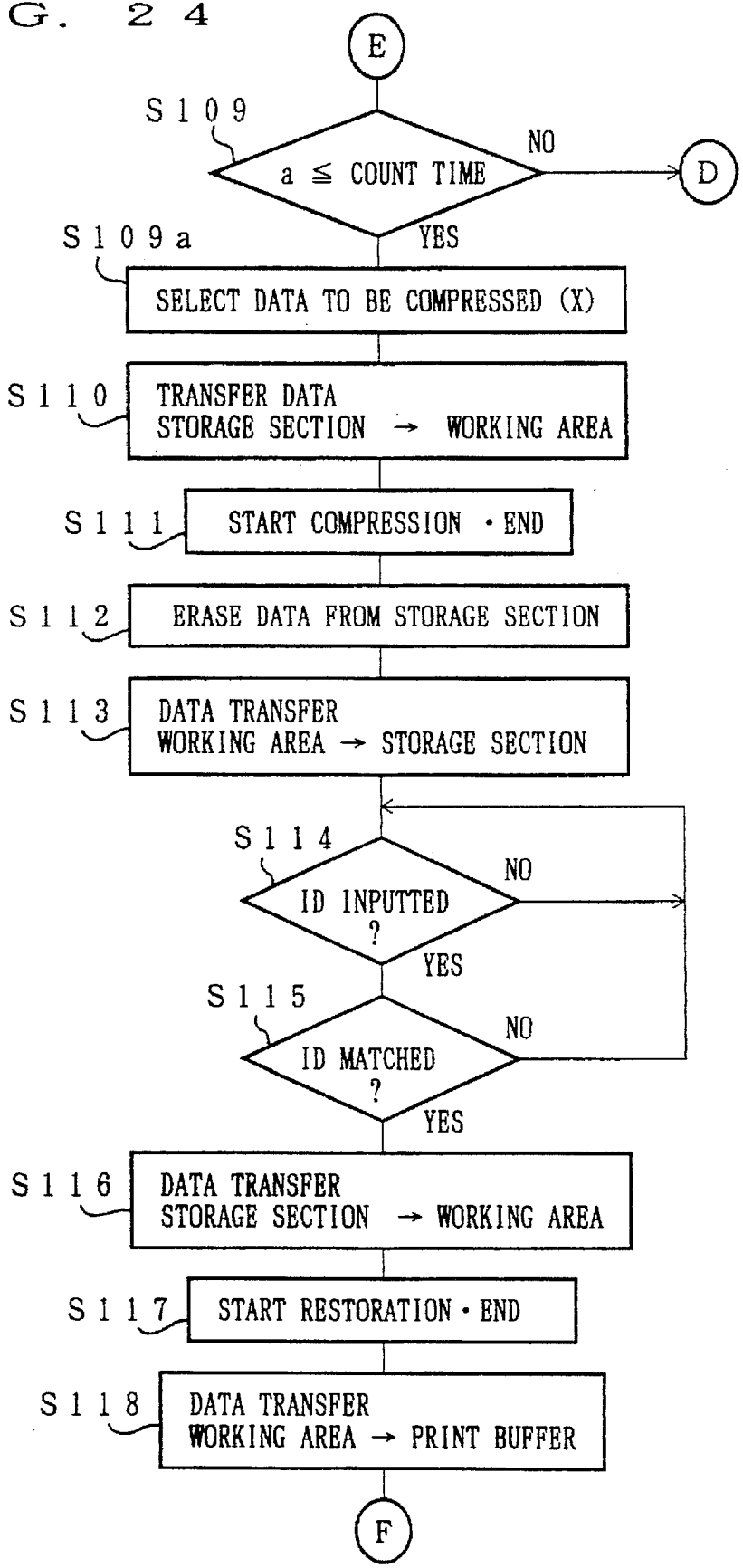
FIG. 24 is a flowchart that explains operations of the network printer system.

Next, referring to FIGS. 23 and 24, an explanation is given of the operations of the printer in the present embodiment.

Respective host machine numbers are allocated to a plurality of host machines, and when each host machine gives an instruction for a confidential print out to a printer, it also transmits its host machine number together with confidential print data and an ID code (S101). Steps from S102 to S108 are the same as those of Embodiment 4 (FIG. 20).

When the second timer 107b has counted up the second predetermined time b (S121), a judgment is made as to whether or not a message calling for a print-out operation has been transmitted (S122). If the message has not been transmitted, host machine numbers and ID codes are extracted from the ID storage section in the storage section 102, and the host selection section 114 selects the host machine in question that has given the instruction for a confidential print out (S123). Then, its host machine number is stored in an register X (S124), and the message transmitting section 110 transmits the message calling for a print-out operation to the selected host machine (S125). Upon receipt of the message, the host machine displays the message calling for a print-out operation on its display screen. When the user, who sees the message, inputs an ID code to start a print-out operation, the confidential print data in question is printed out through the steps S106 through S108 as well as S119 and S120, without being subjected to a compressing process.

Further, in the case when the confidential print data in question has not been printed out even after the message calling for a print-out operation has been transmitted (S122), if the first timer 107a has counted up the first predetermined time a (S109), the confidential print data to be compressed, which corresponds to the stored host machine number and which is stored in the storage section 102, is selected based on the host machine number that has been set in the register X (S109a). Then, the same processes (S110 through S118 as well as S119 and S120) as Embodiment 4 are carried out. In other words, the confidential print data in question is compressed, and restored upon receipt of an input of the ID code, so as to be printed out.

Prior to compressing the received confidential print data, the message calling for a print-out operation is transmitted to the host machine that has given the instruction for a confidential print out. Therefore, a high possibility of print-out operations can be expected, and this arrangement is beneficial in maintaining more spaces in the capacity of the storage section 102.

Embodiment 6

Figure 25:
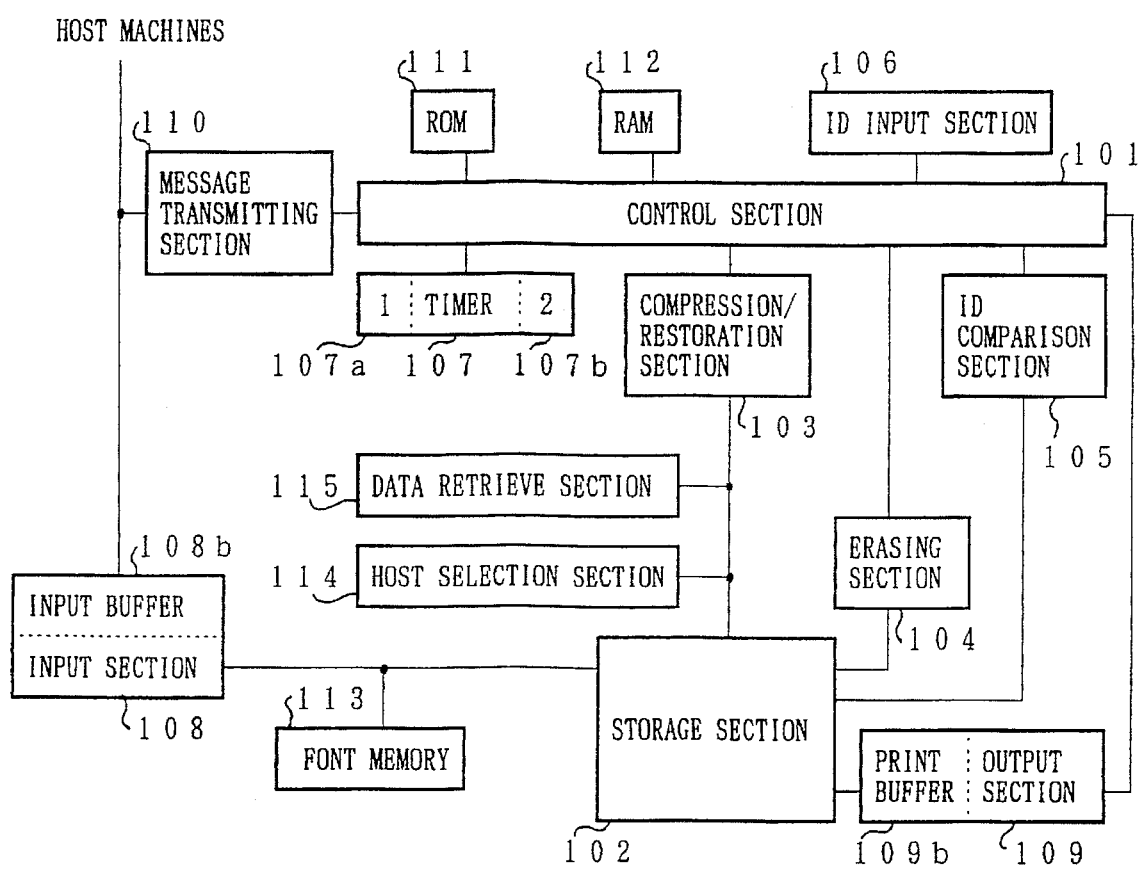
FIG. 25 is a block diagram showing a system arrangement of a network printer system of still another embodiment of the present invention.

FIG. 25 is a block diagram showing an arrangement of a network printer system in accordance with Embodiment 6 of the present invention. The difference of this arrangement from that of Embodiment 5 (FIG. 22) is that the host selection section 114 is designed to select the host machine that gave an instruction for a confidential print out last from those host machines that have given such an instruction, and that a data retrieve section 115 is added so as to retrieve the order of receipts of instructions for confidential print from a plurality of host machines. Since the other arrangement is the same as Embodiment 5, those members that have the same functions are indicated by the same reference numerals and the description thereof is omitted.

Figure 26:
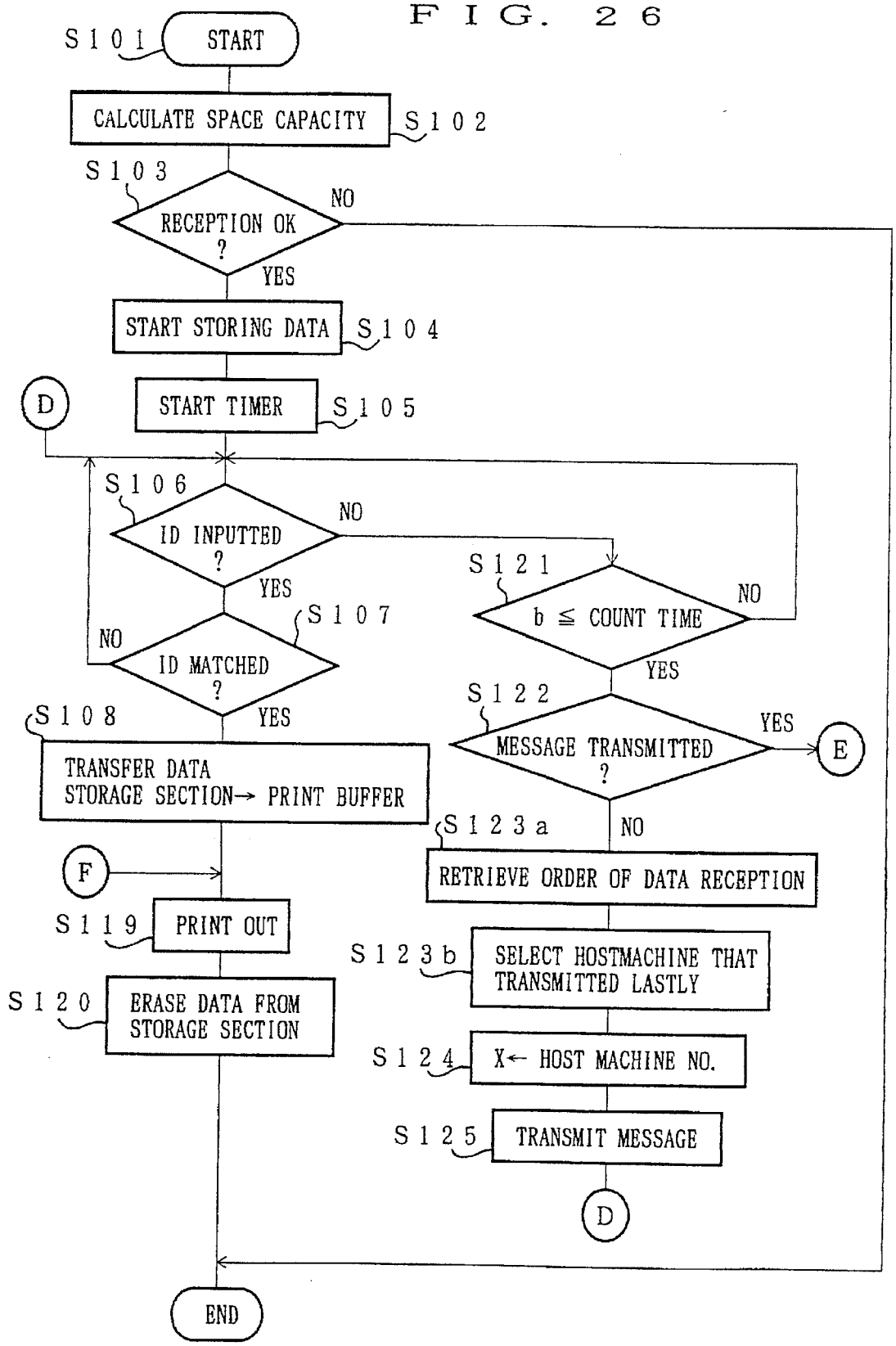
FIG. 26 is a flowchart that explains operations of the network printer system.

Next, referring to FIG. 26 and the aforementioned FIG. 24 that follows FIG. 26, an explanation is given of the operations of the printer in Embodiment 6.

Each time a host machine gives an instruction for a confidential print out to the printer, the printer registers the order in which the instructions for confidential print-outs were received, and the data that indicates the order of receipt is stored in the ID storage section in storage section 102 together with confidential print data, its ID code and host machine number (S101). The steps S102 through S108 are the same as those of Embodiment 5 (FIG. 23).

In the case when the message calling for a print-out operation has not been transmitted (S122) even after the second timer (timer for demand) 107b has counted up the second predetermined time b (S121), the data retrieve section 115 extracts the data that indicates the order of receipt from data in the ID storage section of the storage section 102 (S123a), and the host selection section 114 selects the host machine that gave an instruction for a confidential print out last (S123b). Then, its host machine number is stored in a register X (S124), and the message transmitting section 110 transmits the message calling for a print-out operation to the selected host machine (S125). Upon receipt of the message, the host machine displays the message calling for a print-out operation on its display screen. When the user, who sees the message, inputs an ID code to start a print-out operation, the confidential print data in question is printed out through the steps S106 through S108 as well as S119 and S120, without being subjected to a compressing process.

The steps S109 through S120, which are carried out at the time of "YES" at S122, are the same as those of Embodiment 5 (FIG. 24).

In the case when instructions for confidential print are given from a plurality of host machines, the message calling for a print-out operation is given to the host machine that last gave the instruction for a confidential print out, that is, to the machine that is the least likely to be unattended. Therefore, it is possible to reduce the occupied time of the storage section 102 of the printer with high possibilities.

Embodiment 7

The arrangement of a network printer system in accordance with Embodiment 7 of the present invention is shown in a block diagram of FIG. 25 in the same manner. The difference of this arrangement from that of Embodiment 6 is that the host selection section 114 is designed to select the host machine that gave an instruction for a confidential print out earliest (oldest instruction) from those host machines that have given such an instruction. The other arrangement is the same as Embodiment 6 (FIG. 25).

Figure 27:
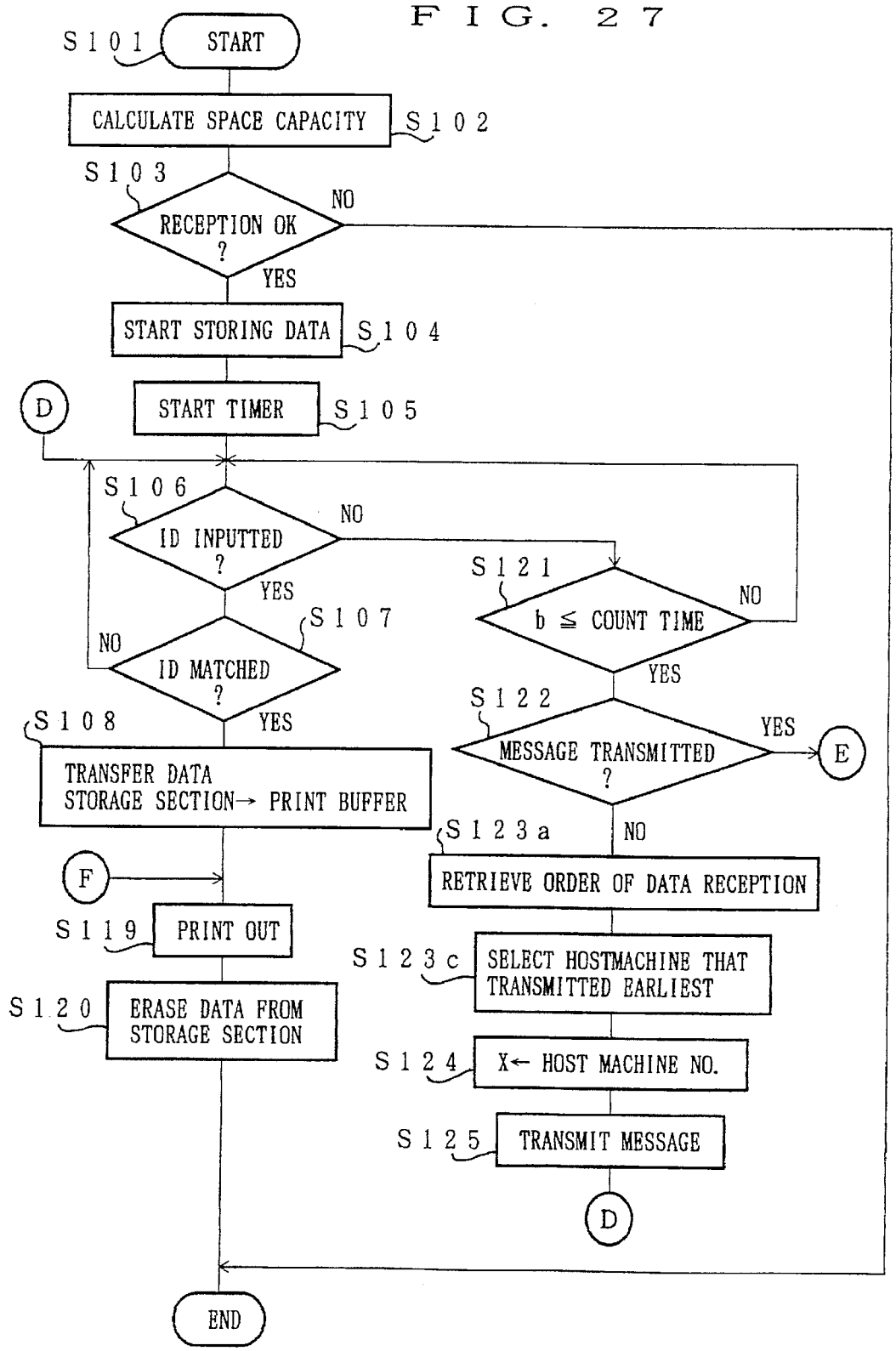
FIG. 27 is a flowchart that explains operations of the network printer system.

Next, referring to FIG. 27 and the aforementioned flow-chart of FIG. 24 that follows FIG. 27, an explanation is given of the operations of the printer in Embodiment 7.

Each time a host machine gives an instruction for a confidential print out to the printer, the printer registers the order in which the instructions for confidential print-outs were received, and the data that indicates the order of receipt is stored in the ID storage section in the storage section 102 together with confidential print data, its ID code and host machine number (S101). The steps S102 through S108, including S101, are the same as those of Embodiment 6 (FIG. 26).

In the case when the message calling for a print-out operation has not been transmitted (S122) even after the second timer (timer for demand) 107b has counted up the second predetermined time b (S121), the data retrieve section 115 extracts the data that indicates the order of receipt from data in the ID storage section of the storage section 102 (S123a). The sequence is the same as that of Embodiment 6 (FIG. 26) up to this step.

Then, the host selection section 114 selects the host machine that gave an instruction for a confidential print out earliest (oldest instruction) (S123c). This step is reversed to that of Embodiment 6. Its host machine number is stored in an register X (S124), and the message transmitting section 110 transmits the message calling for a print-out operation to the selected host machine (S125). Upon receipt of the message, the host machine displays the message calling for a print-out operation on its display screen. When the user, who sees the message, inputs an ID code to start a print-out operation, the confidential print data in question is printed out through the steps S106 through S108 as well as S119 and S120, without being subjected to a compressing process.

The steps S109 through S120, which are carried out at the time of "YES" at S122, are the same as those of Embodiment 5 (FIG. 24).

In the case when instructions for confidential print are given from a plurality of host machines, the message calling for a print-out operation is given to the host machine that gave the instruction for a confidential print out earliest, that is, to the machine that has occupied the storage section 102 of the printer for the longest time. Therefore, this arrangement is beneficial in maintaining more spaces in the capacity of the storage section 102.

Embodiment 8

Figure 28:
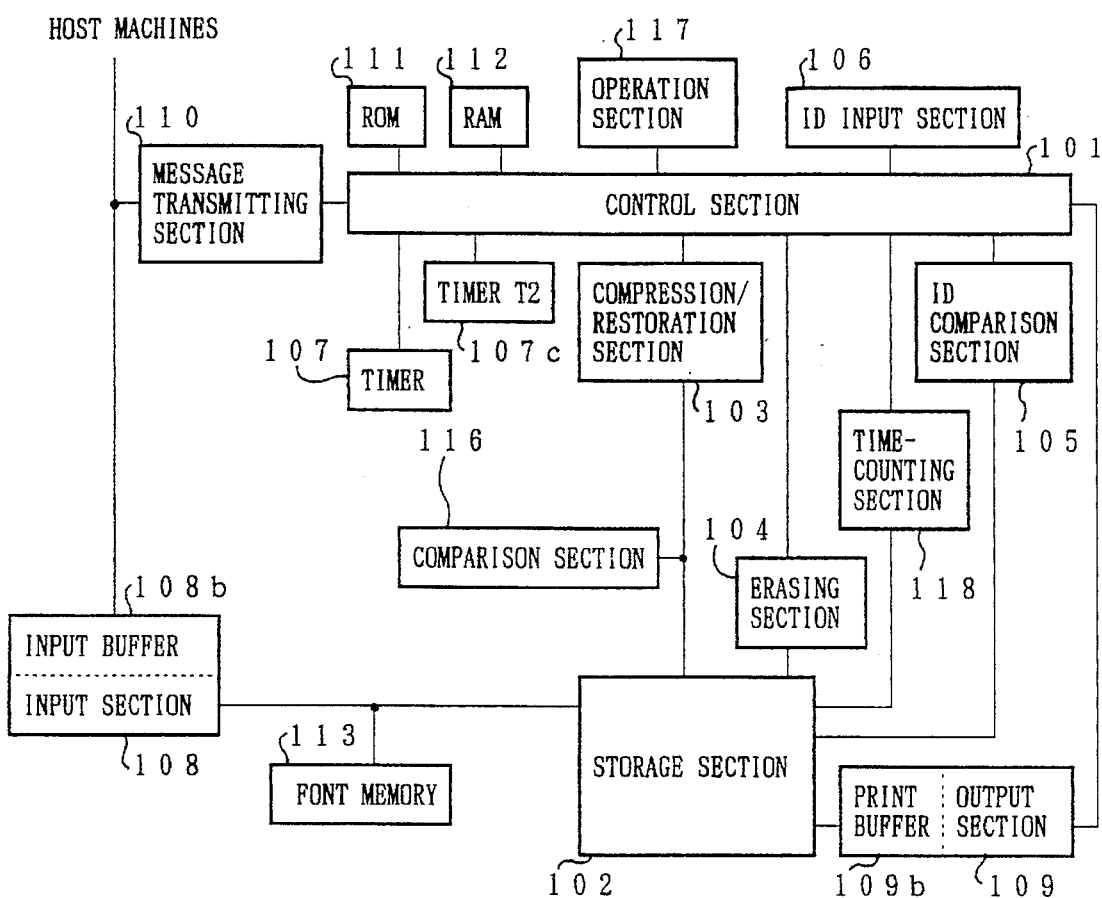
FIG. 28 is a block diagram showing a system arrangement that is commonly used in network printer systems of embodiments 8 through 24 of the present invention.

FIG. 28 is a block diagram showing an arrangement that is in common with network printer systems of Embodiments 8 through 24 of the present invention. In FIG. 28, reference numeral 116 indicates a comparison section which, in this embodiment, compares amounts of a plurality of confidential print data stored in the storage section 102 and selects the host machine that relates to the confidential print data that has the most amount of data. With respect to reference numerals 107a, 117 and 118, their explanations will be given later. These components are required for the respective embodiments in different combinations. Since the other arrangement is the same as Embodiment 6 (FIG. 25), those members that have the same functions are indicated by the same reference numerals and the description thereof is omitted.

Figure 29:
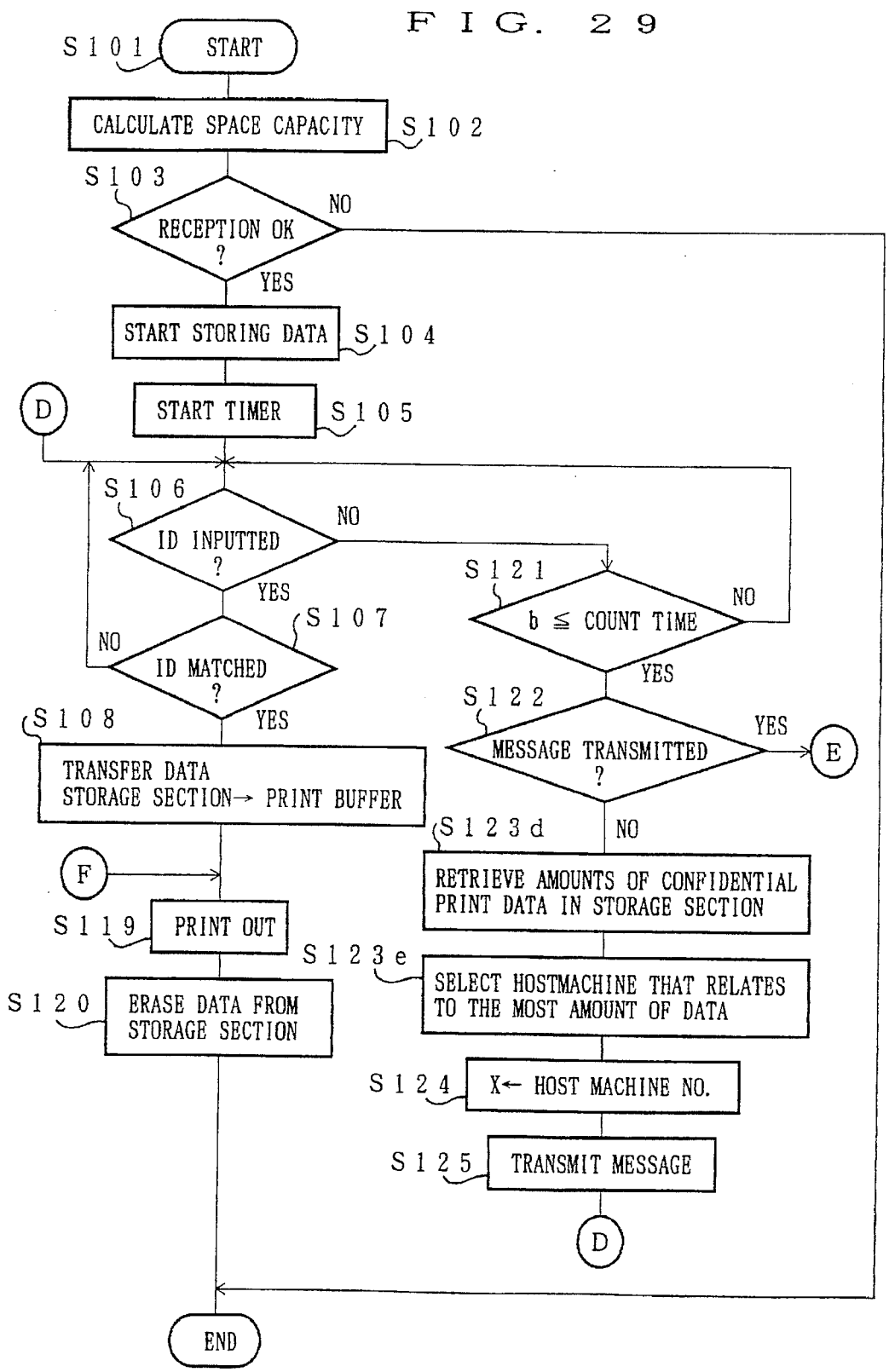
FIG. 29 is a flowchart that explains operations of the network printer system of embodiment 8.

Next, referring to FIG. 29 and the aforementioned flowchart of FIG. 24 that follows FIG. 29, an explanation is given of the operations of the printer in Embodiment 8.

When each host machine gives an instruction for a confidential print out to a printer, the printer stores the confidential print data, its ID code and host machine number in the ID storage section of the storage section 102 (S101). Steps from S102 to S108 are the same as those of Embodiment 5 (FIG. 23).

In the case when the message calling for a print-out operation has not been transmitted (S122) even after the second timer (timer for demand) 107b has counted up the second predetermined time b (S121), the comparison section 116 retrieves amounts of a plurality of confidential print data stored in the storage section 102 (S123d) and selects the host machine that relates to the confidential print data that has the most amount of data (S123e). This arrangement features the present embodiment.

Its host machine number is stored in a register X (S124), and the message transmitting section 110 transmits the message calling for a print-out operation to the selected host machine (S125). Upon receipt of the message, the host machine displays the message calling for a print-out operation on its display screen. When the user, who sees the message, inputs an ID code to start a print-out operation, the confidential print data in question is printed out through the steps S106 through S108 as well as S119 and S120, without being subjected to a compressing process.

The steps S109 through S120, which are carried out at the time of "YES" at S122, are the same as those of Embodiment 5 (FIG. 24).

In the case when instructions for confidential print are given from a plurality of host machines, the message calling for a print-out operation is given to the host machine that relates to the confidential print data that has the most amount of data among a plurality of confidential print data stored in the storage section 102. Therefore, it is possible to efficiently maintain space capacities in the storage section 102.

Embodiment 9

The network printer system of Embodiment 9 of the present invention has the same arrangement as that shown in the block diagram of FIG. 28.

Figure 30:
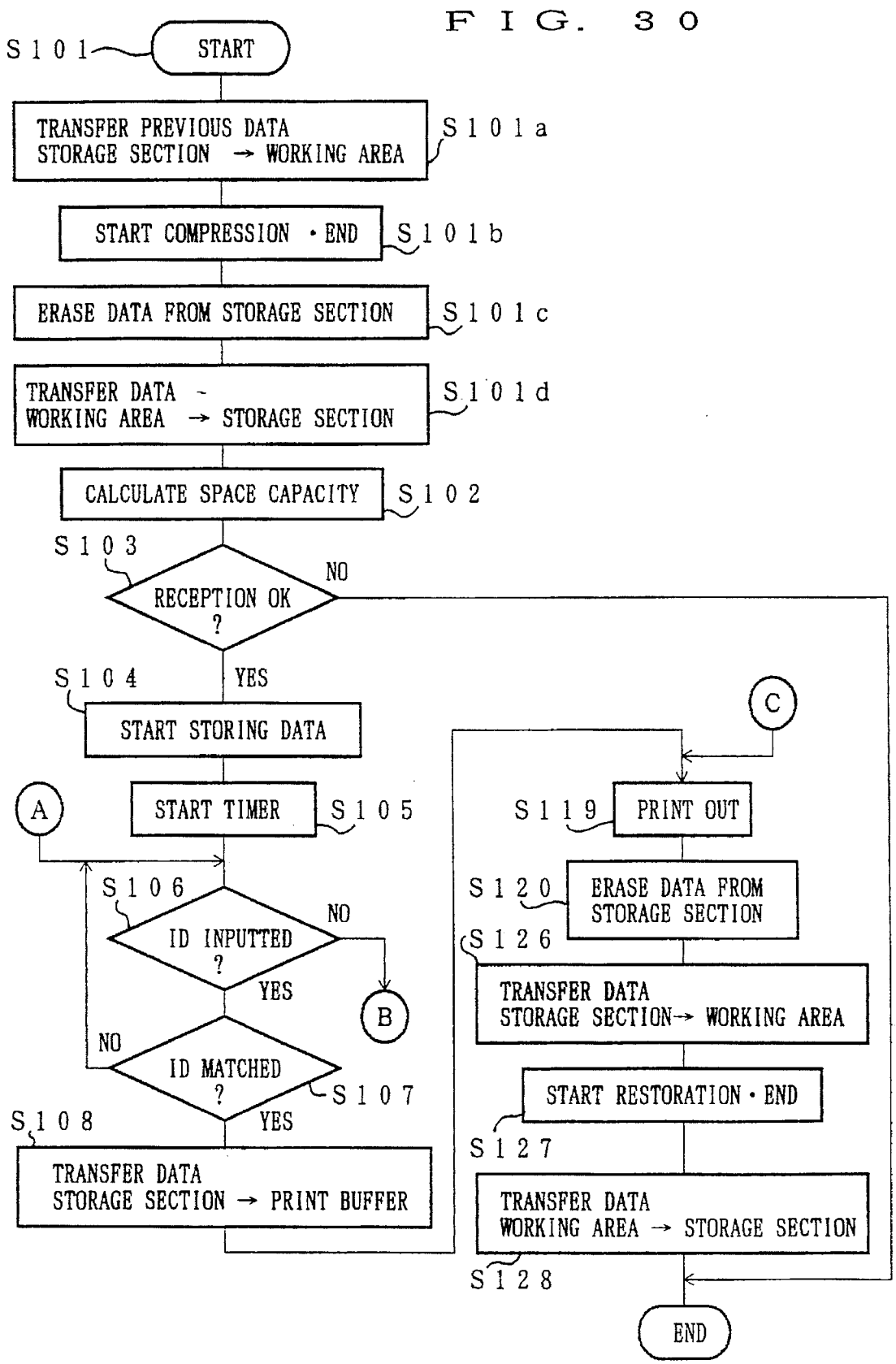
FIG. 30 is a flowchart that explains operations of the network printer system of embodiment 9.

Next, referring to FIG. 30 and the aforementioned flowchart of FIG. 21 that follows FIG. 30, an explanation is given of the operations of the printer in Embodiment 9.

One of the host machines sends confidential print data and an ID code to a printer in order to give the printer an instruction for outputting the confidential print data (S101). Upon receipt of the new confidential print data in the input buffer 108b, the control section 101 of the printer gives an instruction for compression in order to carry out a compressing operation so as to maintain a sufficient space capacity in the storage section 102, transfers to the working area 102a confidential print data that have been stored in the memory area 102b for confidential print data of the storage section 102 (S101a), and starts to compress the read-out confidential print data by activating the compressing program through the instruction for compression (S101b). Then, upon completion of the compressing operation, the confidential print data before the compression is erased from the storage section 102 by the erasing section 104 (S101c), and the compressed confidential print data is transferred from the working area 102a to the memory area 102b for confidential print data, and stored therein (S101d). Thus, in the storage section 102, a sufficient space capacity is maintained for the new confidential print data.

Next, the control section 101 carries out retrieving and adding operations with respect to the amounts of confidential print data that have already stored in the storage section 102, and calculates a space capacity in the storage section 102 (S102) so as to check to see whether or not the amount of the new confidential print data is not more than the space capacity and can be received (S103). If the space capacity is not sufficient, the reception of the new confidential print data is rejected, and the operation is completed. If the space capacity is sufficient to store the new confidential print data, the new confidential print data, which has received from the host machine through the input buffer 108b of the input section 108, is transferred to the storage section 102 (the memory area 102b for confidential print data), where a storing operation is started (S104) and the timer 107 is started to count time (S105). This step is provided so as to get the printer ready for a data-compressing operation if no print-out operation for confidential print data is made within the first predetermined time a in the same manner as Embodiment 4.

The printer waits for an ID code to be inputted through the ID input section 106 (S106), and a judgment is made in the ID comparison section 105 whether or not the inputted ID code matches any of the ID codes stored in the storage section 102 (S107). If these ID codes match each other, the corresponding confidential print data is transferred from the storage section 102 to the print buffer 109b (S108), and the output section 109 carries out a print-out operation by using the print-out sequence (S119). Then, after the print-out operation has been completed properly, the confidential print data, which has been already printed out, but is still stored in the storage section 102, is erased by the erasing section 104 (S120).

After carrying out the print-out of the confidential print data and erasing the data from the storage section 102, the control section 101 gives an instruction for restoring new confidential print data that has been preliminarily compressed, since an increased space capacity is now available in the storage section 102. Thus, the restoring program transfers the compressed confidential print data to the working area 102a in the storage section 102 (S126), and restores (expands) the compressed confidential print data. Upon completion of the restoration (S127), the restored confidential print data in the working area 102a is transferred to the memory area 102b for confidential print data, and stored therein (S128).

In contrast, if no ID code is inputted through the ID input section 106, the sequence proceeds to FIG. 21, and a judgment is made as to whether or not the time counted by the timer 107 has reached the first predetermined time a (S109). When the first predetermined time a has been reached, the confidential print data, which has been stored in the memory area 102b for confidential print data of the storage section 102, is transferred to the working area 102a (S110), where the compressing program of the compression/restoration section 103 is activated (S111).

After the confidential print data has been compressed by the compressing program, the confidential print data prior to the compression is erased by the erasing section 104 (S112), and then the confidential print data after the compression is again transferred from the working area 102a to the memory area 102b for confidential print data, and stored therein (S113).

The printer waits for an ID code to be inputted through the ID input section 106 (S114), and in the ID comparison section 105, a judgment is made as to whether or not the inputted ID code matches any of the ID codes stored in the storage section 102 (S115). When these ID codes match each other, the printer gives an instruction for restoration to the restoring program in the compression/restoration section 103, and the restoring program transfers the compressed confidential print data to the working area 102a in the storage section 102 (S116), where the compressed confidential print data is restored (expanded). Upon completion of the restoration (S117), the restored confidential print data in the working area 102a is transferred to the print buffer 109b (S118), and the output section 109 carries out a print-out operation (S119), which is shown in FIG. 30. Then, after the print-out operation has been completed properly, the confidential print data stored in the storage section 102 is erased by the erasing section 104 (S120).

After carrying out the print-out of the confidential print data and erasing the data from the storage section 102, the control section 101 gives an instruction for restoration in order to prepare for the next print-out operation earlier, since an increased space capacity is now available in the storage section 102. Thus, the restoring program transfers the compressed confidential print data to the working area 102a in the storage section 102 (S126), and restores (expands) the compressed confidential print data. Upon completion of the restoration (S127), the restored confidential print data in the working area 102a is transferred to the memory area 102b for confidential print data, and stored therein (S128).

In a conventional arrangement, if, upon receipt of new confidential print data, a sufficient space capacity is not available in the storage section 102, the data has to be abandoned, and the user has to again give an instruction for a confidential print out. In contrast, the present embodiment makes it possible to positively store the new confidential print data by compressing previously stored confidential print data on a software basis, without the necessity of increasing the hardware capacity of the storage section 102, and also to eliminate time-consuming jobs for the user to re-transmit data.

Embodiment 10

The network printer system of Embodiment 10 of the present invention has the same arrangement as that shown in the block diagram of FIG. 28. The difference between this embodiment and Embodiment 8 is that the comparison section 30 functions differently, as will be described later.

Figure 31:
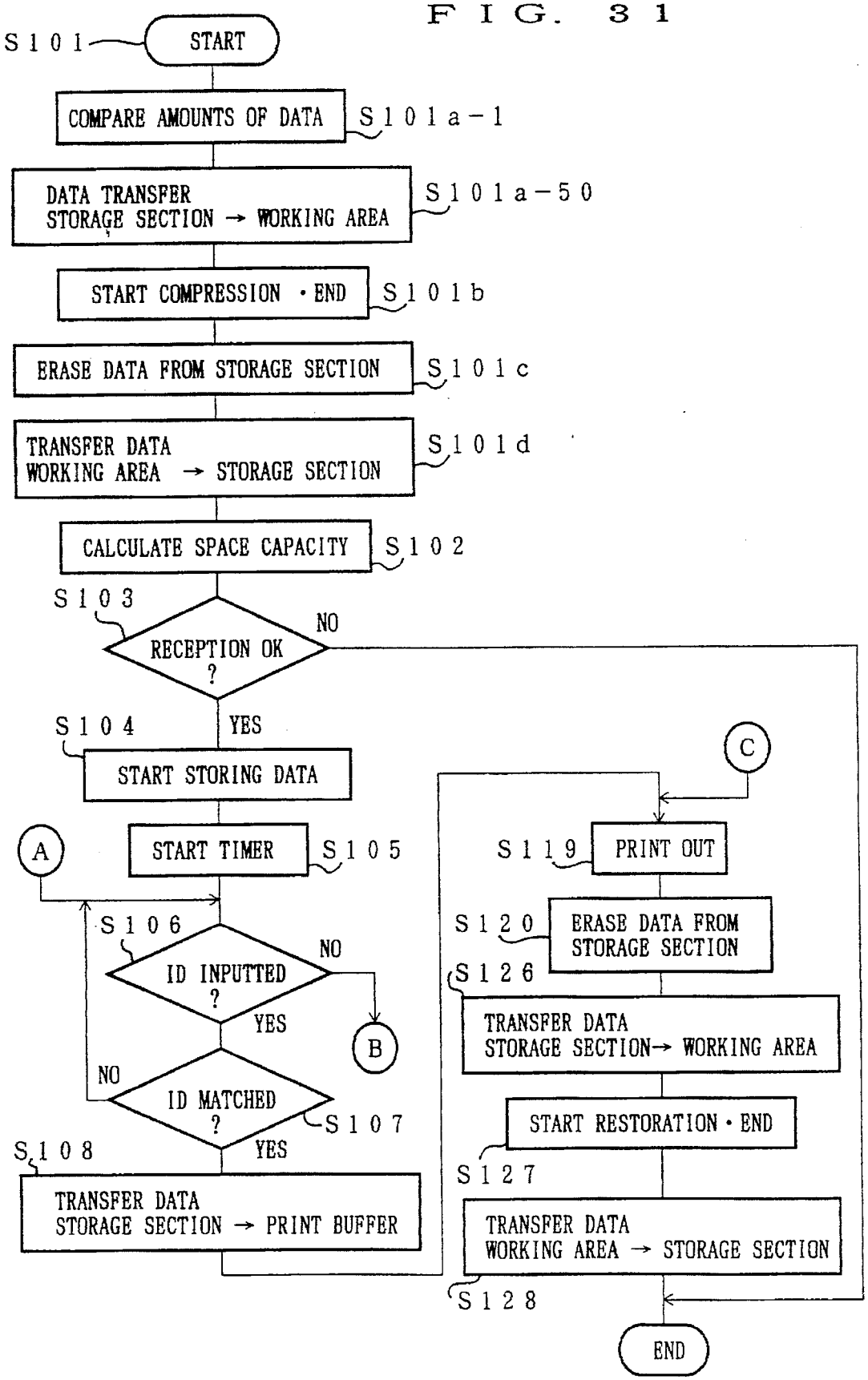
FIG. 31 is a flowchart that explains operations of the network printer system of embodiment 10.

Next, referring to FIG. 31 and the aforementioned flowchart of FIG. 21 that follows FIG. 31, an explanation is given of the operations of the printer in the present embodiment.

When the printer receives confidential print data and ID code from one of the host machines (S101), the comparison section 116 makes comparisons among the amounts of a plurality of confidential print data that have already been stored in the storage section 102, the amount of the newly transmitted confidential print data and the space capacity of the memory area 102b for confidential print data, and selects one or a plurality of confidential print data from the confidential print data that have already been stored, in order to store the new confidential print data in the storage section 102 without conducting unnecessary data compressions, while keeping the most effective capacity distribution (S101a-1).

Thus, it is possible to maintain a necessary space capacity, and also to get ready for receipt of new confidential print data.

The selected confidential print data is transferred from the memory area 102b for confidential print data to the working area 102a (S101a-50).

Then, the processes of step S101b and thereafter are carried out in the same manner as Embodiment 9 in accordance with the flowcharts (including that shown in FIG. 21).

In this embodiment, even when an instruction for new confidential prints is given from one of the host machines in a state where a sufficient space capacity is not available in the storage section 102, the new confidential print data can be stored in the storage section 102 through data compression that is carried out, while keeping the most effective capacity distribution, without conducting unnecessary data compressions.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 11

Figure 32:
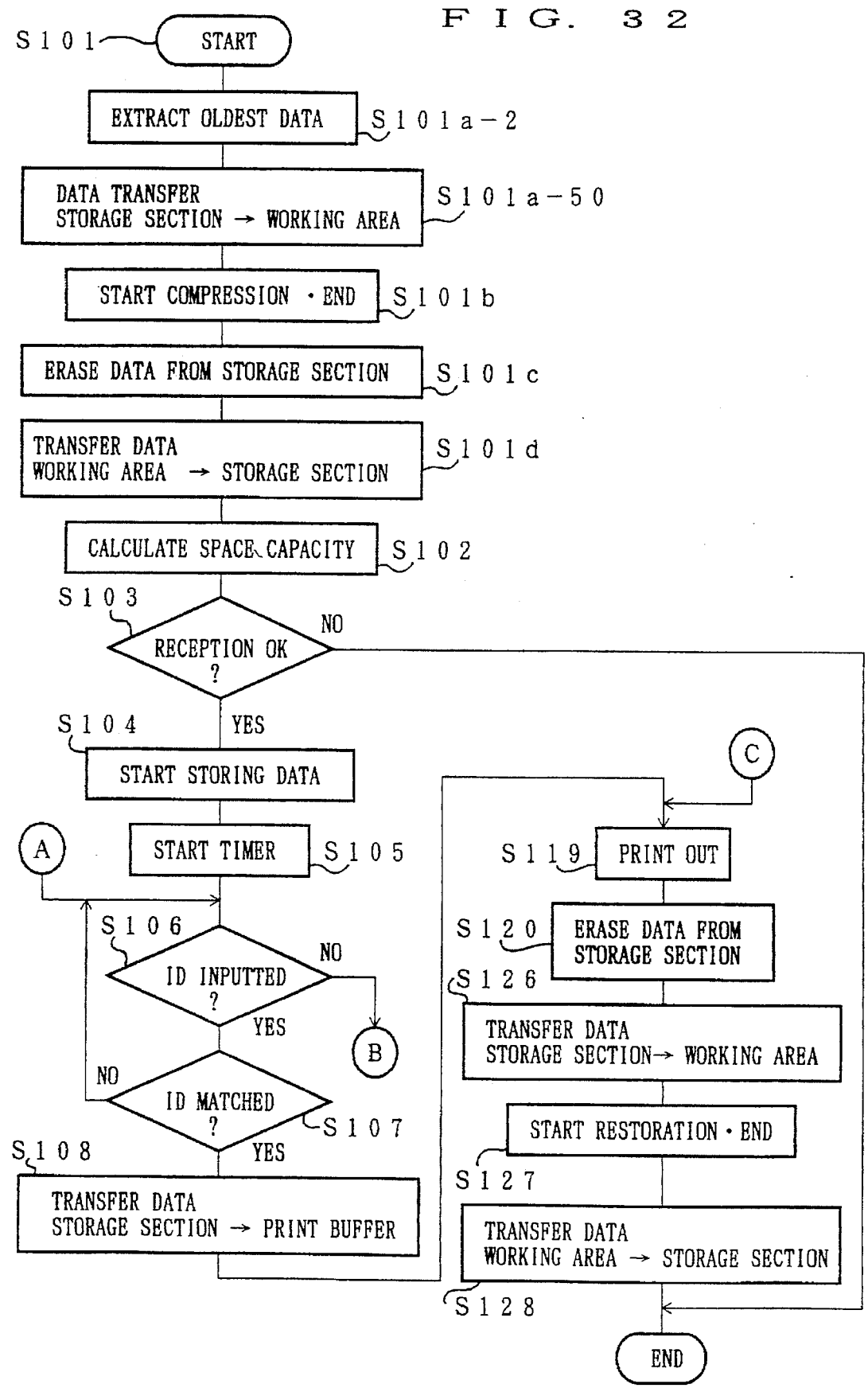
FIG. 32 is a flowchart that explains operations of the network printer system of embodiment 11.

The network printer system of Embodiment 11 of the present invention has the same arrangement as that shown in the block diagram of FIG. 28. Referring to FIG. 32 and the aforementioned flowchart of FIG. 21 that follows FIG. 32, an explanation is given of the operations of the printer in the present embodiment.

When the printer receives confidential print data and ID code from one of the host machines (S101), the control section 101 extracts the oldest confidential print data from a plurality of confidential print data that have already been stored in the memory area 102b for confidential print data of the storage section 102 (S101a-2). The extracted confidential print data is transferred to the working area 102a of the storage section 102 (S101a-50).

Then, the processes of step S101b and thereafter are carried out in the same manner as Embodiment 9 in accordance with the flowcharts (including that shown in FIG. 21).

In this embodiment, among a plurality of confidential print data that have already been stored, compressions are successively carried out, starting from the one that was stored earliest and has the longest occupied time of the storage section 102; therefore, this arrangement makes it possible for all the users to use the system more equally, although it takes longer to print out the confidential print data in question.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 12

Figure 33:
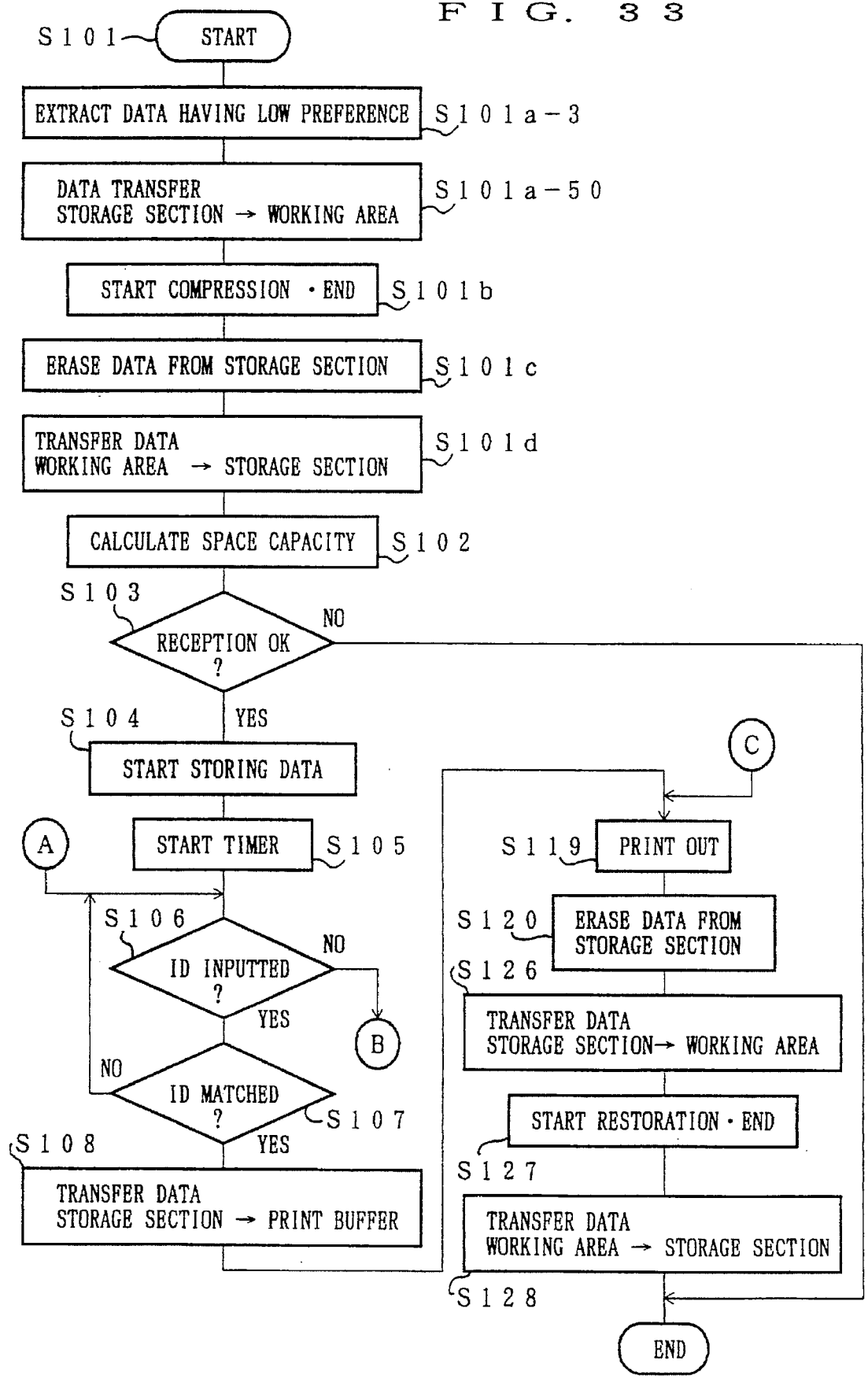
FIG. 33 is a flowchart that explains operations of the network printer system of embodiment 12.

The network printer system of Embodiment 12 of the present invention has the same arrangement as that shown in the block diagram of FIG. 28. Referring to FIG. 33 and the aforementioned flowchart of FIG. 21 that follows FIG. 33, an explanation is given of the operations of the printer in the present embodiment.

When the printer receives confidential print data and ID code together with a preference code from one of the host machines (S101), the control section 101 compares respective preference codes of a plurality of confidential print data that have already been stored in the memory area 102b for confidential print data of the storage section 102, and extracts the confidential print data that is the lowest in the order of preference (S101a-3). The extracted confidential print data is transferred to the working area 102a of the storage section 102 (S101a-50).

Then, the processes of step S101b and thereafter are carried out in the same manner as Embodiment 9 in accordance with the flowcharts (including that shown in FIG. 21).

In this embodiment, upon compressing a plurality of confidential print data that have already been stored, the data that is the lowest in the order of preference among the respective confidential print data is extracted and compressed; therefore, it is possible to minimize the possibility that confidential print data that belongs to the user with a high-level of preference might be compressed, compared with other data, and the print-out operation of the data in question is readily carried out.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 13

Figure 34:
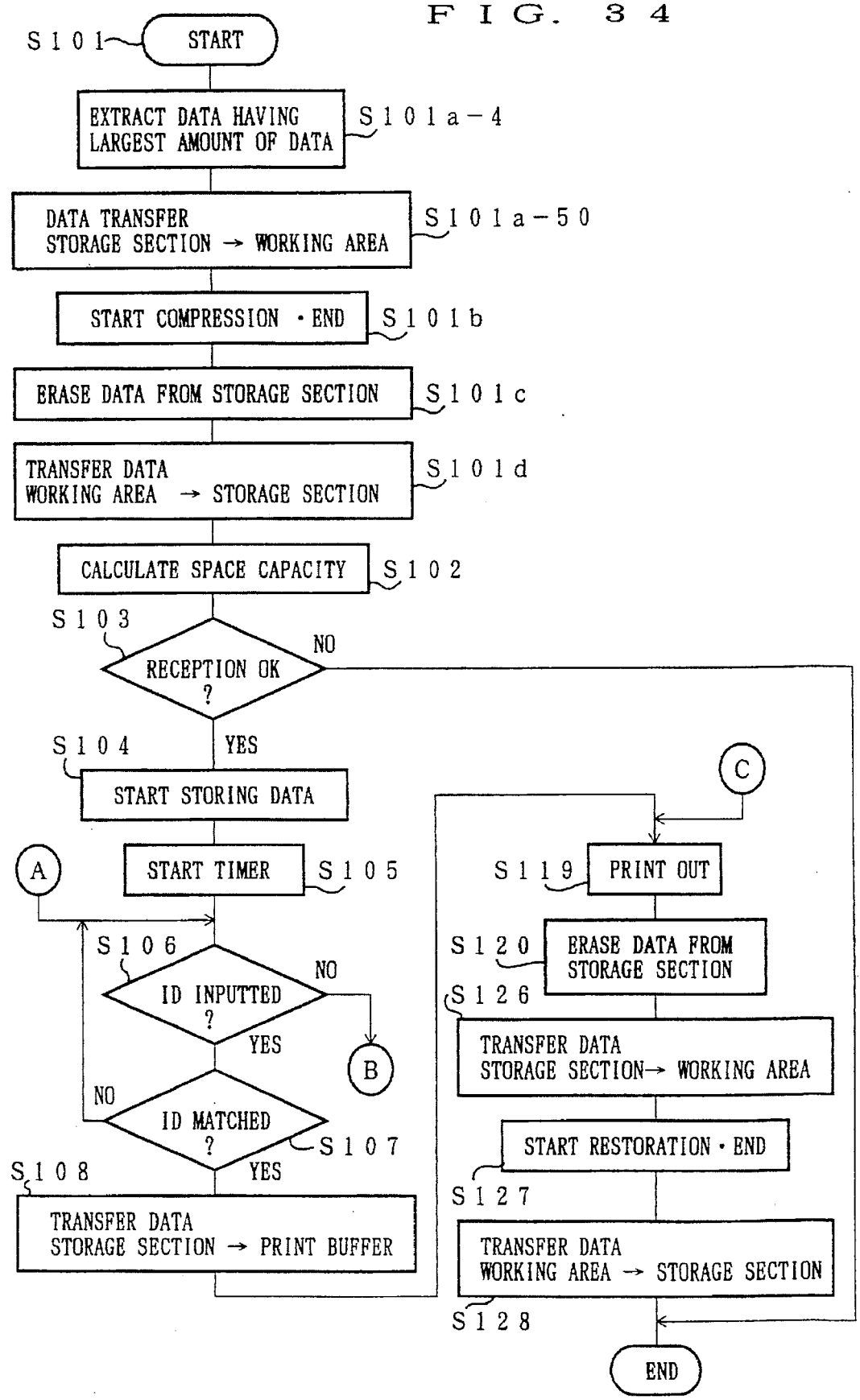
FIG. 34 is a flowchart that explains operations of the network printer system of embodiment 13.

The network printer system of Embodiment 13 of the present invention has the same arrangement as that shown in the block diagram of FIG. 28. The difference between this embodiment and Embodiment 8 is that the comparison section 116 functions differently, as will be described later. Referring to FIG. 34 and the aforementioned flowchart of FIG. 21 that follows FIG. 34, an explanation is given of the operations of the printer in the present embodiment.

When the printer receives confidential print data and ID code from one of the host machines (S101), the comparison section 116 makes comparisons among the amounts of a plurality of confidential print data that have already been stored in the memory area 102b of the storage section 102, and extracts the confidential print data that has the largest amount of data (S101a-4). The extracted confidential print data is transferred from the memory area 102b for confidential print data to the working area 102a (S101a-50).

Then, the processes of step S101b and thereafter are carried out in the same manner as Embodiment 9 in accordance with the flowcharts (including that shown in FIG. 21).

In this embodiment, upon compressing a plurality of confidential print data that have already been stored, the confidential print data that has the largest amount of data and the highest rate in monopolization of the storage section 102 is extracted and compressed; this ensures a higher rate of maintaining space capacities in the storage section 102, thereby making it possible for all the users to use the system more equally.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 14

Figure 35:
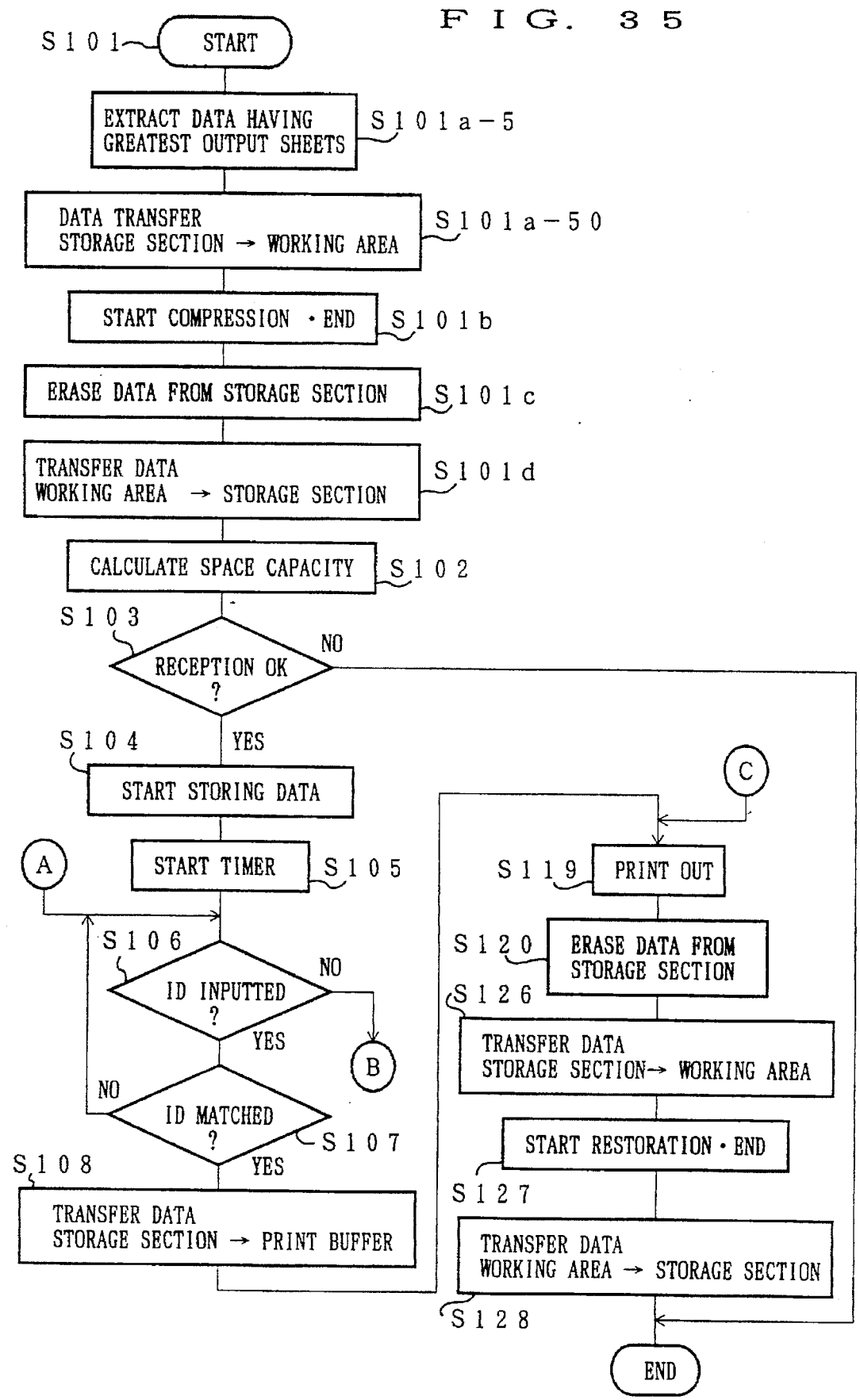
FIG. 35 is a flowchart that explains operations of the network printer system of embodiment 14.

The network printer system of Embodiment 14 of the present invention has the same arrangement as that shown in the block diagram of FIG. 28. The difference between this embodiment and other embodiments is that the comparison section 116 functions differently, as will be described later. Referring to FIG. 35 and the aforementioned flowchart of FIG. 21 that follows FIG. 35, an explanation is given of the operations of the printer in the present embodiment.

When the printer receives data related to the number of output print sheets together with confidential print data and ID code from one of the host machines (S101), the comparison section 116 makes comparisons between the numbers of output print sheets of a plurality of confidential print data that have already been stored in the memory area 102b of the storage section 102, and extracts the confidential print data that has the greatest number of output print sheets (S101a-5). The extracted confidential print data is transferred from the memory area 102b for confidential print data to the working area 102a (S101a-50).

Then, the processes of step S101b and thereafter are carried out in the same manner as Embodiment 9 in accordance with the flowcharts (including that shown in FIG. 21).

In this embodiment, upon compressing a plurality of confidential print data that have already been stored, the confidential print data that has the greatest number of print output sheets and the highest rate in monopolization of the storage section 102 as well as the entire printer system is extracted and compressed; this ensures a higher rate of maintaining space capacities in the storage section 102, thereby making it possible for all the users to use the system more equally.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 15

Figure 36:
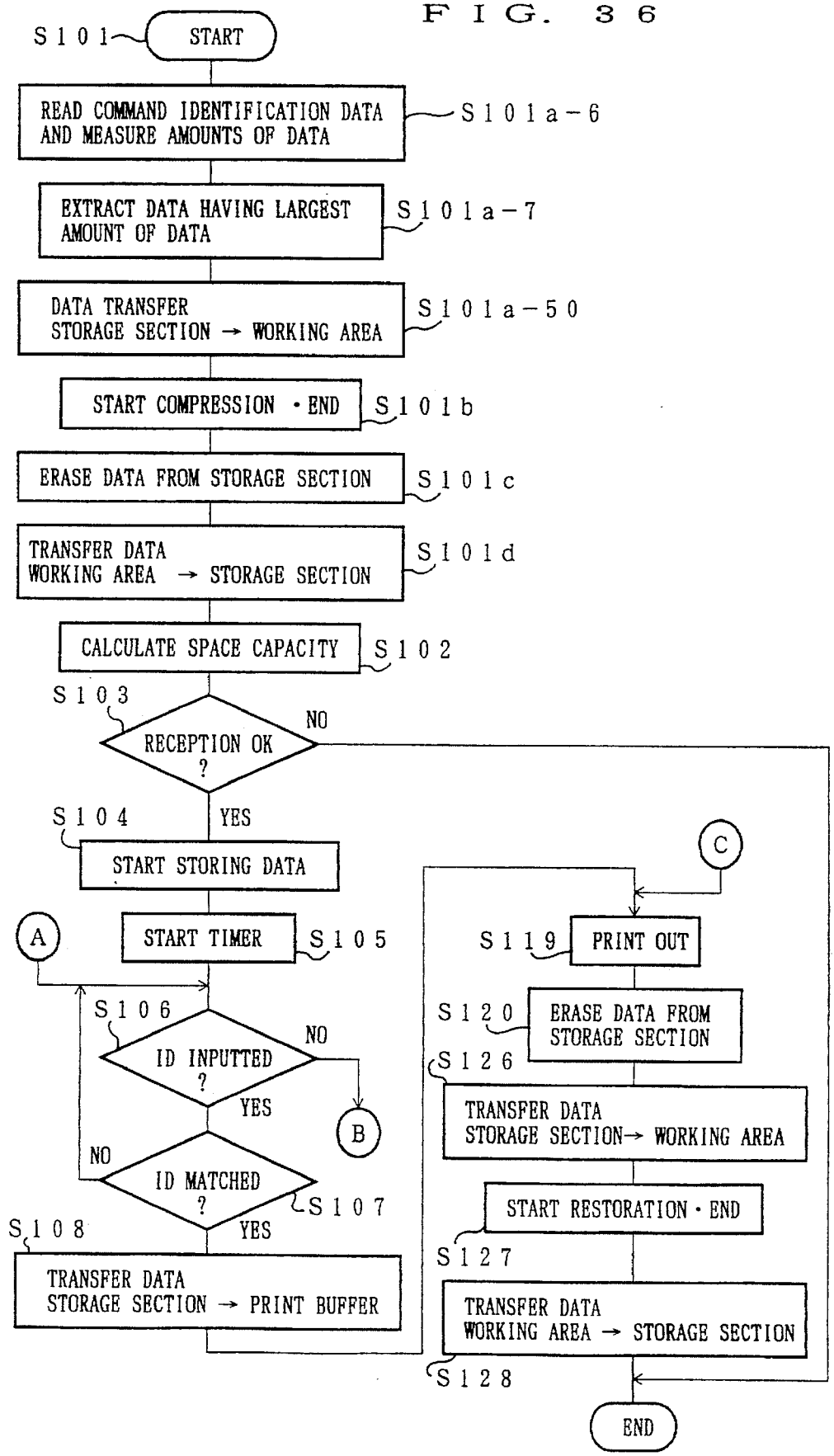
FIG. 36 is a flowchart that explains operations of the network printer system of embodiment 15.

The network printer system of Embodiment 15 of the present invention has the same arrangement as that shown in the block diagram of FIG. 28. The difference between this embodiment and other embodiments is that the comparison section 116 functions differently, as will be described later. Referring to FIG. 36 and the aforementioned flowchart of FIG. 21 that follows FIG. 36, an explanation is given of the operations of the printer in the present embodiment.

When the printer receives command identification data together with confidential print data and ID code from one of the host machines (S101), the comparison section 116 reads respective command identification data of a plurality of confidential print data that have already been stored in the memory area 102b of the storage section 102 so as to measure the respective amounts of data (S101a-6), and extracts the confidential print data that has the largest amount of data (S101a-7). The extracted confidential print data is transferred to the working area 102a in the storage section 102 (S101a-50).

Then, the processes of step S101b and thereafter are carried out in the same manner as Embodiment 9 in accordance with the flowcharts (including that shown in FIG. 21).

In this embodiment, upon compressing a plurality of confidential print data that have already been stored, the confidential print data that has the largest amount of data, discriminated by command identification data, and the highest rate in monopolization of the storage section 102 is extracted and compressed; this ensures a higher rate of maintaining space capacities in the storage section 102, thereby making it possible for all the users to use the system more equally.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 16

Figure 37:
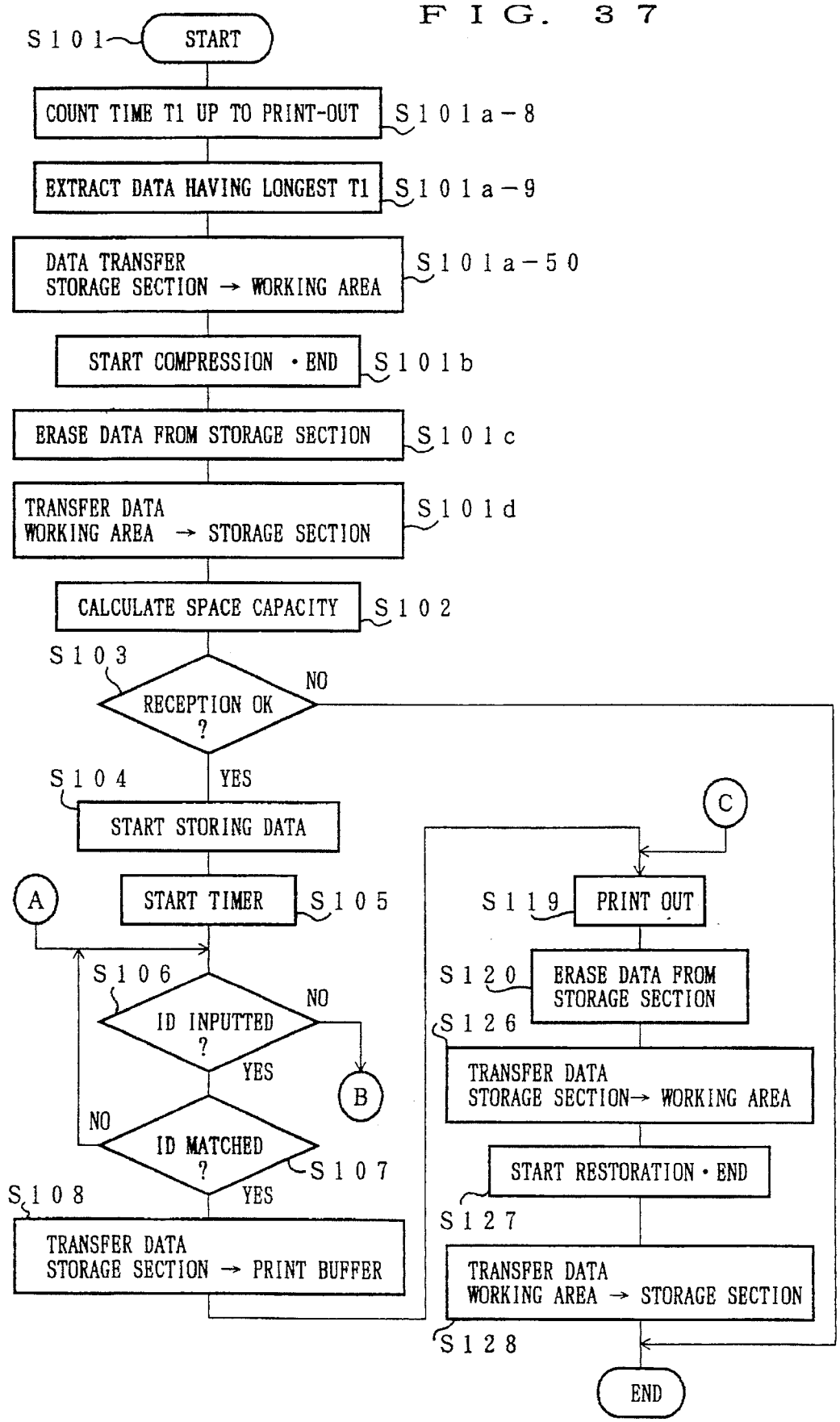
FIG. 37 is a flowchart that explains operations of the network printer system of embodiment 16.

The network printer system of Embodiment 16 of the present invention has an arrangement similar to that shown in the block diagram of FIG. 28. However, to this arrangement is added a timer section 118 and an operation section 117 which measures an output-waiting time T1 up to print-output time by comparing the print-output time with the current time measured by the timer section 118. Referring to FIG. 37 and the aforementioned flowchart of FIG. 21 that follows FIG. 37, an explanation is given of the operations of the printer in the present embodiment.

When the printer receives data related to the print-output time of confidential print data, together with the confidential print data and the ID code from one of the host machines (S101), the operation section 117 calculates the out-put waiting time T1 up to print-output time with respect to the respective confidential print data by comparing the print-output times with the current time measured by the timer section 118 (S101a-8). Then, the operation section 117 compares the respective print-output times, and extracts the confidential print data that has the longest T1 (S101a-9). The extracted confidential print data is transferred to the working area 102a in the storage section 102 (S101a-50).

Next, the processes of step S101b and thereafter are carried out in the same manner as Embodiment 9 in accordance with the flowcharts (including that shown in FIG. 21).

In this embodiment, upon compressing a plurality of confidential print data that have already been stored, the confidential print data that has the longest out-put waiting time T1 up to print-output time and the longest occupied time of the storage section 102 is extracted and compressed; this provides a rational method for maintaining as much space capacity in the storage section 102 as possible, thereby making it possible for all the users to use the system more equally.

Moreover, as shown in steps S119 and S120 as well as S126 through S128, when the confidential print data has been printed out, the space capacity of the storage section 102 increases, and some of the compressed confidential print data are automatically returned to the original state by the restoring program. Thus, upon printing out the data in question, no restoring process is required, and it is possible to readily carry out the print-out operation.

Embodiment 17

The network printer system of Embodiment 17 of the present invention is explained by referring to steps S126 through S128 that follow steps S119 and S120 in Embodiment 9 (FIG. 30) through Embodiment 16 (FIG. 37).

After a print-out operation has been carried out (S119) and the confidential print data related to the print-out operation has been erased (S120), the control section 101 transfers the confidential print data, which has been compressed at S101b from the memory area 102b for confidential print data in the storage section 102, to the working area 102a (S126), restores the confidential print data by activating the restoring program (S127), and transfers the confidential print data, thus restored, from the working area 102a to the memory area 102b for confidential print data in the storage section 102 (S128).

Once the confidential print data has been printed out, the space capacity of the storage section 102 increases, and the present embodiment is arranged so that some of the compressed confidential print data are automatically returned to the original state by the restoring program. Thus, upon printing out the restored confidential print data, no restoring process is required, and it is possible to readily carry out the print-out operation.

Additionally, the idea of the present embodiment may be applied to Embodiments 4 through 8.

Embodiment 18

Figure 38:
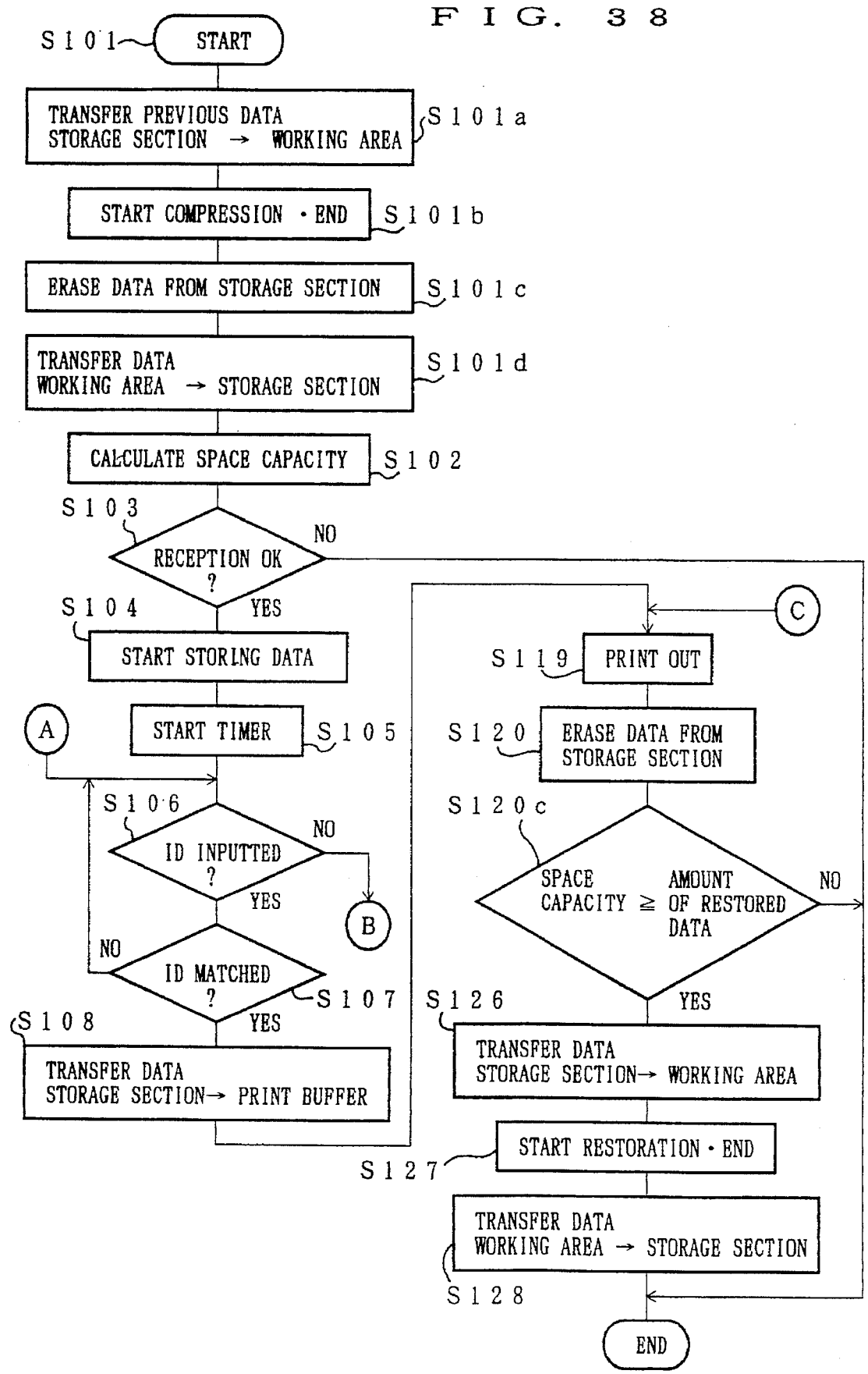
FIG. 38 is a flowchart that explains operations of the network printer system of embodiment 18.

The network printer system of Embodiment 18 of the present invention has the same arrangement as that shown in the block diagram of FIG. 28. The difference between this embodiment and other embodiments is that the comparison section 116 functions differently, as will be described later. Referring to FIG. 38 and the aforementioned flowchart of FIG. 21 that follows FIG. 38, an explanation is given of the operations of the printer in the present embodiment.

When the printer receives confidential print data and an ID code from one of the host machine (S101), the control section 101 of the printer outputs an instruction for compression so as to carry out compressing processes so that a sufficient space capacity is maintained in the storage section 102, transfers to the working area 102a the confidential print data that have already been stored in the memory area 102b for confidential print data in the storage section 102 (S101a), and compresses the read-out confidential print data by activating the compressing program through the instruction for compression (S101b). After completion of the compression, the confidential print data before the compression, located in the storage section 102, is erased by the erasing section 104 (S101c), and the compressed confidential print data is transferred from the working area 102a to the memory area 102b for confidential print data, and stored therein (S101d). Thus, a sufficient space capacity is maintained for the new confidential print data in the storage section 102.

Next, the control section 101 carries out retrieving and adding operations with respect to the amounts of confidential print data that have already been stored in the storage section 102, and calculates a space capacity in the storage section 102 (S102) so as to check to see whether or not the amount of the new confidential print data is not more than the space capacity and can be received (S103). If the space capacity is not sufficient, the reception of the new confidential print data is rejected, and the operation is completed. If the space capacity is sufficient to store the new confidential print data, the new confidential print data, which has received from the host machine through the input buffer 108b of the input section 108, is transferred to the storage section 102 (the memory area 102b for confidential print data), where a storing operation is started (S104) and the timer 107 is started to count time (S105). This step is provided so as to get the printer ready for a data-compressing operation if no print-out operation for confidential print data is made within the first predetermined time a in the same manner as Embodiment 4 (see FIG. 21).

The printer waits for an ID code to be inputted through the ID input section 106 (S106), and a judgment is made in the ID comparison section 105 whether or not the inputted ID code matches any of the ID codes stored in the storage section 102 (S107). If these ID codes match each other, the corresponding confidential print data is transferred from the storage section 102 to the print buffer 109b (S108), and the output section 109 carries out a print-out operation by using the print-out sequence (S119). Then, after the print-out operation has been completed properly, the confidential print data, which has been already printed out, but is still stored in the storage section 102, is erased by the erasing section 104 (S120).

Next, the comparison section 116 compares the current space capacity of the storage section 102 and the amount of data that would be taken by the compressed confidential print data that have been subjected to the compression at S101b if it were restored (S120c). If the amount of the restored data is greater, the operation is completed. In contrast, if the space capacity is not less than the amount of the restored data so that restoration is operable, the control section 101 gives an instruction for restoration for restoring the confidential print data, and the restoring program transfers the compressed confidential print data to the working area 102a in the storage section 102 (S126), and restores (expands) the compressed confidential print data. Upon completion of the restoration (S127), the restored confidential print data in the working area 102a is transferred to the memory area 102b for confidential print data, and stored therein (S128).

In contrast, if no ID code is inputted from the ID input section 106, the processes in the steps S109 through S118 are carried out in the same manner as Embodiment 9 (see FIG. 21). In other words, when the time counted by the timer 107 has reached the predetermined time a, the confidential print data is compressed. When an ID code which is the same as the ID code that has sent from the host machine beforehand is inputted, the compressed print data is restored so as to be printed out, and the data is transferred to the print buffer 109b, and is printed out by the output section 109.

In this embodiment, in the case when some confidential print data have been printed out, if compressed confidential print data still remain, the restoration of the confidential print data is carried out only when a judgment has been made so that the space capacity of the storage section 102 is larger than the amount of data that would be taken if the remaining compressed confidential print data were restored. This keeps confidential print data that still remain in a compressed state to a minimum, and makes it possible to use the storage section 102 more effectively.

Embodiment 19

Figure 39:
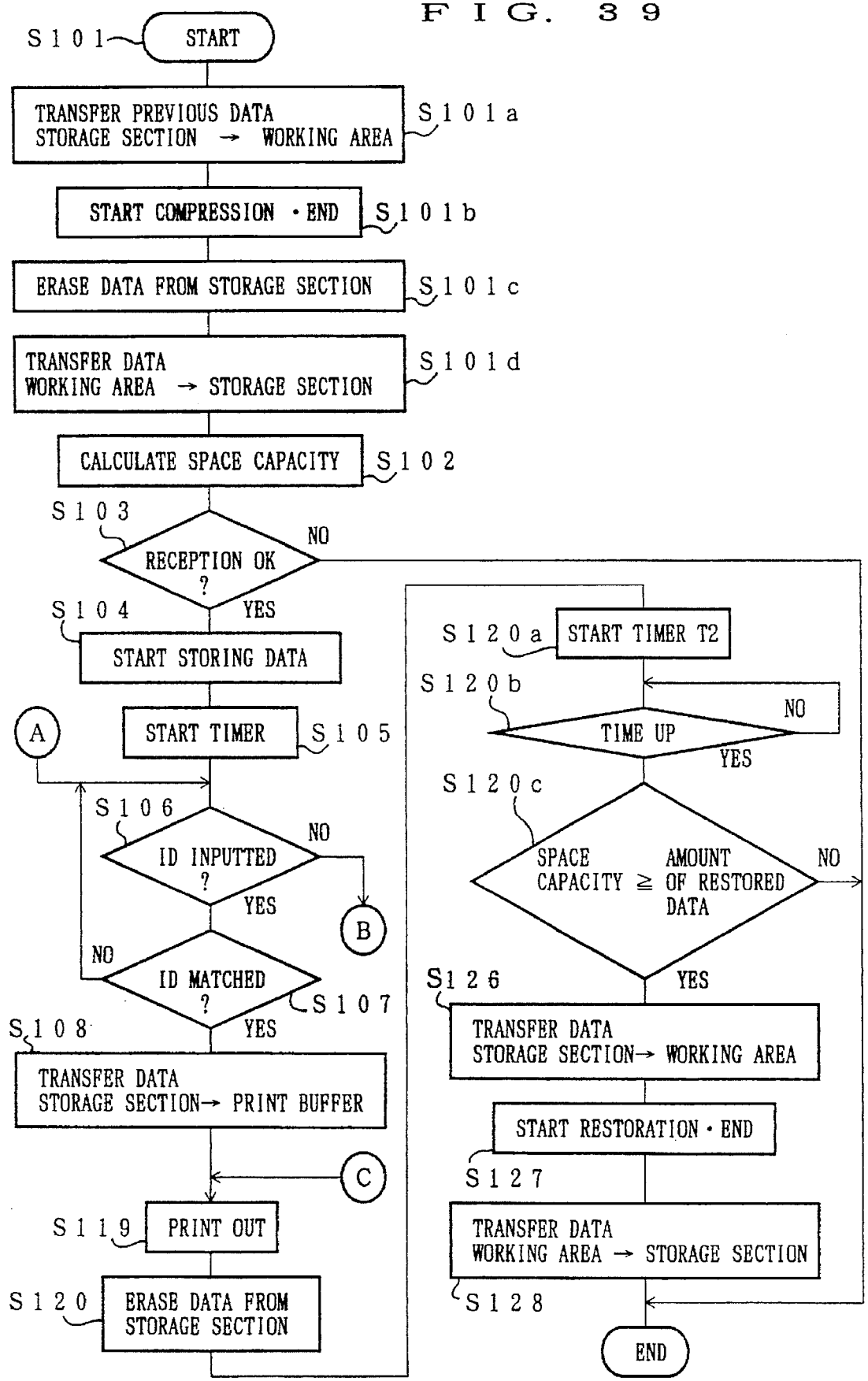
FIG. 39 is a flowchart that explains operations of the network printer system of embodiment 19.

The network printer system of Embodiment 19 of the present invention has the same arrangement as that shown in the block diagram of FIG. 28. The difference between this embodiment and other embodiments is that a timer 107c is operated. Referring to FIG. 39 and the aforementioned flowchart of FIG. 21 that follows FIG. 39, an explanation is given of the operations of the printer in the present embodiment.

The steps S101 through S120 as well as S120c through S128 are the same as those in the above-mentioned Embodiment 18 (see FIG. 38). The difference is that steps S120a and S120b are added to this embodiment.

After the confidential print data, which was printed out at S119, has been erased from the storage section 102 at S120, the timer 107c is started (S120a), and after a predetermined time T2 has elapsed and the timer 107c has timed out (S120b), the comparison section 116 compares the current space capacity of the storage section 102 and the amount of data that would be taken by the compressed confidential print data that have been subjected to the compression at S101b if it were restored (S120c). If the amount of the restored data is greater, the operation is completed. In contrast, if the space capacity is not less than the amount of the restored data because of the print-out and data-erasing operations, the control section 101 carries out the aforementioned restoring processes so as to provide the amount of data that is less than the space capacity, in the same manner as the steps S126 through S128 of Embodiment 18.

If new confidential print data is received immediately after compressed confidential print data has been restored, either of the confidential print data has to be again compressed, and a long waiting time is required until the new confidential data is received; this causes degradation in the efficiency of the system. In the present embodiment, a judgement is made as to whether or not the space capacity is larger than the amount of data that would be taken by the compressed confidential print data if it were restored, and only when this state continues not less than a predetermined period, the restoration of the confidential print data in question is carried out. This arrangement makes the system properly get ready for accepting new confidential print data, and prevents degradation in the efficiency of the system.

Embodiment 20

Figure 40:
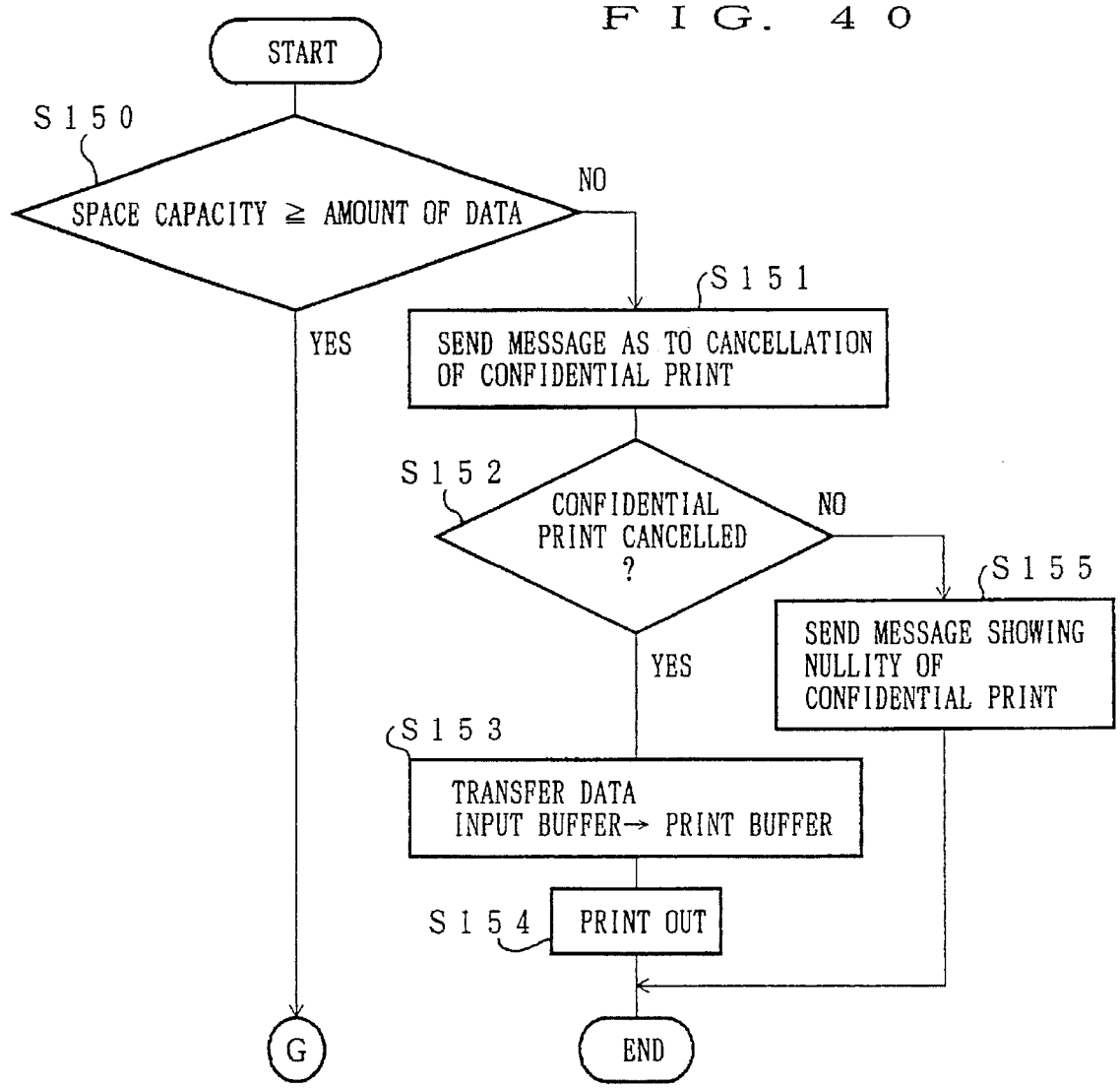
FIG. 40 is a flowchart that explains operations of the network printer system of embodiment 20.
Figure 41:
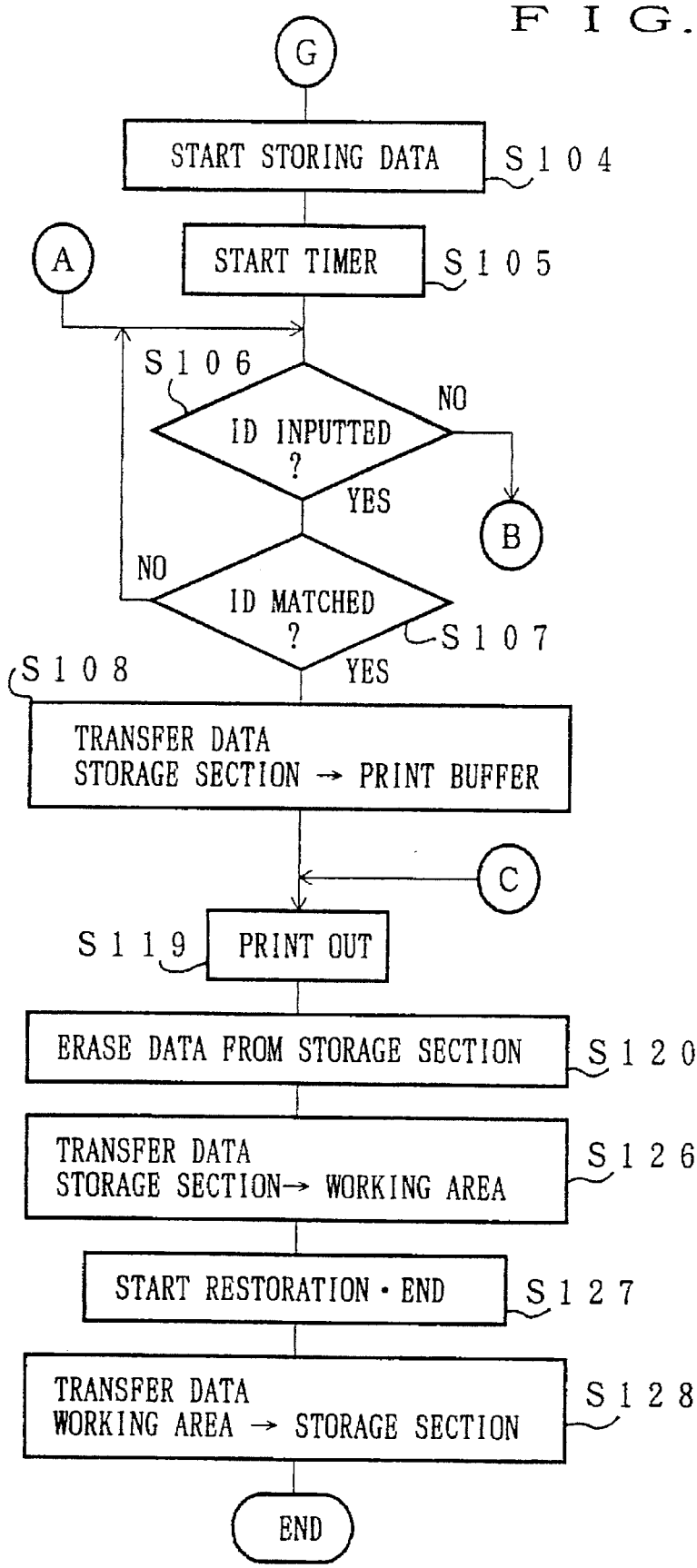
FIG. 41 is a flowchart that explains operations of the network printer system of embodiment 20.

The network printer system of Embodiment 20 of the present invention has the same arrangement as that shown in the block diagram of FIG. 28. Referring to FIGS. 40 and 41 and the aforementioned flowchart of FIG. 21 that follows these figures, an explanation is given of the operations of the printer in the present embodiment.

When the printer receives confidential print data and an ID code from one of the host machine (S101), the comparison section 116 compares the space capacity of the storage section 102 with the amount of the newly transmitted confidential print data (S150), and if the space capacity is larger, the control section 101 allows the confidential print data from the host machine, which has been stored in the input buffer 108b, to be stored in the storage section 102 (S104). In FIG. 41, the steps of S104 and thereafter are carried out in the same manner as Embodiment 9 (FIG. 30).

In contrast, if the amount of the newly transmitted confidential print data is larger than the space capacity of the storage section 102 (S150), the message transmitting section 110 sends a message as to whether or not the current instruction for confidential print-outs should be cancelled to the host machine that is transmitting the above-mentioned confidential print data having the larger amount of data (S151). Then, the control section 101 makes a judgment as to whether or not a signal for cancelling the instruction for a confidential print out is received from the host machine (S152). If the signal for cancellation has been received, the control section 101 transfers the confidential print data, which has been received and temporarily held, from the input buffer 108b to the print buffer 109b as normal print data (S153), and a normal print-out operation is carried out (S154). If no signal for cancelling the instruction for a confidential print out is received from the host machine (S152), the message transmitting section 110 sends a message indicating nullity of the instruction for a confidential print out to the corresponding host machine (S155).

In prior art arrangements, when new confidential print data is received in a state where the amount of the confidential print data is larger than the space capacity of the storage section 102, the instruction for a confidential print out has to be nullified. However, in the present embodiment, the message is sent to the host machine in question as to whether or not the instruction for a confidential print out should be cancelled, and if the host machine sends a signal for the cancellation, the confidential print data, which has been received, is printed out as normal print data. Thus, it becomes possible to minimize interruptions during the printing process.

Additionally, in place of the step S150 wherein the amount of new confidential print data is compared with the space capacity, another step for judging whether or not the amount of data used for storage in the storage section 102 has reached a predetermined value may be prepared.

Embodiment 21

Figure 42:
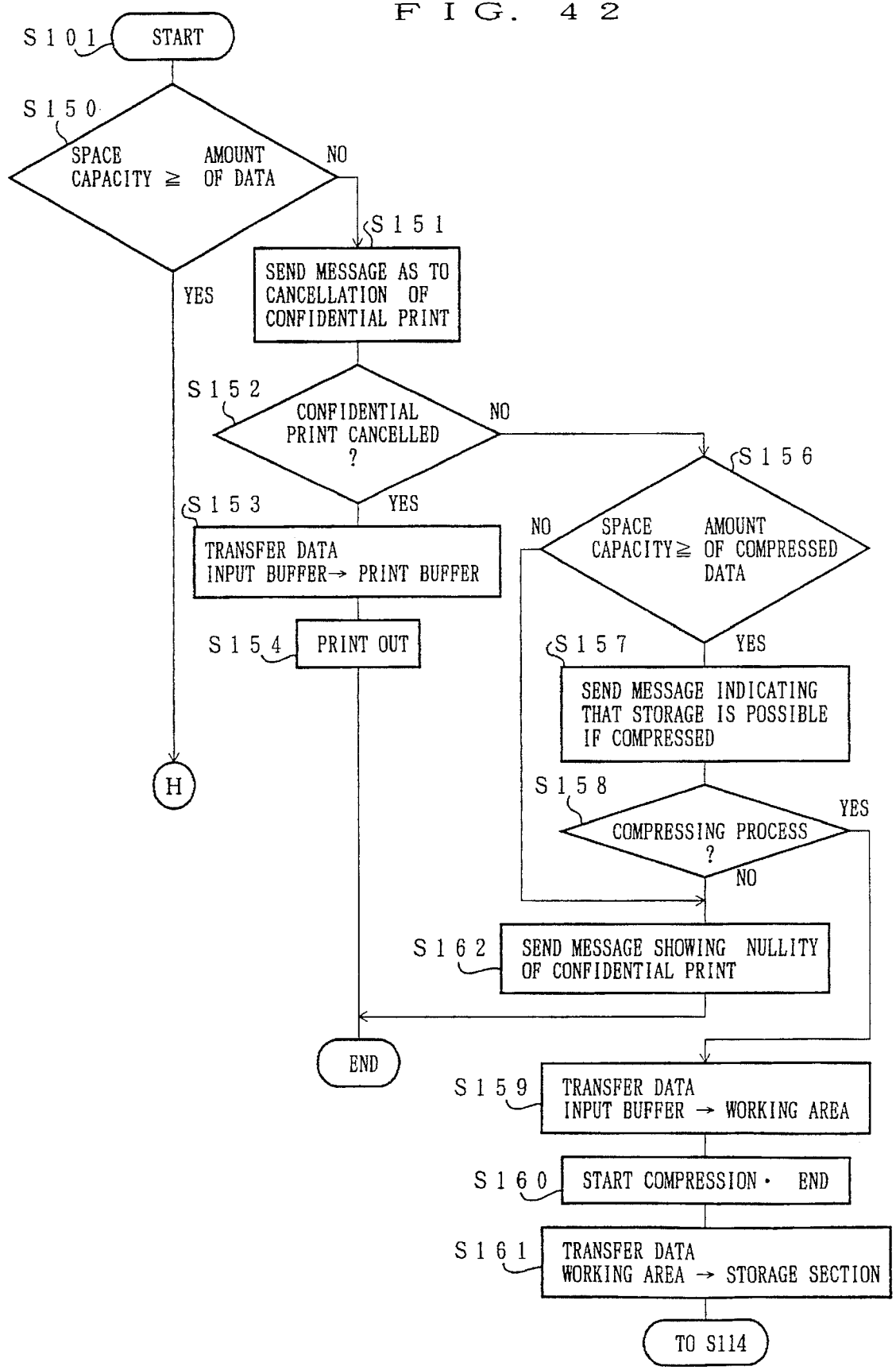
FIG. 42 is a flowchart that explains operations of the network printer system of embodiment 21.
Figure 43:
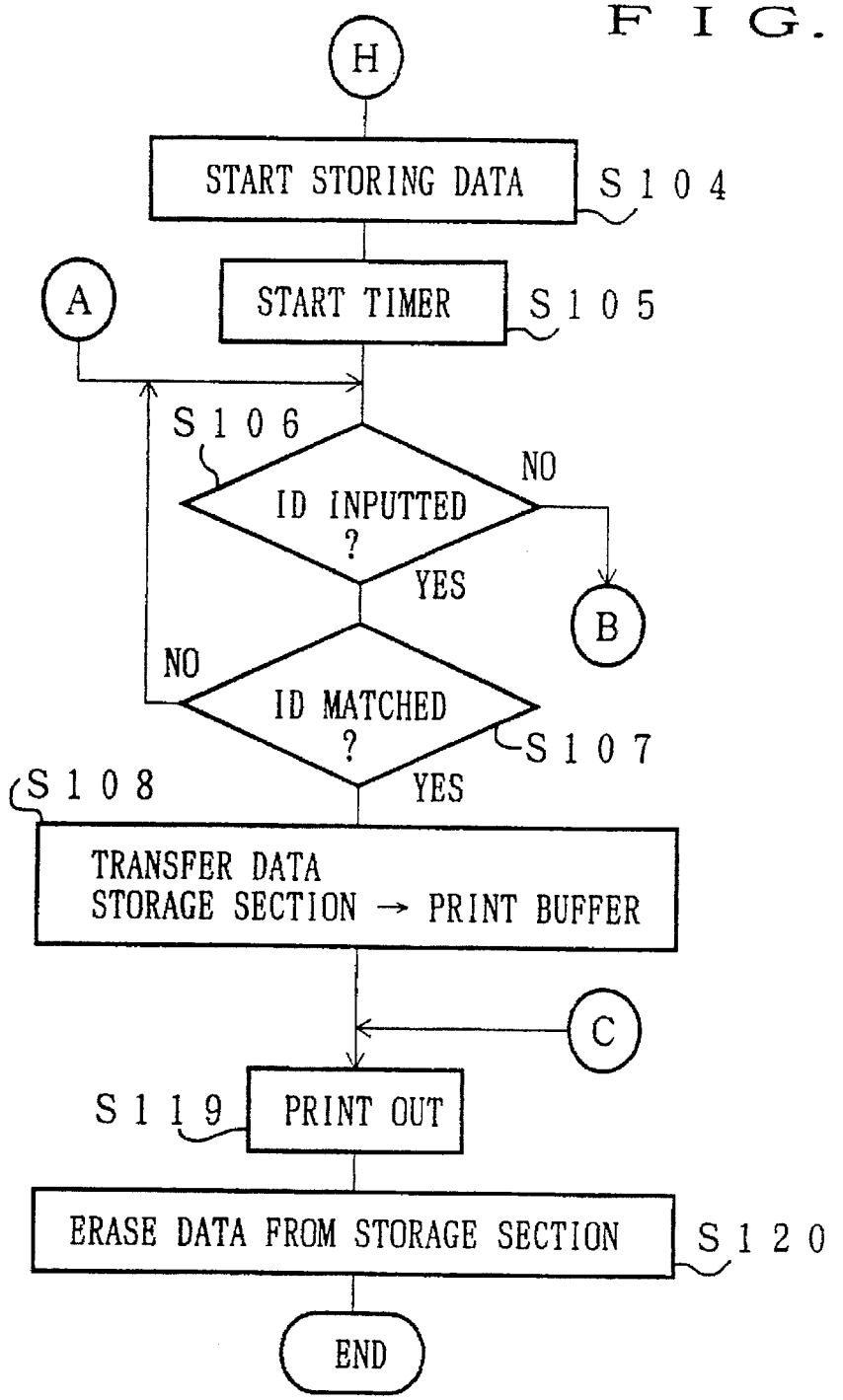
FIG. 43 is a flowchart that explains operations of the network printer system of embodiment 21.

The network printer system of Embodiment 21 of the present invention has the same arrangement as that shown in the block diagram of FIG. 28. Referring to FIGS. 42 and 43 and the aforementioned flowchart of FIG. 21 that follows these figures, an explanation is given of the operations of the printer in the present embodiment.

When the printer receives confidential print data and an ID code from one of the host machine (S101), the comparison section 116 compares the space capacity of the storage section 102 with the amount of the newly transmitted confidential print data (S150), and if the space capacity is larger, the control section 101 allows the confidential print data from the host machine, which has been stored in the input buffer 108b, to be stored in the storage section 102 (S104). The steps of S104 and thereafter are carried out in the same manner as Embodiment 20 (FIG. 41) except that the steps S126 through S128 are omitted.

In contrast, if the amount of the newly transmitted confidential print data is larger than the space capacity of the storage section 102 (S150), the message transmitting section 110 sends a message as to whether or not the current instruction for a confidential print out should be cancelled to the host machine that is transmitting the above-mentioned confidential print data having the larger amount of data (S151). Then, the control section 101 makes a judgment as to whether or not a signal for cancelling the instruction for a confidential print out is received from the host machine (S152). If the signal for cancellation has been received, the control section 101 transfers the confidential print data, which has been received and temporarily held, from the input buffer 108b to the print buffer 109b as normal print data (S153), and a normal print-out operation is carried out (S154).

If no signal for cancelling the instruction for a confidential print out is received from the host machine (S152), the comparison section 116 further compares the amount of data that would be taken by the new confidential print data if it were compressed with the space capacity of the storage section 102 (S156). If the space capacity is larger, the message transmitting section 110 sends a message indicating that the confidential print data, if compressed, can be stored in the storage section 102 to the corresponding host machine (S157). If the host machine, upon receipt of the message, transmits a signal for allowing the compressing operation to the printer (S158), the control section 101 transfers the confidential print data, which has already been stored in the input buffer 108b, to the working area 102a (S159), compresses the confidential print data by using the compressing program (S160), and transfers the confidential print data thus compressed to the memory area 102b for confidential print data (S161). Thereafter, the sequence proceeds from S114 to S120 (see FIG. 21 and FIG. 43).

If the host machine, upon receipt of the message indicating that the confidential print data, if compressed, can be stored in the storage section 102, does not sends a signal for allowing the compressing operation to the printer (S158), or if, upon comparison between the amount of data that would be taken by the new confidential print data if it were compressed and the space capacity of the storage section 102 (S156), the space capacity is smaller, the message transmitting section 110 sends a message indicating nullity of the instruction for a confidential print out to the corresponding host machine (S162).

In prior art arrangements, when new confidential print data is received in a state where the amount of the confidential print data is larger than the space capacity of the storage section 102, the instruction for a confidential print out has to be nullified. However, in the present embodiment, the message is sent to the host machine in question so as to inform that the confidential print data, if compressed, can be stored in the storage section 102 to the corresponding host machine, and if the host machine sends a signal for allowing the compression, the confidential print data, which has been received, is compressed and stored. Thus, it becomes possible to eliminate interruptions during the printing operation.

Embodiment 22

Figure 44:
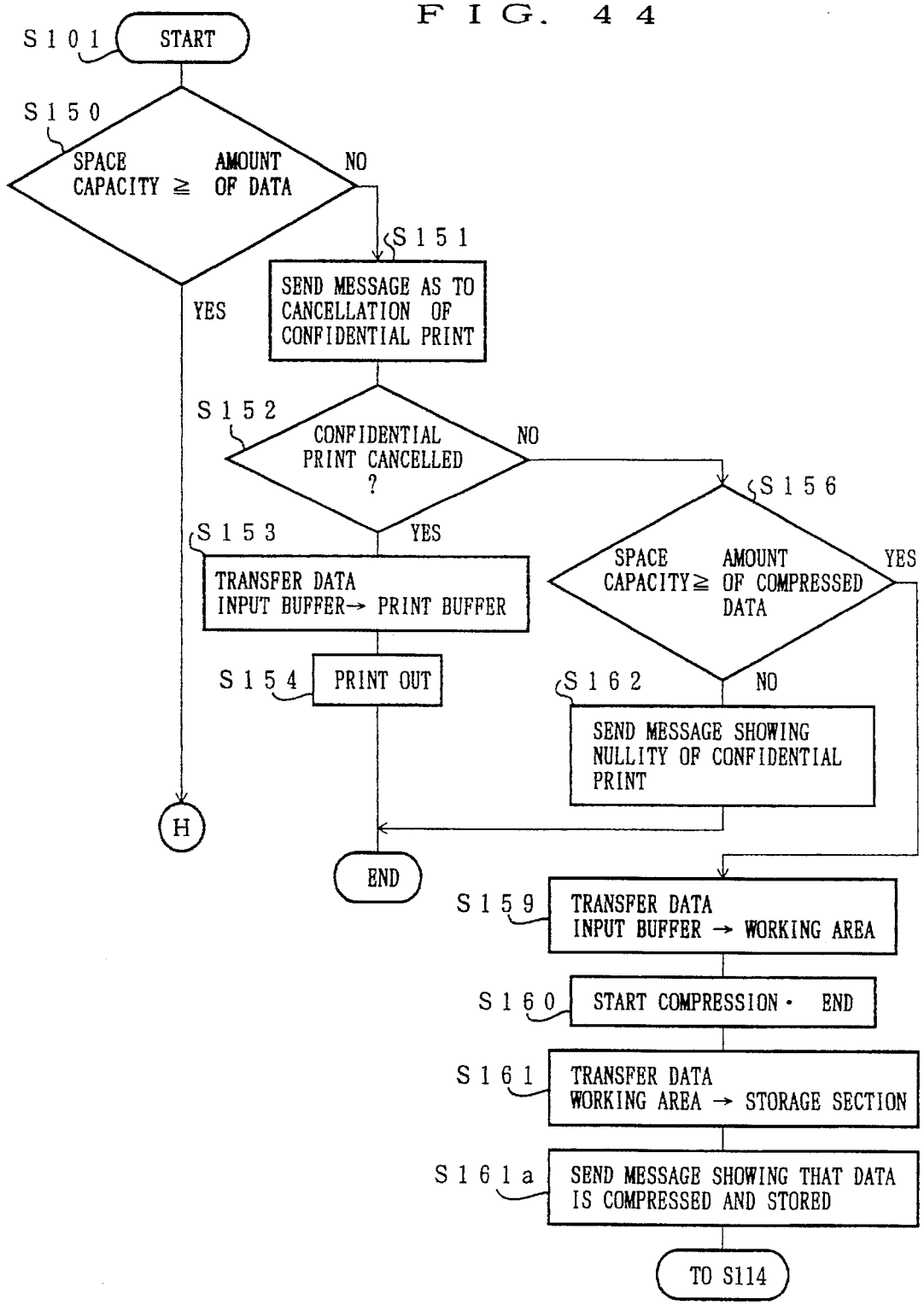
FIG. 44 is a flowchart that explains operations of the network printer system of embodiment 22.

The network printer system of Embodiment 22 of the present invention has the same arrangement as that shown in the block diagram of FIG. 28. Referring to FIG. 44 and the aforementioned flowcharts of FIGS. 43 and 21 that follow FIG. 44, an explanation is given of the operations of the printer in the present embodiment.

When the printer receives confidential print data and an ID code from one of the host machine (S101), the comparison section 116 compares the space capacity of the storage section 102 with the amount of the newly transmitted confidential print data (S150), and if the space capacity is larger, the control section 101 allows the confidential print data from the host machine, which has been stored in the input buffer 108b, to be stored in the storage section 102 (S104, see FIG. 43). The steps of S104 and thereafter are carried out in the same manner as Embodiment 21 (see FIG. 43 and FIG. 21).

In contrast, if the amount of the newly transmitted confidential print data is larger than the space capacity (S150), the message transmitting section 110 sends a message as to whether or not the current instruction for a confidential print out should be cancelled to the host machine that is transmitting the above-mentioned confidential print data having the larger amount of data (S151). Then, the control section 101 makes a judgment as to whether or not a signal for cancelling the instruction for a confidential print out is received from the host machine (S152). If the signal for cancellation has been received, the control section 101 transfers the confidential print data, which has been received and temporarily held, from the input buffer 108b to the print buffer 109b as normal print data (S153), and a normal print-out operation is carried out (S154).

If no signal for cancelling the instruction for a confidential print out is received from the host machine (S152), the comparison section 116 further compares the amount of data that would be taken by the new confidential print data if it were compressed with the space capacity of the storage section 102 (S156). If the space capacity is larger, the control section 101 transfers the confidential print data, which has already been stored in the input buffer 108b, to the working area 102a (S159), compresses the confidential print data by using the compressing program (S160), and transfers the confidential print data thus compressed to the memory area 102b for confidential print data (S161). Then, the message transmitting section 110 transmits to the host machine a message informing that the new confidential print data has been stored in the storage section 102 in a compressed state (S161a). Thereafter, the sequence proceeds from S114 to S120 (see FIG. 21 and FIG. 43).

In contrast, if, upon comparison between the amount of data that would be taken by the new confidential print data if it were compressed and the space capacity of the storage section 102 (S156), the space capacity is smaller, the message transmitting section 110 sends a message indicating nullity of the instruction for a confidential print out to the corresponding host machine (S162).

In prior art arrangements, when new confidential print data is received in a state where the amount of the confidential print data is larger than the space capacity of the storage section 102, the instruction for a confidential print out has to be nullified. However, in the present embodiment, the new confidential print data is compressed and stored in the storage section 102, and immediately after this process, the message informing this fact is sent to the host machine in question. Thus, it becomes possible to eliminate interruptions during the printing operation.

Embodiment 23

Figure 45:
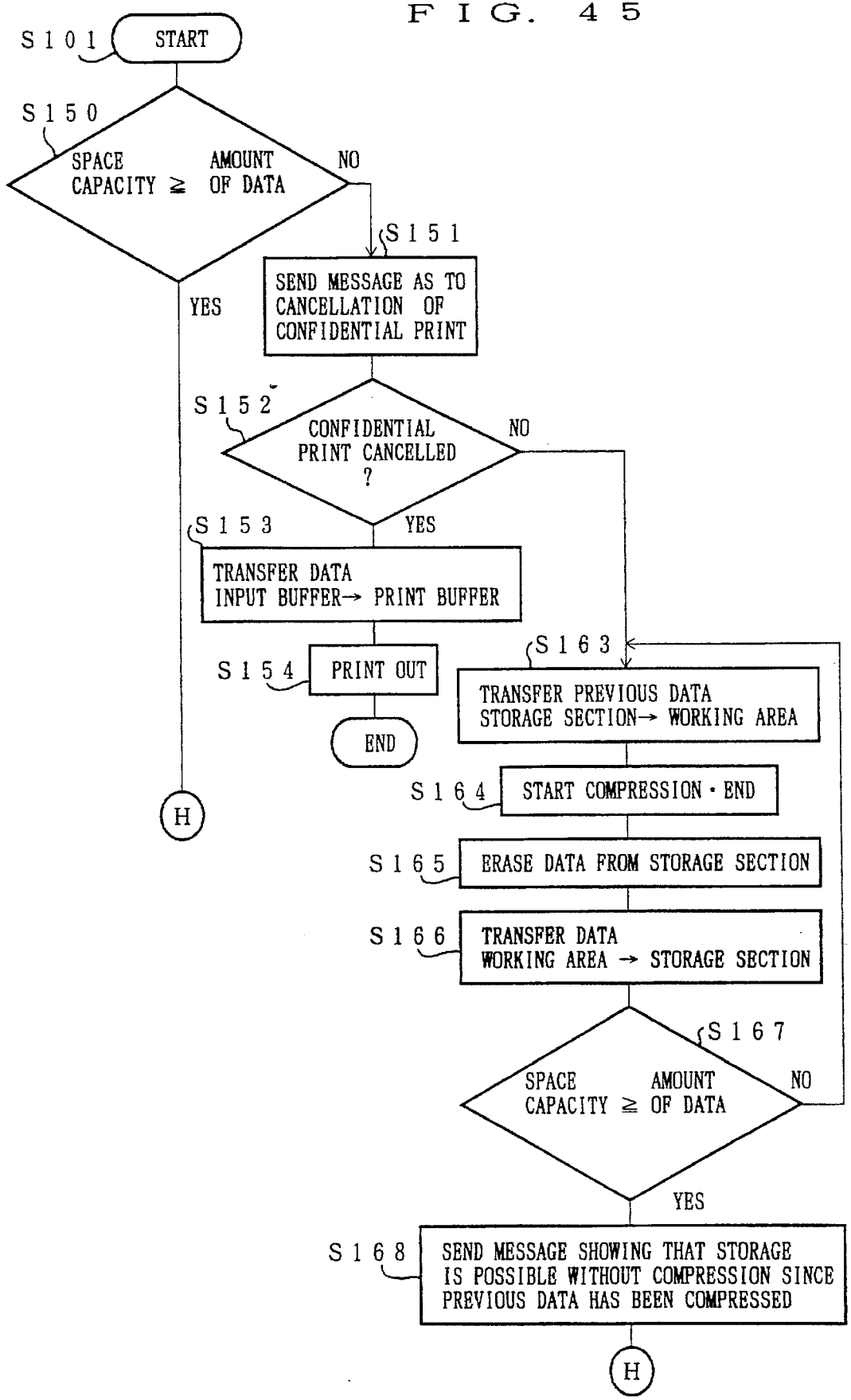
FIG. 45 is a flowchart that explains operations of the network printer system of embodiment 23.

The network printer system of Embodiment 23 of the present invention has the same arrangement as that shown in the block diagram of FIG. 28. Referring to FIG. 45 and the aforementioned flowcharts of FIGS. 43 and 21 that follow FIG. 45, an explanation is given of the operations of the printer in the present embodiment.

When the printer receives confidential print data and an ID code from one of the host machine (S101), the comparison section 116 compares the space capacity of the storage section 102 with the amount of the newly transmitted confidential print data (S150), and if the space capacity is larger, the control section 101 allows the confidential print data from the host machine, which has been stored in the input buffer 108b, to be stored in the storage section 102 (S104, see FIG. 43). The steps of S104 and thereafter are carried out in the same manner as Embodiment 21 (see FIG. 43 and FIG. 21).

In contrast, if the amount of the newly transmitted confidential print data is larger than the space capacity (S150), the message transmitting section 110 sends a message as to whether or not the current instruction for a confidential print out should be cancelled to the host machine that is transmitting the above-mentioned confidential print data having the larger amount of data (S151). Then, the control section 101 makes a judgment as to whether or not a signal for cancelling the instruction for a confidential print out is received from the host machine (S152). If the signal for cancellation has been received, the control section 101 transfers the confidential print data, which has been received and temporarily held, from the input buffer 108b to the print buffer 109b as normal print data (S153), and a normal print-out operation is carried out (S154).

If no signal for cancelling the instruction for a confidential print out is received from the host machine (S152), the control section 101 transfers one of the confidential print data that have already been stored in the storage section 102 to the working area 102a (S163), compresses the confidential print data by using the compressing program (S164), erases the original confidential print data in the storage section 102 (S165), and transfers the compressed confidential print data from the storage section 102 to the memory area 102b for confidential print data (S166). Moreover, the comparison section 116 compares the amount of the new confidential print data in the case when it were compressed with the space capacity of the storage section 102 (S167). If it is judged that the space capacity is smaller, the sequence returns to S163, and another confidential print data is compressed. This process is repeated in the same manner until the space capacity becomes larger. When the space capacity becomes larger, the message transmitting section 110 transmits the host machine a message informing that the new confidential print data can be stored in the storage section 102 without its compressing process, since the previous data has been compressed (S168), and the new confidential print data is stored in the storage section 102 (see S104 and FIG. 43). Then, the sequence proceeds to the steps S105 and thereafter.

In prior art arrangements, when new confidential print data is received in a state where the amount of the confidential print data is larger than the space capacity of the storage section 102, the instruction for a confidential print out has to be nullified. However, in the present embodiment, the confidential print data, which have already been stored in the storage section 102, are compressed and again stored in the storage section 102, and immediately after this process, the message informing this fact is sent to the host machine in question. Thus, it becomes possible to eliminate interruptions during the printing operation.

In particular, since the compressing process is not conducted on the newly transmitted confidential print data, but conducted on the confidential print data that have already been stored in the storage section 102, the newly transmitted confidential print data, which has the least occupied time of the storage section 102, has the least possibility of being compressed. Thus, it is possible to use the system equally.

Embodiment 24

In this embodiment, if the amount of newly transmitted confidential print data is larger than the space capacity of the storage section 102, the newly transmitted confidential print data is compressed and stored in the storage section 102. Flowcharts which explain the operations are those shown in FIGS. 43 and 44 as well as FIG. 21.

In the same manner as explained in Embodiment 22, if the amount of data that would be taken by the new confidential print data if it were compressed is smaller than the space capacity of the storage section 102 (S156), the control section 101 transfers the confidential print data, which has already been stored in the input buffer 108b, to the working area 102a (S159), compresses the new confidential print data (S160), and transfers the confidential print data thus compressed to the memory area 102b for confidential print data (S161) so as to be stored therein. Then, the message transmitting section 110 transmits to the host machine a message informing that the new confidential print data has been stored in a compressed state.

As described above, since the compressing process is not conducted on the confidential print data that have already been stored in the storage section 102, but conducted on the newly transmitted confidential print data, it becomes possible to use the system equally.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data storage device comprising:
    storage means for storing and maintaining inputted data;
    data-output means for calling for and outputting the data stored in the storage means;
    inputted-time storing means for storing time at which data is stored in the storage means;
    time-counting means for counting time;
    processing-time storing means for storing processing time at which a process is carried out by a remaining-capacity increasing-process means; and
    the remaining-capacity increasing-process means for detecting data whose processing time is due from data stored in the storage means in accordance with information from the inputted-time storing means, the time-counting means and the processing-time storing means, and for carrying out a process on the data in question in order to increase the remaining amount of the storage means.

2. The data storage device as defined in claim 1, wherein the remaining-capacity increasing-process means increases the remaining capacity of the storage means by compressing data.

3. The data storage device as defined in claim 1, wherein the remaining-capacity increasing-process means increases the remaining capacity of the storage means by erasing data.

4. The data storage device as defined in claim 1, further comprising:
    calling-frequency measuring means for measuring the calling frequency of respective data from the storage means, and
    processing-time changing means for changing the processing time stored in the processing-time storing means so that the processing time of data having a high level of the calling frequency is extended.

5. The data storage device as defined in claim 1 which is installed in an output apparatus for visualizing and outputting the data called from the storage means, wherein when the output apparatus cannot carry out the visualizing and outputting processes of the data, the remaining-capacity increasing-process means carries out the processing operations.

6. The data storage device as defined in claim 1, further comprising:
    initial-point changing means for updating the inputted times that are stored in the inputted-time storing means with respect to the data stored in the storage means, based on the times at which the data were visualized and outputted.

7. A data storage device comprising:
    storage means for storing and maintaining inputted data;
    data-output means for calling for and outputting the data stored in the storage means;
    detection means for the amount of newly storing data for detecting the amount of data that is to be newly stored in the storage means;
    remaining-capacity detection means for detecting the remaining capacity of the storage means;
    decision means for making a decision as to whether or not the storage means is capable of storing new data in accordance with information from the detection means for the amount of newly storing data and the remaining-capacity detection means; and
    remaining-capacity increasing-process means which, if the storage means is not capable of storing the new data, carries out a process for increasing the remaining capacity of the storage means on the data stored in the storage means in order to provide a remaining capacity that is required for storing the new data.

8. The data storage device as defined in claim 7, wherein the remaining-capacity increasing-process means increases the remaining capacity of the storage means by compressing data.

9. The data storage device as defined in claim 7, wherein the remaining-capacity increasing-process means increases the remaining capacity of the storage means by erasing data.

10. A network printer system comprising:
    a plurality of host machines, each of which forms image data and gives an instruction for a confidential print out of the image data thus formed, and
    a printer which stores confidential print data that is transmitted from any of the host machines upon instruction for a confidential print out of the host machine, and prints out the confidential print data upon receipt of an ID code,
    wherein the printer includes:
        storage means for storing a program that compresses and restores the confidential print data, the confidential print data and ID codes;
        a timer for counting a first predetermined period from the start of a storing process of confidential print data;
        control means which recognizes the time on the timer has elapsed, compresses the confidential print data by using the compressing program when the elapse of the time has been recognized, and restores the compressed confidential print data based on an instruction for restoration;
        matching means for making a matching between the entered ID code and stored ID codes; and
        output means for printing out the confidential print data on the basis of the matching conditions of the ID codes that have been identified by the matching means.

11. The network printer system as defined in claim 10, wherein in the case of storing confidential print data from a plurality of host machines, the control means, when the timer has counted up a second predetermined period, transmits a message calling for the print out of the confidential print data to the host machines that have given the instructions for confidential print.

12. The network printer system as defined in claim 11, wherein the second predetermined time is shorter than the first predetermined time.

13. The network printer system as defined in claim 11, wherein the control means transmits the message calling for the print out of the confidential print data to the host machine that gave the instruction for a confidential print out last among the host machines that have given the instructions for confidential print-outs.

14. The network printer system as defined in claim 11, wherein the control means transmits the message calling for the print out of the confidential print data to the host machine that gave the instruction for a confidential print out earliest among the host machines that have given the instructions for confidential print.

15. The network printer system as defined in claim 11, wherein the control means makes comparisons among amounts of a plurality of confidential print data, and transmits the message calling for the print out of the confidential print data to the host machine that relates to the most amount of data.

16. A network printer system comprising:

a plurality of host machines, each of which forms image data and gives an instruction for a confidential print out of the image data thus formed, and a printer which stores confidential print data that is transmitted from any of the host machines upon instruction for a confidential print out of the host machine, and prints out the confidential print data upon receipt of an ID code, wherein the printer includes:

storage means for storing a program that compresses and restores the confidential print data, the confidential print data and ID codes;

control means which compresses the previously stored confidential print data by using the compressing program based on an instruction for new confidential prints given from one of the host machines, and restores the compressed confidential print data based on an instruction for restoration;

matching means for making a matching between the entered ID code and stored ID codes; and output means for printing out the confidential print data on the basis of the matching conditions of the ID codes that have been identified by the matching means.

17. The network printer system as defined in claim 16, wherein upon receipt of a new instruction for a confidential print out from one of the host machines, the control means selects specific confidential print data that necessitates the least amount of compression and that provides a space capacity capable of storing the new confidential print data, based on comparisons made among the amount of image data of a plurality of previously stored confidential print data, the amount of image data of the new confidential print data and the space capacity of the storage device, and compresses the selected confidential print data by using the compressing program.

18. The network printer system as defined in claim 16, wherein upon receipt of a new instruction for a confidential print out from one of the host machines, the control means successively selects the previously stored confidential print data starting from the one that was stored earliest, and compresses the selected data.

19. The network printer system as defined in claim 16, wherein upon receipt of a new instruction for a confidential print out from one of the host machines, the control means successively selects the previously stored confidential print data starting from the one that has the most amount of data, and compresses the selected data.

20. The network printer system as defined in claim 16, wherein upon receipt of a new instruction for a confidential print out from one of the host machines, the control means successively selects the previously stored confidential print data starting from the one that has the most number of output print sheets, and compresses the selected data.

21. The network printer system as defined in claim 16, wherein preference codes are added to respective confidential print data and when, upon receipt of a new instruction for a confidential print out from one of the host machines, the control means conducts compressions on the previously stored confidential print data, the data compressions are selectively carried out in succession, starting from the one that has the lowest order of preference in its preference code.

22. The network printer system as defined in claim 16, further comprising time-counting means for counting the current time and operation means for calculating output waiting time from the present time until print output time, wherein the storage means stores the print output time, together with a program that compresses and restores the confidential print data, the confidential print data and ID codes, and upon receipt of a new instruction for a confidential print out from one of the host machines, the control means selects the confidential print data that has the longest output waiting time from the previously stored plural confidential print data by using the operation means, and compresses the selected confidential print data by using the compressing program.

23. The network printer system as defined in claim 16, wherein based on a judgment that after confidential print data has been printed out, the space capacity of the storage means is larger than the amount of data that would be taken by the remaining compressed confidential print data if it were restored, the control means restores the confidential print data in question.

24. The network printer system as defined in claim 23, wherein only when a state where it is judged that the space capacity of the storage means is larger than the amount of data that would be taken by the remaining compressed confidential print data if it were restored continues for not less than a predetermined time, the control means restores the confidential print data in question.

25. The network printer system as defined in claim 16, further comprising:

message transmitting means which, when the amount of new confidential print data is larger than the space capacity of the storage means, sends a message related to judgment of cancellation of the instruction for a confidential print out to the host machine that is giving the new instruction for a confidential print out.

26. The network printer system as defined in claim 25, wherein if, after the message transmitting means has sent the message related to judgment of cancellation of the instruction for a confidential print out to the host machine, no signal for cancelling the instruction for a confidential print out is given by the host machine, the control means compresses confidential print data.

27. The network printer system as defined in claim 16 further comprising message transmitting means which, when the amount of data that accumulated in the storage means has reached a predetermined value, sends a message related to judgment of cancellation of the instruction for a confidential print out to the host machine that is giving a new instruction for a confidential print out.

28. The network printer system as defined in claim 27, wherein if, after the message transmitting means has sent the message related to judgment of cancellation of the instruction for a confidential print out to the host machine, no signal for cancelling the instruction for confidential print is given by the host machine, the control means compresses confidential print data.

* * * * *

UNITED STATES PATENT AND TRADEMARK OFFICE
CERTIFICATE OF CORRECTION

PATENT NO. : 5,652,830
DATED : July 29, 1997
INVENTOR(S) : Yamamoto, et al.

It is certified that error appears in the above-indentified patent and that said Letters Patent is hereby corrected as shown below:

On the title page, Foreign Application Priority Data,
"Nov. 2, 1995 [JP] Japan........6-269435" should be
--Nov. 2, 1994[JP]........6-269435--

Signed and Sealed this

Second Day of December, 1997

*Attest:*

BRUCE LEHMAN

*Attesting Officer*     *Commissioner of Patents and Trademarks*